United States Patent
Lei

(10) Patent No.: US 9,679,175 B2
(45) Date of Patent: Jun. 13, 2017

(54) BARCODE READER RANGING USING TARGETING ILLUMINATION

(71) Applicant: The Code Corporation, Draper, UT (US)

(72) Inventor: Ming Lei, Princeton Junction, NJ (US)

(73) Assignee: The Code Corporation, Draper, UT (US)

( * ) Notice: Subject to any disclaimer, the term of this patent is extended or adjusted under 35 U.S.C. 154(b) by 223 days.

(21) Appl. No.: 14/304,830

(22) Filed: Jun. 13, 2014

(65) Prior Publication Data

US 2015/0363619 A1 Dec. 17, 2015

(51) Int. Cl.
*G06K 7/10* (2006.01)

(52) U.S. Cl.
CPC ...... *G06K 7/10732* (2013.01); *G06K 7/10811* (2013.01)

(58) Field of Classification Search
USPC ............................................ 235/455, 462.06
See application file for complete search history.

(56) References Cited

U.S. PATENT DOCUMENTS

2014/0008440 A1* 1/2014 Patil ................... G06K 7/10801
235/462.21

* cited by examiner

*Primary Examiner* — Rafferty Kelly
(74) *Attorney, Agent, or Firm* — Timothy P. O'Hagan; Austin Rapp & Hardman

(57) ABSTRACT

A barcode reader comprising a targeting illumination system, a plurality of illumination systems, and a lens assembly may also comprise feature offset data. The feature offset data may be offsets between locations of a plurality of features projected by the targeting illumination system within a plurality of calibration image frames captured at different calibration distances. The barcode reader may (i) select two features projected by the targeting illumination system that are present in a barcode image captured via the first lens, (ii) determine a feature offset that indicates an offset between the two features, and (iii) estimate a barcode distance based on the feature offset and the feature offset data.

16 Claims, 30 Drawing Sheets

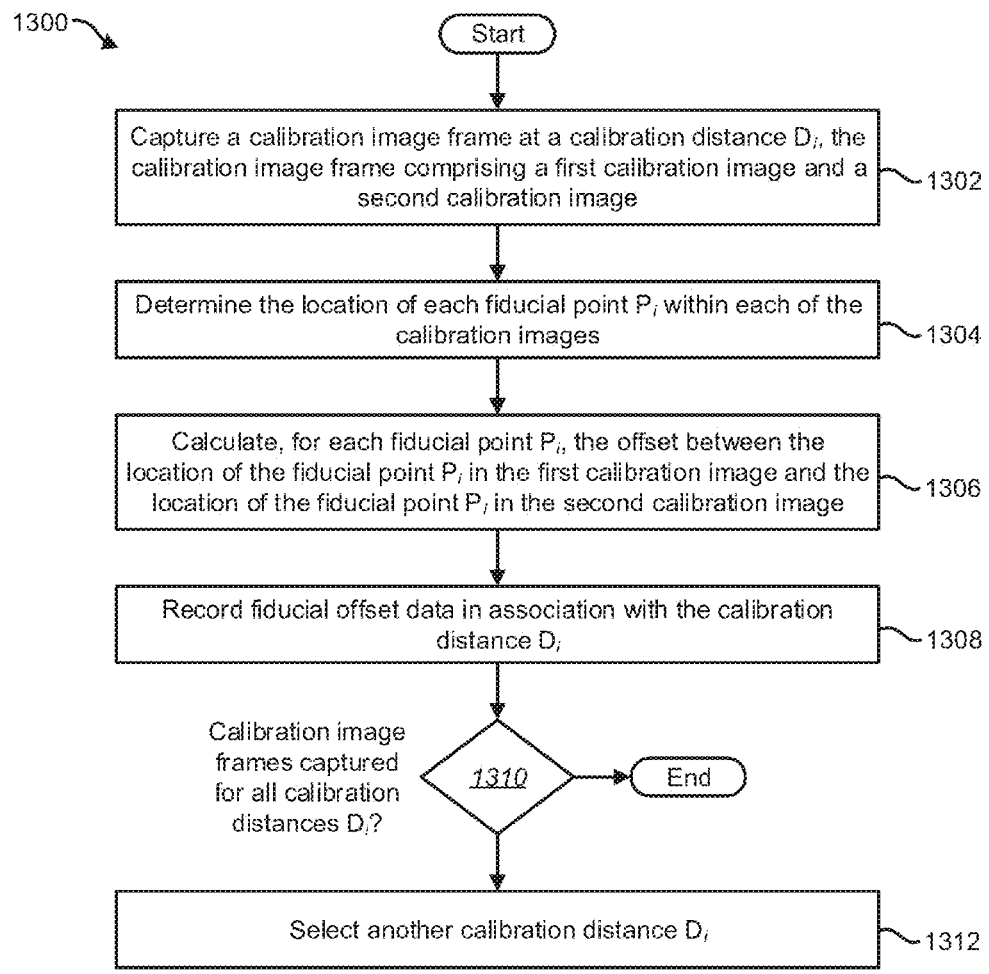

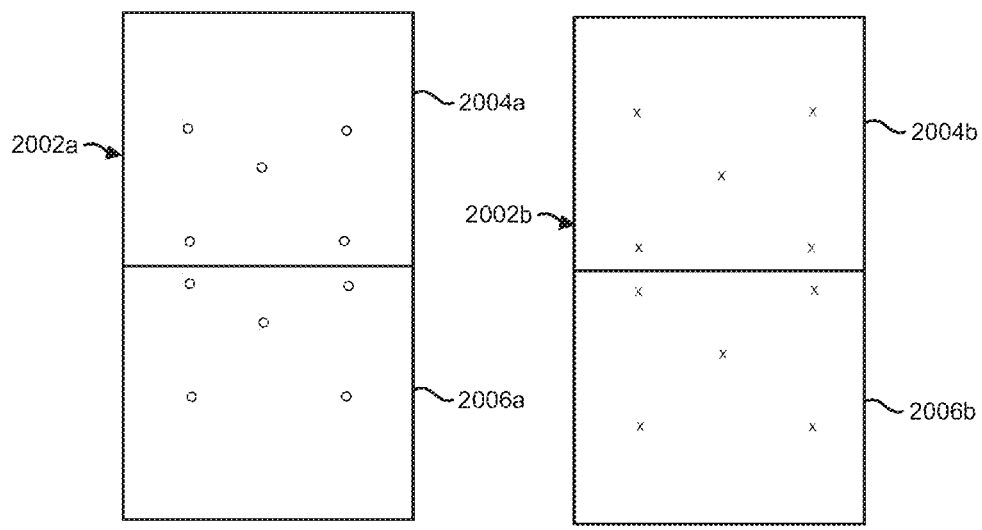
FIG. 19A  FIG. 19B
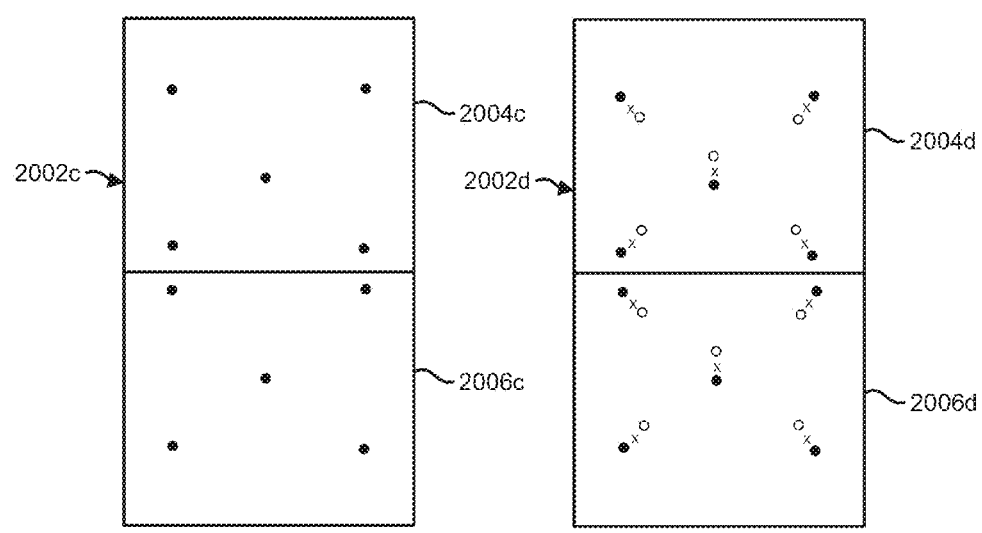
FIG. 19C  FIG. 19D

FIG. 21B — Table 2210b (ref 2208b)

| Fiducial Point | Calibration Distance $D_1$ | | Calibration Distance $D_2$ | | Calibration Distance $D_3$ | |
|---|---|---|---|---|---|---|
| | 1st Image | 2nd Image | 1st Image | 2nd Image | 1st Image | 2nd Image |
| $P_1$ | $(x_1, y_1)_{11}$ | $(x_2, y_2)_{11}$ | $(x_1, y_1)_{12}$ | $(x_2, y_2)_{12}$ | $(x_1, y_1)_{13}$ | $(x_2, y_2)_{13}$ |
| $P_2$ | $(x_1, y_1)_{21}$ | $(x_2, y_2)_{21}$ | $(x_1, y_1)_{22}$ | $(x_2, y_2)_{22}$ | $(x_1, y_1)_{23}$ | $(x_2, y_2)_{23}$ |
| $P_3$ | $(x_1, y_1)_{31}$ | $(x_2, y_2)_{31}$ | $(x_1, y_1)_{32}$ | $(x_2, y_2)_{32}$ | $(x_1, y_1)_{33}$ | $(x_2, y_2)_{33}$ |
| $P_4$ | $(x_1, y_1)_{41}$ | $(x_2, y_2)_{41}$ | $(x_1, y_1)_{42}$ | $(x_2, y_2)_{42}$ | $(x_1, y_1)_{43}$ | $(x_2, y_2)_{43}$ |
| $P_5$ | $(x_1, y_1)_{51}$ | $(x_2, y_2)_{51}$ | $(x_1, y_1)_{52}$ | $(x_2, y_2)_{52}$ | $(x_1, y_1)_{53}$ | $(x_2, y_2)_{53}$ |

FIG. 21C — Table 2210c (ref 2208c)

| Fiducial Point | Calibration Distance $D_1$ | Calibration Distance $D_2$ | Calibration Distance $D_3$ |
|---|---|---|---|
| $P_1$ | $(\Delta x, \Delta y)_{11}$ | $(\Delta x, \Delta y)_{12}$ | $(\Delta x, \Delta y)_{13}$ |
| $P_2$ | $(\Delta x, \Delta y)_{21}$ | $(\Delta x, \Delta y)_{22}$ | $(\Delta x, \Delta y)_{23}$ |
| $P_3$ | $(\Delta x, \Delta y)_{31}$ | $(\Delta x, \Delta y)_{32}$ | $(\Delta x, \Delta y)_{33}$ |
| $P_4$ | $(\Delta x, \Delta y)_{41}$ | $(\Delta x, \Delta y)_{42}$ | $(\Delta x, \Delta y)_{43}$ |
| $P_5$ | $(\Delta x, \Delta y)_{51}$ | $(\Delta x, \Delta y)_{52}$ | $(\Delta x, \Delta y)_{53}$ |

| Fiducial Point | Calibration Distance $D_1$ | Calibration Distance $D_2$ | Calibration Distance $D_3$ |
|---|---|---|---|
| $P_1$ | $(x_1, y_1)_{11}, (x_2, y_2)_{11}, (\Delta x, \Delta y)_{11}$ | $(x_1, y_1)_{12}, (x_2, y_2)_{12}, (\Delta x, \Delta y)_{12}$ | $(x_1, y_1)_{13}, (x_2, y_2)_{13}, (\Delta x, \Delta y)_{13}$ |
| $P_2$ | $(x_1, y_1)_{21}, (x_2, y_2)_{21}, (\Delta x, \Delta y)_{21}$ | $(x_1, y_1)_{22}, (x_2, y_2)_{22}, (\Delta x, \Delta y)_{22}$ | $(x_1, y_1)_{23}, (x_2, y_2)_{23}, (\Delta x, \Delta y)_{23}$ |
| $P_3$ | $(x_1, y_1)_{31}, (x_2, y_2)_{31}, (\Delta x, \Delta y)_{31}$ | $(x_1, y_1)_{32}, (x_2, y_2)_{32}, (\Delta x, \Delta y)_{32}$ | $(x_1, y_1)_{33}, (x_2, y_2)_{33}, (\Delta x, \Delta y)_{33}$ |
| $P_4$ | $(x_1, y_1)_{41}, (x_2, y_2)_{41}, (\Delta x, \Delta y)_{41}$ | $(x_1, y_1)_{42}, (x_2, y_2)_{42}, (\Delta x, \Delta y)_{42}$ | $(x_1, y_1)_{43}, (x_2, y_2)_{43}, (\Delta x, \Delta y)_{43}$ |
| $P_5$ | $(x_1, y_1)_{51}, (x_2, y_2)_{51}, (\Delta x, \Delta y)_{51}$ | $(x_1, y_1)_{52}, (x_2, y_2)_{52}, (\Delta x, \Delta y)_{52}$ | $(x_1, y_1)_{53}, (x_2, y_2)_{53}, (\Delta x, \Delta y)_{53}$ |

FIG. 21D

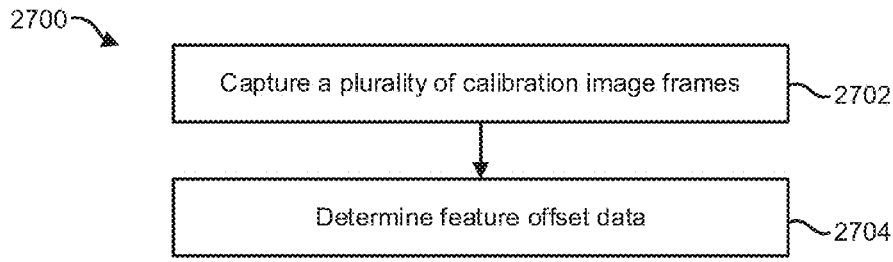
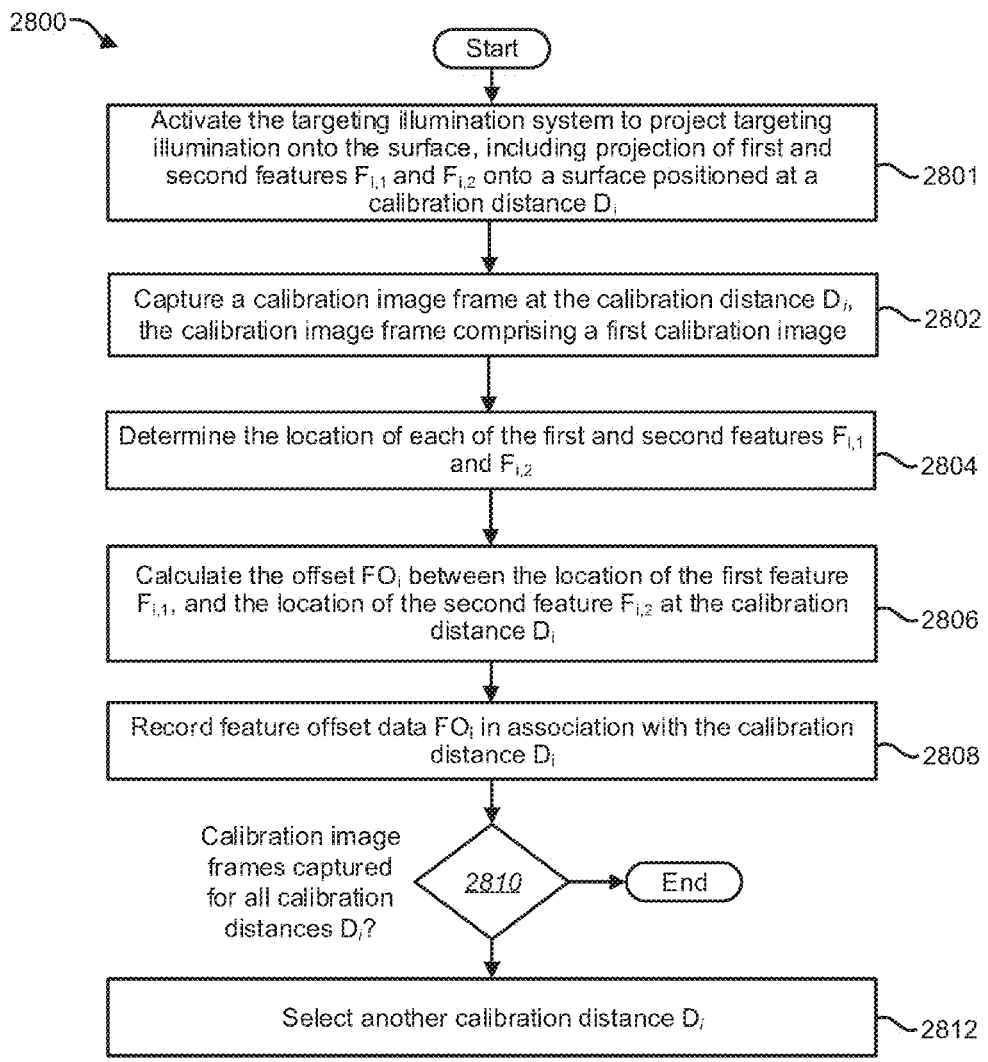

BARCODE READER RANGING USING TARGETING ILLUMINATION

TECHNICAL FIELD

The present disclosure relates generally to barcode readers. More specifically, the present disclosure relates to a barcode reader that obtains ranging data via a targeting illumination system.

BACKGROUND

A barcode is an optical machine-readable representation of information. Devices for identifying or extracting information from barcodes are generally referred to as barcode readers (or barcode scanners). An image-based barcode reader includes a camera for capturing an image of a barcode to be read. The camera includes a focusing lens that focuses light reflected from a target area onto a photo sensor array. Once an image of a barcode has been captured by the camera, a decoder processes the image and extracts the information contained in the barcode.

SUMMARY

According to one aspect of the present disclosure, there is provided a barcode reader, having an illumination system, a first lens assembly with a first field of view, a targeting illumination system that projects targeting illumination into the first field of view, and calibration data indicating a plurality of feature offsets of the targeting illumination. The feature offsets may correspond to a plurality of calibration distances. The barcode reader may have instructions executable by a processor to (i) cause an image of a barcode to be captured while the targeting illumination system is activated, (ii) determine a distance between distinct features of the targeting illumination in the image, (iii) determine an estimated barcode distance based on the distance between the distinct features of the targeting illumination in the image and the calibration data, and (iv) use the estimated barcode distance to select at least one operating parameter of the barcode reader.

Alternatively or additionally, determining the estimated barcode distance may include (i) identifying a closest feature offset among the plurality of feature offsets, and (ii) identifying a calibration distance that corresponds to the closest feature offset.

Alternatively or additionally, determining the estimated barcode distance may include interpolating the estimated barcode distance using the distance between the distinct features of the targeting illumination in the image and the calibration data.

Alternatively or additionally, the barcode reader also includes instructions executable by the processor to cause a plurality of calibration images to be captured. Each feature offset of the plurality of feature offsets may indicate an offset between the distinct features of the targeting illumination in a particular calibration image.

Alternatively or additionally, each feature offset of the plurality of feature offsets may indicate an offset between distinct features of the targeting illumination at a particular calibration distance of the plurality of calibration distances.

Alternatively or additionally, the calibration data may include, for each of the plurality of calibration distances, (i) a first location corresponding to a first feature of the targeting illumination in a calibration image, (ii) a second location corresponding to a second feature of the targeting illumination in the calibration image, and (iii) a feature offset indicating an offset between the first location and the second location.

Alternatively or additionally, the barcode reader may further include instructions executable by the processor to calculate the plurality of feature offsets based on known divergence of the targeting illumination.

Alternatively or additionally, the barcode reader may further include an illumination system. The illumination system may include a plurality of illumination sub-systems, each of which is optimal for barcode reading within a different zone of the first field of view. Using the estimated barcode distance to select the at least one operating parameter of the barcode reader may include selecting an illumination sub-system that is optimal for barcode reading within a zone that encompasses the estimated barcode distance.

Alternatively or additionally, the plurality of illumination sub-systems include a first illumination system that directs first illumination into the first field of view. The first illumination may be optimal for barcode reading within a first zone of the first field of view. The plurality of illumination sub-systems may also include a second illumination system that directs second illumination into the first field of view. The second illumination may be optimal for barcode reading within a second zone of the first field of view. Using the estimated barcode distance to select the at least one operating parameter of the barcode reader may include selecting the first illumination system if the estimated barcode distance is within the first zone of the first field of view, and selecting the second illumination system if the estimated barcode distance is within the second zone of the first field of view.

Alternatively or additionally, the barcode reader may further include a second lens assembly having a second field of view. The distance between the distinct features of the targeting illumination may only be determined with respect to the first field of view.

According to another aspect of the present disclosure, there is provided a barcode reader with a camera with a first lens assembly positioned to image a first field of view onto a first image sensor section, an illumination system that illuminates the first field of view, the illumination system comprising a plurality of illumination sub-systems, and a targeting illumination system that projects targeting illumination into the first field of view. The targeting illumination may include a plurality of distinct illumination beams being projected so as to diverge from one another, the plurality of distinct illumination beams forming a plurality of distinct features on a target medium. The barcode reader may further include calibration data stored in non-volatile memory of the barcode reader. The calibration data may indicate a plurality of feature offsets of the targeting illumination. The plurality of feature offsets may correspond to a plurality of different calibration distances, and each feature offset may indicate an offset between distinct features of the targeting illumination at a particular calibration distance. The barcode reader may further include instructions executable by a processor to (i) activate the targeting illumination, (ii) cause an image of a barcode to be captured by the camera while the targeting illumination system is activated, (iii) determine a distance between the distinct features of the targeting illumination in the image, (iv) determine an estimated barcode distance based on the distance between the distinct features of the targeting illumination in the image and the calibration data, and (v) use the estimated barcode distance to select an illumination sub-system for barcode reading.

Alternatively or additionally, determining the estimated barcode distance may include (i) identifying a closest feature offset, the closest feature offset being a feature offset of the plurality of feature offsets that is closest to the distance between the distinct features of the targeting illumination in the image, (ii) identifying a calibration distance that corresponds to the closest feature offset, and (iii) setting the estimated barcode distance equal to the identified calibration distance.

Alternatively or additionally, determining the estimated barcode distance may include (i) identifying a pair of feature offsets such that the distance between the distinct features of the targeting illumination in the image and the calibration data is intermediate the pair of feature offsets, (ii) identifying a pair of calibration distances corresponding to the pair of feature offsets, and (iii) interpolating between the pair of calibration distances.

Alternatively or additionally, the barcode reader may further include instructions executable by the processor to cause a plurality of calibration images to be captured by the camera, each calibration image being captured at a different calibration distance. Each feature offset of the plurality of feature offsets may indicate the offset between the distinct features of the targeting illumination in a distinct calibration image of the plurality of calibration images.

Alternatively or additionally, the barcode reader may further have a look-up table storing the calibration data. The look-up table may include, for each of the plurality of different calibration distances, a feature offset indicating an offset between the distinct features of the targeting illumination.

Alternatively or additionally, the barcode reader may further include a look-up table storing the calibration data. The look-up table may include, for each of the plurality of different calibration distances, a first location corresponding to a first feature of the targeting illumination in a calibration image, a second location corresponding to a second feature of the targeting illumination in the calibration image, and a feature offset indicating the offset between the first location and the second location.

Alternatively or additionally, the barcode reader may further have instructions executable by the processor to determine a divergence angle of the targeting illumination, and calculate the plurality of feature offsets based on the divergence angle.

Alternatively or additionally, each illumination sub-system of the plurality of illumination sub-systems may be optimal for barcode reading within a different zone of the first field of view. The selected illumination sub-system may be optimal for barcode reading within a zone that encompasses the estimated barcode distance.

Alternatively or additionally, the plurality of illumination sub-systems include a dark field illumination system that directs dark field illumination into the first field of view, the dark field illumination being optimal for barcode reading within a near zone of the first field of view, a diffuse bright field illumination system that directs diffuse bright field illumination into the first field of view, the diffuse bright field illumination being optimal for barcode reading within a center zone of the first field of view, and a bright field illumination system that directs bright field illumination into the first field of view, the bright field illumination being optimal for barcode reading within a far zone of the first field of view. Using the estimated barcode distance to select the illumination sub-system may include selecting the dark field illumination system if the estimated barcode distance is within the near zone of the first field of view, selecting the diffuse bright field illumination system if the estimated barcode distance is within the center zone of the first field of view, and selecting the bright field illumination system if the estimated barcode distance is within the far zone of the first field of view.

Alternatively or additionally, the camera may further include a second lens assembly positioned to image a second field of view onto a second image sensor section. The distance between the distinct features of the targeting illumination may only be determined with respect to the first field of view in the image.

A number of features are described herein with respect to embodiments of the invention; it will be appreciated that features described with respect to a given embodiment also may be employed in connection with other embodiments.

The invention includes the features described herein, including the description, the annexed drawings, and, if appended, the claims, which set forth in detail certain illustrative embodiments. These embodiments are indicative, however, of but a few of the various ways in which the principles of the invention may be employed.

BRIEF DESCRIPTION OF THE DRAWINGS

FIG. 12 illustrates a method that may be performed by a barcode reader in order to implement multi-lens ranging.

FIG. 13 illustrates another method that may be performed by a barcode reader in order to implement multi-lens ranging.

FIGS. 19A-C illustrate examples of calibration image frames taken at different calibration distances.

FIG. 19D is a composite of the calibration image frames shown in FIGS. 19A-C.

FIGS. 21A-D illustrate different examples of fiducial offset data.

FIG. 27 illustrates a method that may be performed by a barcode reader in order to implement ranging with a targeting illumination system.

FIG. 28 illustrates another method that may be performed by a barcode reader in order to implement ranging with a targeting illumination system.

DETAILED DESCRIPTION

The present disclosure relates to a barcode reader for imaging a barcode using diffuse light. The barcode reader illuminates a barcode using an illumination system including an optical substrate. Light introduced into the optical substrate by at least one light source propagates between a front major surface and a back major surface in a direction transverse to an optical axis of a camera. Light is mixed by total internal reflection as its travels within the optical substrate and one or more extraction features included in the optical substrate allow light to be removed from the optical substrate in a directed intensity pattern. By allowing the light to mix as it propagates within the optical substrates, the propagating light loses any structure imparted onto it by the one or more light sources. By illuminating the barcode with unstructured light, it is possible to more accurately and quickly read the information contained in the imaged barcode.

Figure 1:
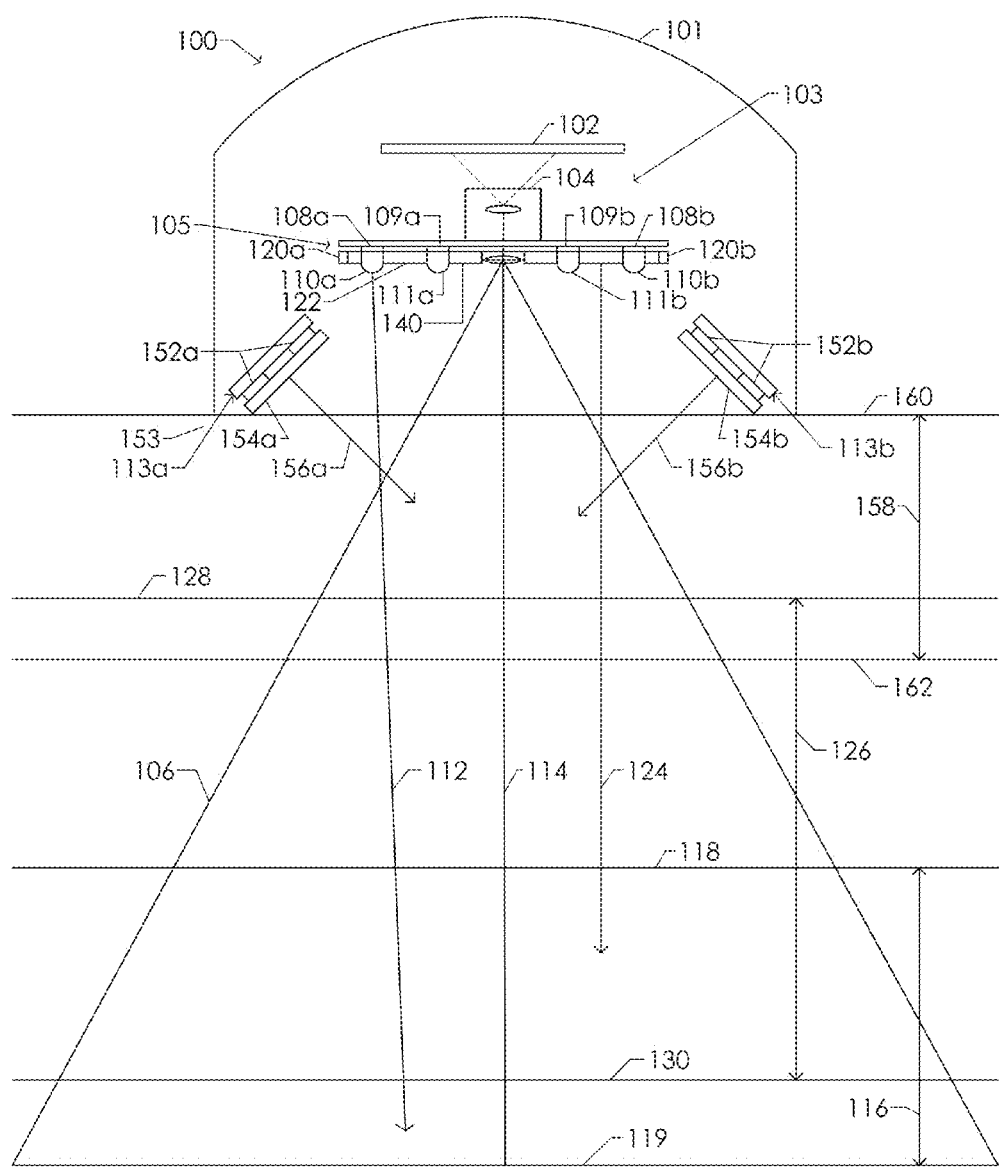
FIG. 1 is a top-down view of a barcode reader in accordance with the present disclosure.

FIG. 1 is a top-down view of a barcode reader 100 in accordance with the present disclosure. The barcode reader 100 includes a housing 101, a camera 103, and an illumination system 105. The barcode reader 100 illuminates a barcode with the illumination system 105 and captures an image of the barcode using the camera 103.

The camera 103 is located within the housing 101 and is configured to capture an image of a barcode within a field of view 106 of the camera 103. The field of view 106 of the camera 103 is directed along an optical axis 114 of the camera 103. The camera may include a photo sensor array 102 and a lens 104 that focuses illumination reflected from objects (e.g., a barcode) within the field of view 106 onto the photo sensor array 102. The optical axis of the camera 103 may be the optical axis of the lens 104. The camera 103 may be located near a center of the optical substrate 122 in one or more of the vertical dimension and the horizontal dimension.

As will be understood by one of ordinary skill in the art, the camera 103 may comprise any device capable of capturing an image of a field of view. For example, the photo sensor array 102 may comprise any detector capable of measuring or quantifying light incident on the pixel array of the detector. The detector may comprise, for example, an image sensor, CCD sensor, CMOS sensor, or any device capable of measuring or quantifying light incident on the pixel array of the detector. Similarly, the lens may comprise a single lens or series of lenses capable of focusing light onto the photo sensor array 102. Further details regarding specific embodiments of the camera 103 are discussed below.

The illumination system 105 is configured to illuminate the barcode while the camera 103 captures an image of the barcode. The illumination system 105 includes at least one light source 120 and an optical substrate 122 including one or more extraction features. The optical substrate 122 has a front major surface 140 and a back major surface 138 arranged generally perpendicular to the optical axis 114. Light is introduced from the at least one light source 120 between the front major surface 140 and the back major surface 138 (FIGS. 3A-3F and 4A-4C). The introduced light is transferred by total internal reflection through the optical substrate 122 between the front major surface 140 and back major surface 138 in a direction transverse to the optical axis 114. For example, in FIG. 1, light propagates through the optical substrate 122 in a directional generally perpendicular to the optical axis 114. In an alternative embodiment depicted in the cross sectional views of the optical substrate 122 of FIGS. 3B and 3C, the at least one light source 120 introduces light into the optical substrate 122 through the back major surface 138. In this example, the optical substrate 122 has a chamfered surface 125 that reflects light 191 through total internal reflection towards the optical axis 114.

Figure 2A:
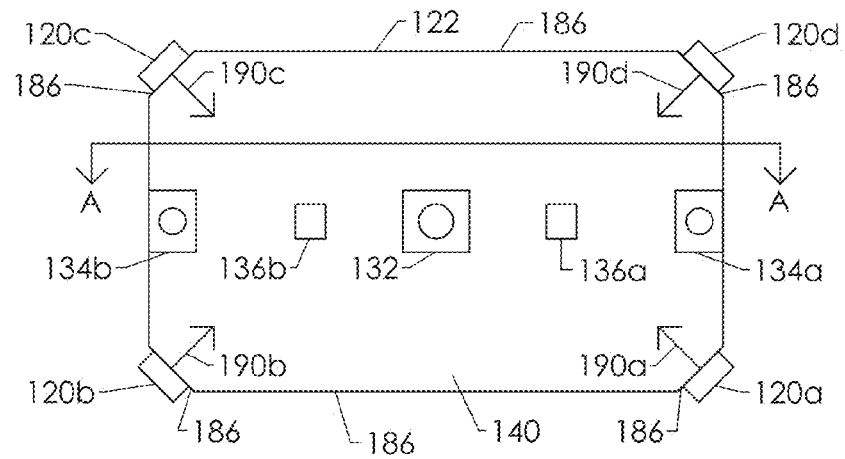
FIGS. 2A-2E are front views of different embodiments of an optical substrate within the barcode reader shown in FIG. 1.

As shown in FIG. 1, the front view of the optical substrate 122 shown in FIG. 2A, and the cross sectional views of the optical substrate 122 shown in 3A, and 3D to 3H the at least one light source 120 may be positioned adjacent an edge 186 of the optical substrate 122. In this configuration, as shown in FIG. 2A, light may exit the at least one light source 120 through a single light emitting surface (light leaving the light emitting surface is represented by arrows 190a-d).

Figure 2B:
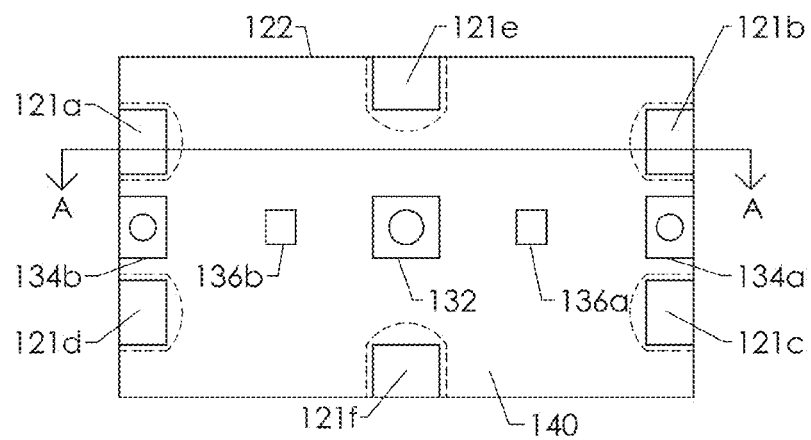
Figure 3A:
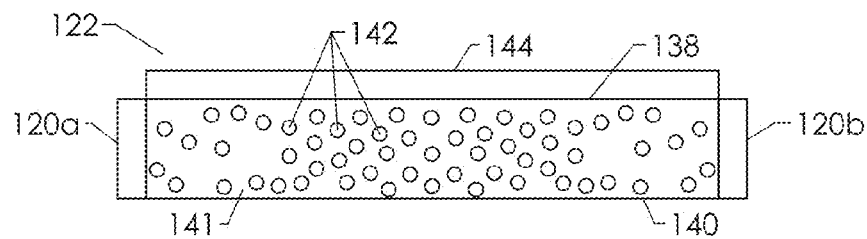
FIGS. 3A-3F illustrates cross-sectional views of different embodiments of the optic, taken along line A-A in FIGS. 2A-2C.
Figure 3B:
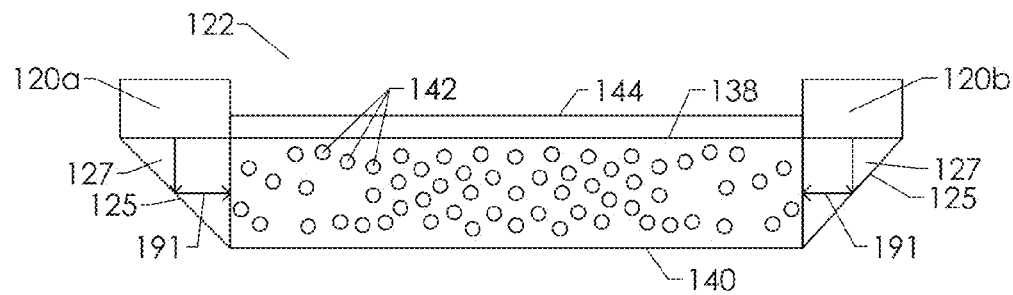
Figure 3C:
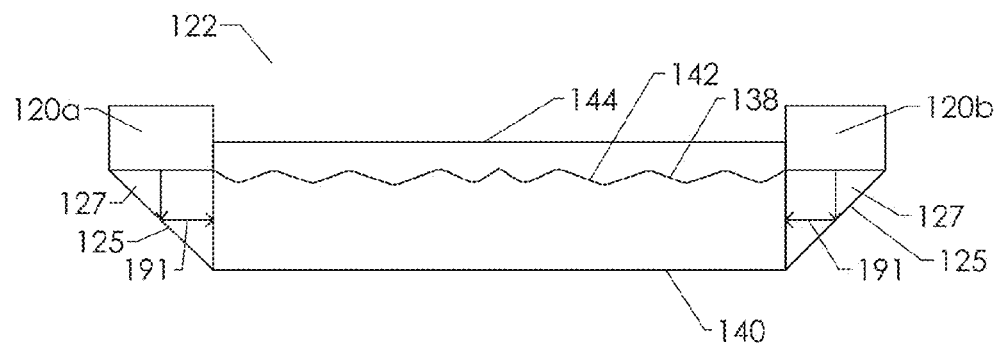

Alternatively, as shown in FIG. 2B the front view of the optical substrate 122 shown in FIG. 2B, and the cross sectional views of the optical substrate 122 shown in FIGS. 3B and 3C, the at least one light source 120 may be positioned on the back major surface 138 at locations 121a-d. In this configuration light may exit the at least one light source 120 through a single light emitting surface (light leaving the light emitting surface) and be reflected from the chamfered edge 125 and directed towards the optical axis in direction 191.

Figure 2C:
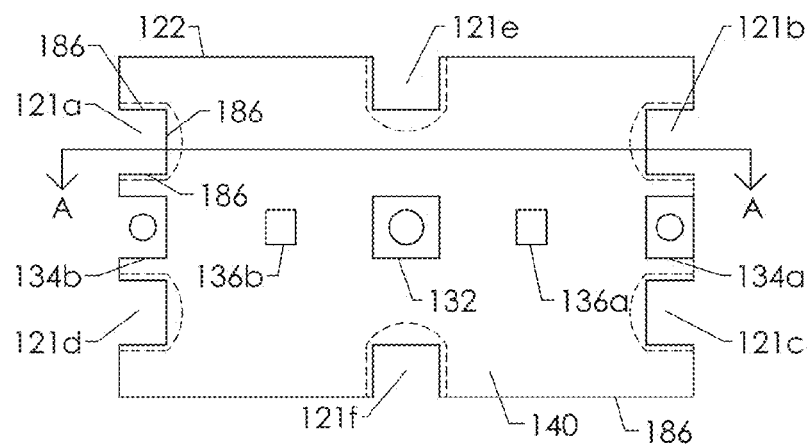

Alternatively, as shown in FIG. 2C, the at least one light source 120 may be positioned within a recess 121 in the optical substrate 122. In this example, the at least one light source 120 may emit light from multiple light emitting surfaces and the light from all of the light emitting surfaces may enter the optical substrate 122.

Figure 2D:
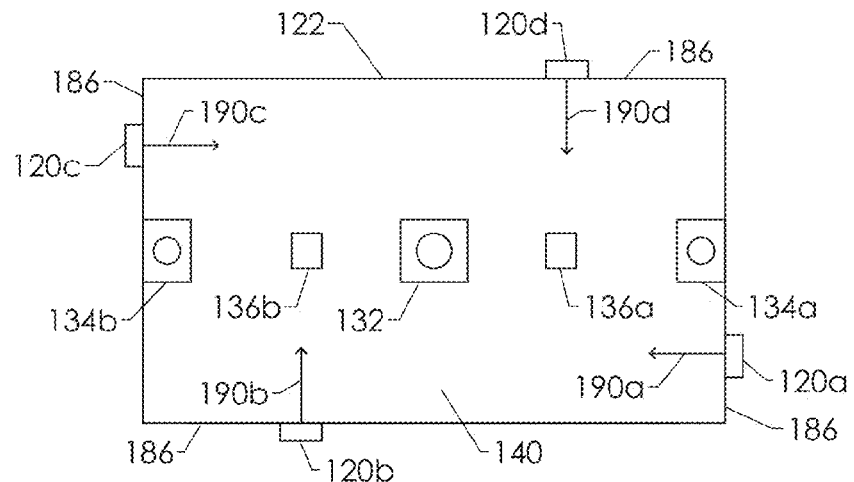

Referring briefly to FIG. 2D, the at least one light source 120 may be reduced to four (4) light sources, each of which is arranged on one exterior edge of the substrate 122 at a location that is not centered on the edge. For example, light source 120a may be on a side edge lower than center while light source 120c may be on the opposing side higher than center. Light source 120d may be on the top edge to the right of center which light source 120b may be on the bottom edge to the left of center.

Referring to FIGS. 1 and 2A, the one or more light sources 120 may comprise multiple LEDs 120a-d. As will be understood by one of ordinary skill in the art, the one or more light sources 120 may comprise any suitable light emitting device. Further, the multiple light sources 120 may emit illumination with different characteristics. For example, a portion of the light sources 120 may be white LEDs while another portion may be red LEDs, or LEDs of another color.

As shown in FIG. 1, the optical substrate 122 may comprise a substantially flat plate. For example, the optical substrate 122 may comprise a clear and colorless acrylic substrate which may be made from any other material suitable for transferring light by total internal reflection. The optical substrate 122 may be positioned within the reader 100 so that a front major surface 140 and a back major surface 138 of the optical substrate 122 are located in a plane that is substantially perpendicular to the optical axis 114. In one embodiment, "substantially perpendicular" means within five degrees of perpendicular while in an alternative embodiment substantially perpendicular means within 15 or 20 degrees of perpendicular.

The light emitted from the optical substrate 122 may have different characteristics depending on the characteristics of the optical substrate 122. For example, the optical substrate 122 may utilize refraction, diffusion, prismatic effect, and/or total internal reflection to direct more diffuse illumination 124 into the field of view 106. Depending on the properties of the optical substrate 122 and the at least one light source 120, the illumination system may be referred to as a diffuse bright field illumination system. The diffuse bright field imaging system may also be called a midfield illumination system or a medium field illumination system.

In one embodiment, the light emitted from the optical substrate 122 may be emitted substantially parallel to the optical axis 114. For example, light may be emitted within 10 degrees of parallel to the optical axis 114. Illumination having a smaller angle spread around the optical axis 114 may be referred to herein as diffuse bright field illumination 124.

Figure 4A:
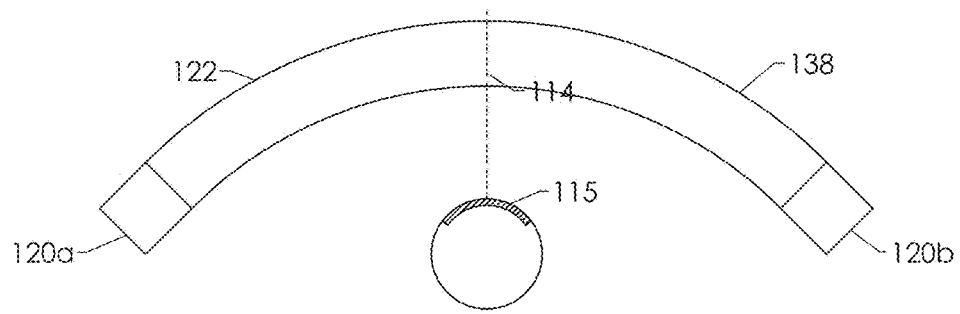
FIGS. 4A-4C are cross-sectional views of alternative embodiments of the optical substrate.
Figure 4B:
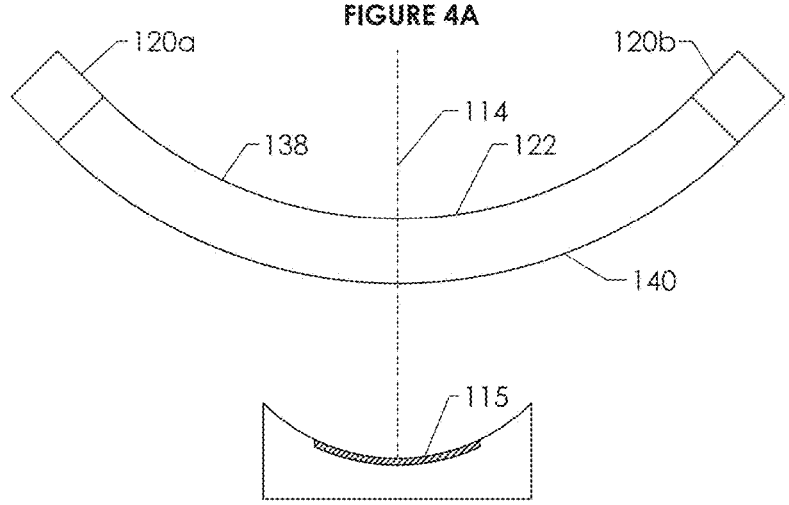
Figure 4C:
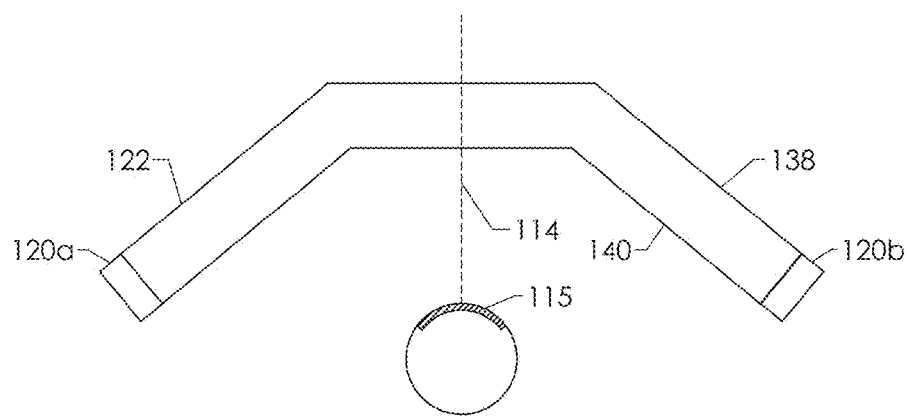

Alternatively, referring to FIGS. 4A to 4C, the optical substrate 122 may be shaped such that the shape of the front major surface 140 and/or the back major surface 138 is concave, convex, parabolic, or some combination thereof. For example, as shown in FIG. 4A, the optical substrate 122 has a generally concave shape front major surface 140 and a convex shaped back major surface 138, while in FIG. 4B, the optical substrate 122 has a generally convex shape front major surface 140 and a concave shaped back major surface 138. The shape of at least one of the front major surface and the back major surface need not be symmetrical, but may be asymmetrical about a plane perpendicular to the optical axis 114. In FIG. 4C, the front major surface 140 may include three generally planar sections with the central section being generally perpendicular to the optic axis 114 and two generally planar sections adjacent to, and on opposing sides, of the central section being at an angle relative to the optic axis. In one embodiment the angle may be no greater than 45 degrees. In this embodiment the back major surface 138 may also include corresponding sections with the central section being generally perpendicular to the optic axis 114 and two generally planar sections adjacent to, and on opposing sides, of the central section being at an angle relative to the optic axis. In one embodiment, the angle of the two opposing sides of the back major surface 138 may be the same angle as the two opposing sides of the front major surface 140. In another embodiment the angle may be different.

The light emitted by the configurations shown FIGS. 4A 4C may be emitted at different angles relative to the optical axis compared to the illumination system 105 depicted in FIG. 1. The illumination system 105 with these configurations is a diffuse bright field illumination system providing uniform illumination for barcodes applied to a concave/convex surface.

In embodiments in which the illumination system 105 emits diffuse light, the illumination may be optimal for reading a barcode that has a reflective surface that is located in a near zone 158 and/or a center zone 126 of the field of view 106. The center zone 126 may begin at a center zone starting boundary 128 and end at a center zone ending boundary 130. The center zone starting boundary 128 is closer to the reader 100 than a far zone starting boundary 118. For example, the center zone starting boundary 128 may be located approximately 25 mm away from the reader 100. The center zone ending boundary 130 may be located within the far zone 116. Thus, the center zone 126 and the far zone 116 may overlap.

As discussed, the optical substrate 122 may be positioned between the one or more light sources 120. For example, as shown in FIGS. 1, and 2A the one or more light sources 120 may be located along an edge 186 of the optical substrate 122 that is located between the front major surface 140 and the back major surface 138. The one or more light sources 120 introduce light into the edge 186 of the optical substrate. In FIG. 1, light is introduced from the one or more light sources 120 into the optical substrate 122 in a direction generally perpendicular to the optical axis 114 and generally towards the optical axis 114.

For example, as shown in FIG. 3B the one or more light sources 120 may be located along an edge of the back major surface 138 of the optical substrate 122 with the chamfered edge 125 reflecting illumination in a direction between the front major surface 140 and the back major surface 138 in a direction generally perpendicular to the optical axis 114 and generally towards the optical axis 114.

Figure 2E:
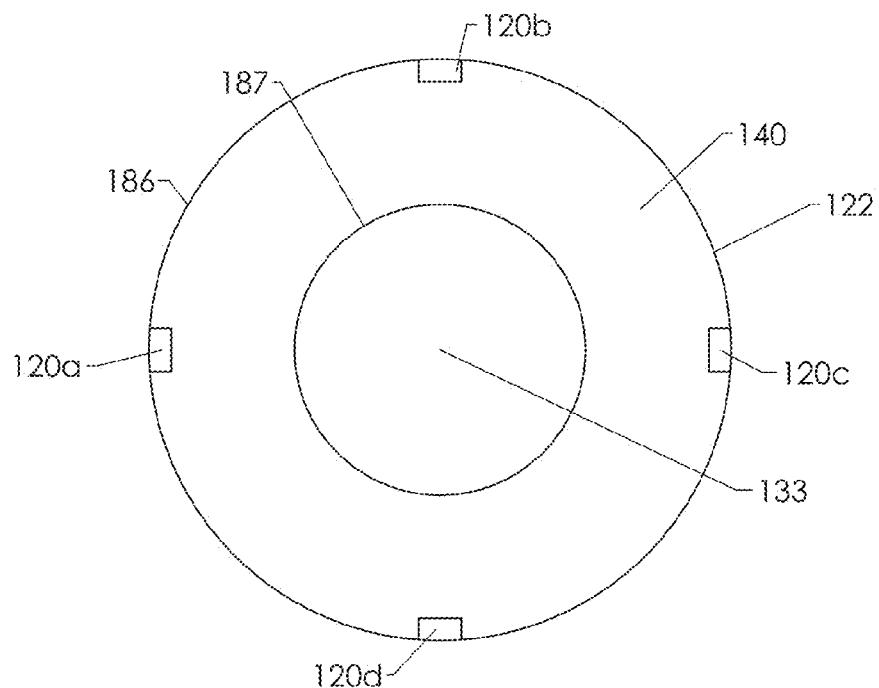

The center of the optical substrate 122 may include an opening 133 or an aperture 132 through which objects (such as a barcode) within the field of view 106 may be visible to the lens 104 and the photo sensor array 102. As shown in FIGS. 2A, 2B, and 2C, the aperture may be rectangular and of sufficient size such that the optical substrate 122 is not within the field of view 106 of the camera 103. As shown in FIG. 2E, the optical substrate 122 may have an approximately annular shape where the center opening 133 of the annular optical substrate 122 is circular and of sufficient size such that the optical substrate 122 is not within the field of view 106 of the camera 103.

With continued reference to FIG. 2C, the optical substrate 122 may have an annular shape that includes an outer edge 186 and an inner edge 187. In the depicted embodiment multiple light sources 120a-d are positioned on the back major surface 140 of the optical substrate 122 and input light into the optical substrate 122 through the back major surface 140. For example, the light sources 120a-d may be positioned as shown in FIG. 3B or 3C. In FIGS. 3B and 3C, the light sources 120a-d input light through the back major surface 140 in a direction approximately parallel to the optical axis 114. After entering the optical substrate 122, the light is reflected by a chamfered surface 125 of the outer edge 186. The chamfered surface 125 is configured to reflect light onto a path relatively perpendicular to the optical axis 114. In another embodiment (not shown) in which the optical substrate has an annular shape, light enters the optical substrate 122 through the outside edge 186 in a direction approximately perpendicular to the optical axis 114.

To prevent the optical substrate 122 from functioning simply as a light pipe or light guide, the optical substrate 122 includes one or more extraction features 142 configured to extract light from the optical substrate 122 and into the field of view 106. The extraction features 142 may introduce a variation in the index of refraction (i.e., a location of non-uniform index of refraction) of the optical substrate 122. Each extraction feature 142 functions to disrupt the total internal reflection of the propagating light that is incident on the extraction feature.

As described above with respect to FIGS. 2A and 2D, the illumination 190a-d directed into the edge 186 of the optical substrate 122 generally propagates through the optical substrate 122 due to total internal reflection. Any illumination 190a-d that is incident on the one or more extraction features 142 may be diffused with a first portion being diffused at an angle such that the illumination continues propagating within the optical substrate 122 (based on total internal reflection) and a second portion may be diffused at an angle (i.e., an escape angle) that overcomes total internal reflection, "escapes" the surface, and is directed into the field of view 106.

The extraction of illumination through the front major surface introduced by the extraction features 142 may comprise at least one of: i) one or more particles within the substrate 122, ii) a planar surface within the optical substrate 122, iii) a variation in the surface topography of the back major surface 138, and iv) a variation in the surface topography of the front major surface 138. For example, in FIGS. 3A and 3B, the optical substrate 122 is embedded with particles 142 having an index of refraction greater or less than the optical substrate 122. As light travels from the edge 186 of the optical substrate 122 through total internal reflection towards a center of the optical substrate 122, the particles 142 disrupt the total internal reflection of the light, causing a portion of the propagating light to exit through the front major surface 140.

The extraction features 142 may be configured to extract light in a defined intensity profile over the front major surface 140, such as a uniform intensity profile, and/or a defined light ray angle distribution. In FIG. 3A, the one or more extraction features 142 are distributed non-uniformly throughout the optical substrate 122. In this example, the one or more extraction features 142 are distributed throughout the optical substrate such that light is uniformly emitted from the front major surface 140 of the optical substrate 122. For example, the extraction features 142 may be spread throughout the optical substrate 122 in concentrations that increase with distance from the at least one light source 120.

Alternatively, in FIG. 3B, the one or more extraction features 142 may be distributed uniformly or non-uniformly throughout the optical substrate. In this example, the one or more extraction features are distributed throughout the optical substrate such that light is not uniformly emitted from the front major surface 140 of the optical substrate 122. Instead the light is emitted from the front major surface 140 in a desired intensity pattern. While not shown, the one or more extraction features 142 may be distributed in alternative patterns that result in the light being emitted from the front major surface 140 of the optical substrate 122 having a more structured appearance (i.e., a non-uniform intensity pattern).

Figure 3D:
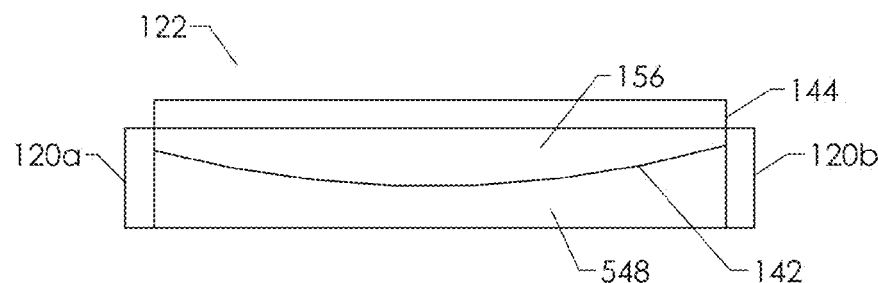
Figure 3E:
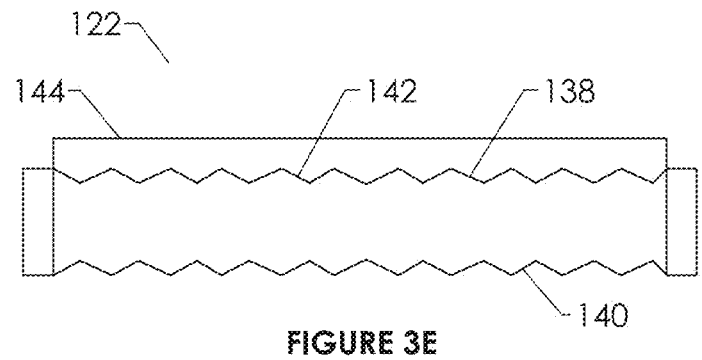

As shown in FIGS. 3C and 3E, the extraction features 142 may also comprise a surface variation in the topography of at least one of the front major surface 140 and the back major surface 138. In the depicted embodiment of FIG. 3C, the one or more extraction features 142 comprise variations in the back major surface 138 of the optical substrate 122. In this example, the front major surface 140 of the optical substrate 122 is smooth and planar, while the back major surface 138 includes a topography of convex and concave indentations and protrusions. In the depicted embodiment of FIG. 3E, both the back major surface 138 and the front major surface 140 include extraction features 142 comprising convex and concave indentations and protrusions.

These embodiments are configured to result in a homogenous output of light from the front major surface 140.

The convex and concave indentations and protrusions may be: i) features 142 with specific optical properties, such as micro lenses formed by, for example, molding or laser cutting; or ii) features 142 with no specific optic properties (i.e. random) such as a roughened surface formed by any of a textured tool or sanding of the surface after molding. Further, the shape, density, or other optical properties of the extraction features 142 may increases with distance from the light source 120a-d in order to produce uniform illumination from the optical substrate.

Figure 3F:
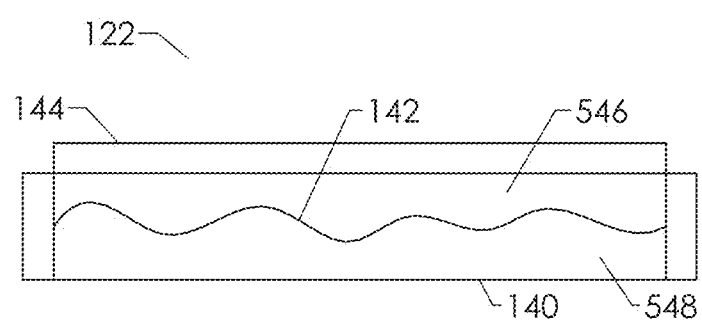

Turning to FIGS. 3D and 3F, the one or more extraction features 142 comprise a surface within the optical substrate 122. In this embodiment, the optical substrate 122 may be made of two different materials 546, 548. These materials 546, 548 may have different indices of refraction, and they may be in contact with one another. In FIG. 3E, the contact is along a surface forming the one or more extraction features 142. In FIG. 3F the contact is along a surface of convex and concave shapes, either patterned or random. Refraction at the one or more extraction features 142 directs illumination towards the front major surface 140 of the optical substrate 122 at an angle where the illumination exits the front major surface 140 towards the field of view 106. As a variation to these embodiments, the materials 546, 548 may have the same index of refraction, but a material with a different index of refraction may be sandwiched between the materials 546, 548 at the non-planar contact surface 550.

As will be understood by one of ordinary skill in the art, the optical substrate 122 and the extraction features 142 are not limited to these described embodiments. Other embodiments of the optical substrate 122 including extraction features 142 are also within the scope of the present disclosure.

In all of these embodiments, to further increase the quantity of illumination exiting through the front major surface 140, a reflective backing 144 may be applied to the back major surface 138. The reflective backing 144 may be applied uniformly such that it covers the entire back major surface 138. The reflective backing 144 reduces the amount of light that escapes through the back major surface 138 by reflecting light back inward into the optical substrate 122. In another embodiment, a cladding film (not shown) having an index of refraction less than the index of refraction of the optical substrate 122 is adjacent the back major surface 138. The cladding film reduces the amount of light that escapes by reflecting light inward through total internal reflection.

Similarly, all edges and surfaces of the optical substrate 122 (except for the edges 186 where the one or more light sources 120a-d project illumination into the optical substrate 122) may also be coated with a reflective backing 144.

Depending on the properties of the illumination system 105, the light emitted by the illumination system 105 from the one or more light sources 120 may not be sufficiently bright to provide optimal illumination for reading a barcode that is located farther away from the reader 100 than the center zone ending boundary 130. For this reason, as shown in FIG. 1, the illumination system may comprise at least one secondary light source 108. The at least one secondary light source 108 may be referred to as a direct bright field illumination system or a far field illumination system. Light from the at least one secondary light source 108 that is emitted by the illumination system 105 may converge at a point on the optical axis 114 that is different from the point along the optical axis 114 that light from the at least one light source 120 converges. For example, the light may be emitted by the illumination system 105 at an angle closer to parallel to the optical axis 114, for example at a convergence angle of approximately 70 degrees) than the light from the at least one light source 120 that is emitted by the illumination system 105.

The at least one secondary light source may comprise one or more LEDs 108a-b, which may be positioned behind refracting and/or diffusing optics 110a-b. The one or more secondary light sources 108a-b may direct illumination 112 into the field of view 106 substantially parallel to the optical axis 114 but with a slight convergence angle. For example, the one or more secondary light sources 108a-d may direct illumination into the field of view 106 at an angle from 0-30 degrees from the optical axis 114. This illumination 112 may be referred to herein as direct bright field illumination 112 or far field illumination. As indicated above, the optical axis 114 is a line originating from the center of the focusing lens 104 and extending outward into the center of the field of view 106.

Light emitted by the illumination system from the at least one secondary light source may be better suited for reading a barcode with a diffuse surface such as a paper label. Light emitted by the illumination system from the at least one secondary light source may also be optimal for reading a barcode that is located in a far zone 116 of the field of view 106, i.e., an area of the field of view 106 that is relatively far away from the reader 100. In other words, light from the at least one secondary light source may have sufficient intensity to illuminate a barcode that is located within the far zone 116. The far zone 116 may begin at a far zone starting boundary 118 and end at a far zone ending boundary 119. In one implementation, the far zone starting boundary 118 may be located about 75 mm away from the reader 100. The bright field illumination 112 may not be sufficiently diffuse to provide optimal illumination for reading a barcode that has a reflective surface. For longer range reading, the illumination system may additionally comprise a focus lens associated with the at least one secondary light source in order to provide illumination for reading a barcode that is located farther away from the reader 100 than the far zone ending boundary 119.

The optical substrate 122 may further include apertures 134a-b that permit the direct bright field illumination 112 (from the at least one secondary light source 108a-b) to be directed into the field of view 106 without being affected by the optical substrate 122. Further yet, the optical substrate 122 may include apertures 136a-b that permit targeting illumination from targeting light sources 109a-b (FIG. 1) mounted behind the optical substrate 122 to be projected into the field of view 106 without being affected by the optical substrate 122.

The secondary light source may include secondary light sources 108a, 108b mounted within the housing 101. Secondary light sources 108a, 108b are the interior of the housing 101 and may be behind tertiary light sources 152a-b (discussed herein) which are behind diffusors 154a, 154b. The secondary light sources 108a, 108b may be in front of the tertiary light sources 152a, 152b. As will be discussed with respect to FIG. 6, the secondary light sources may also be positioned in front of the illumination sources 120a, 120b but behind the tertiary light sources 152a-b.

The surfaces of the apertures 132, 134a-b, 136a-b within the optical substrate 122 may be coated with an opaque reflective material (not shown). This material may cause illumination within the optical substrate 122 that is incident on the surface of a particular aperture to be reflected back into the optical substrate 122 regardless of its angle of incidence. Reflecting illumination back into the optical substrate 122 prevents illumination from exiting the optical substrate 122 through the surface of any aperture at an angle where it would illuminate the region behind the optical substrate 122, such as directly illuminating the lens 104 and degrading the quality of the image of an object within the field of view 106.

Referring again to FIG. 1, the illumination system 105 may also include at least one tertiary light source 152. Light from the at least one tertiary light source 152 may be emitted by the illumination system 105 at an angle closer to perpendicular to the optical axis 114 than the light from either of the at least one light source 120 or the at least one secondary light source 108 that is emitted by the illumination system 105. The at least one tertiary light source 152 may comprise multiple LEDs 152a-b. Additional optics 154a-b may also be associated with the at least one tertiary light source 152 to direct illumination to the field of view 106. The additional optics 154a-b may utilize refraction, diffusion, prismatic effect, and/or total internal reflection to direct illumination 156a-b into the field of view 106.

The at least one tertiary light source 152 may be referred to as a dark field illumination system or a near field illumination system. Light emitted by the illumination system from the at least one tertiary light source may be referred to herein as dark field illumination 156a-b. Light from the at least one tertiary light source may be emitted by the illumination system (i.e., the dark field illumination 156a-b) at an angle no more than 45° from a plane perpendicular to the optical axis 114.

The dark field illumination 156a-b may be optimal for reading a barcode that is located within a close zone 158 of the field of view 106. The close zone 158 may begin at a close zone starting boundary 160 and may end at a close zone ending boundary 162. The close zone starting boundary 160 may be closer to the reader 100 than the center zone starting boundary 128. The close zone starting boundary 160 may correspond to the face of the reader 100. The close zone ending boundary 162 may be within the center zone 126. Thus, the close zone 158 and the center zone 126 may overlap. However, the dark field illumination 156a-b may not be sufficiently bright to provide optimal illumination for reading a barcode that is located farther away from the reader 100 than the close zone ending boundary 162.

In the embodiment shown in FIG. 1, the at least one tertiary light source 152a-b is mounted on circuit boards at the sides of the reader housing 101. The optics 154a-b may comprise lenses, gratings, or diffusion material that diffuses the illumination 156a-b from the at least one tertiary light source 152.

Figure 5:
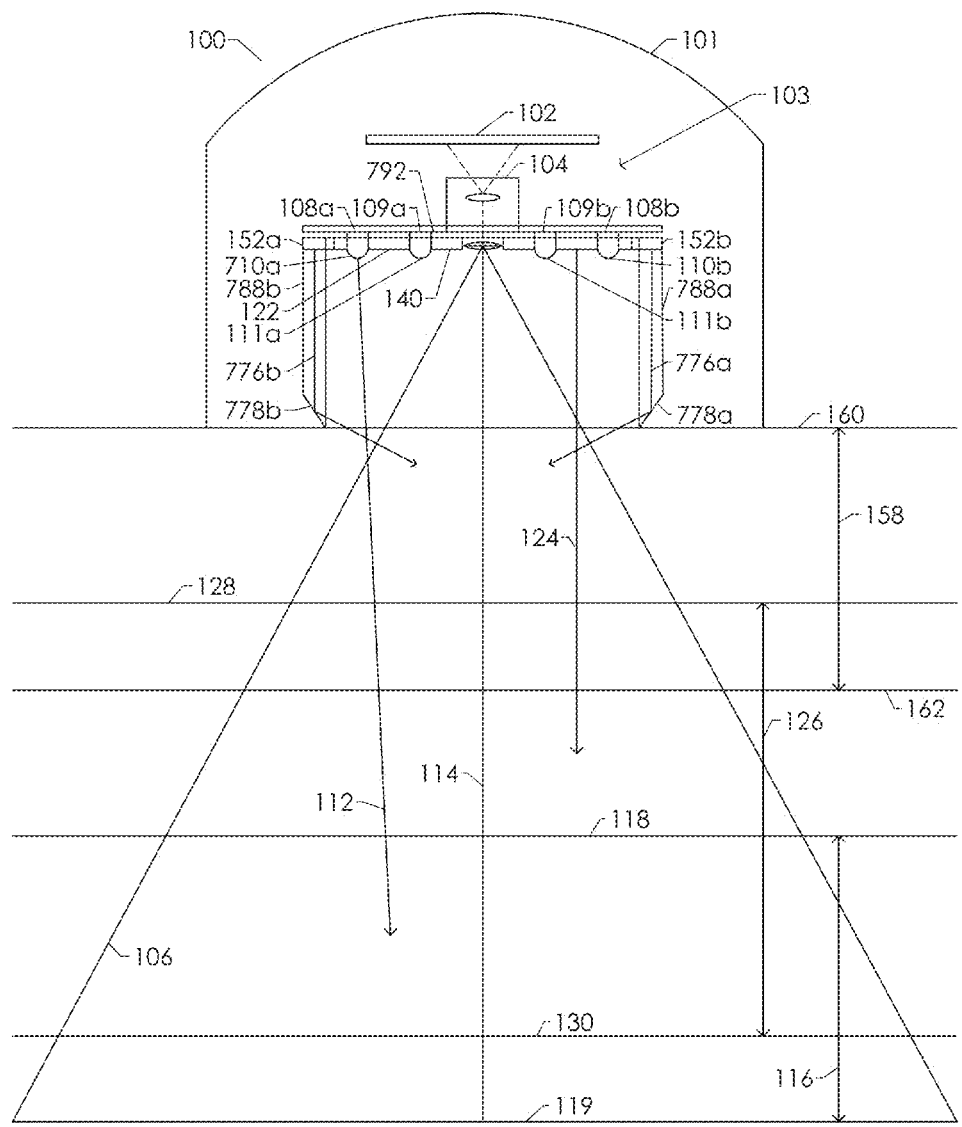
FIG. 5 is a top-down view of another embodiment of a barcode reader in accordance with the present disclosure.

With reference to FIG. 5, an alternative embodiment of the barcode reader 100 is depicted. In this embodiment, the at least one tertiary light source 152a-b is mounted on a circuit board 792 that is substantially perpendicular to the optical axis 114. Illumination 776a-b from the at least one tertiary light sources 152a-b is directed substantially parallel to the optical axis 114 toward prism optics 778a-b. More specifically, the at least one tertiary light source 152a-b may project illumination 776a-b into light pipes 788a-b, which use total internal reflection to propagate the illumination 776a-b toward the prism optics 778a-b. The prism optics 778a-b are used to re-direct the illumination 776a-b toward the field of view 106 at the desired angle.

The light pipes 788a-b may comprise chamfered ends 778a-b. These chamfered ends 778a-b may serve as the prism optics 778a-b that re-direct the illumination 776a-b toward the field of view 706. Each of the chamfered ends 778a-b may be angled such that total internal reflection redirects the illumination 776a-b at a non-zero angle (e.g., 45°) relative to the plane that is perpendicular to the optical axis 714. The illumination 776a-b may exit the light pipes 788a-b through the side facing the optical axis 714. It should be appreciated that the light pipes 778a-778b are shown in cross section and may be on each side of the camera (all four sides, left, right, top, bottom) or may even form an annular ring around the field of view of the camera.

Figure 6:
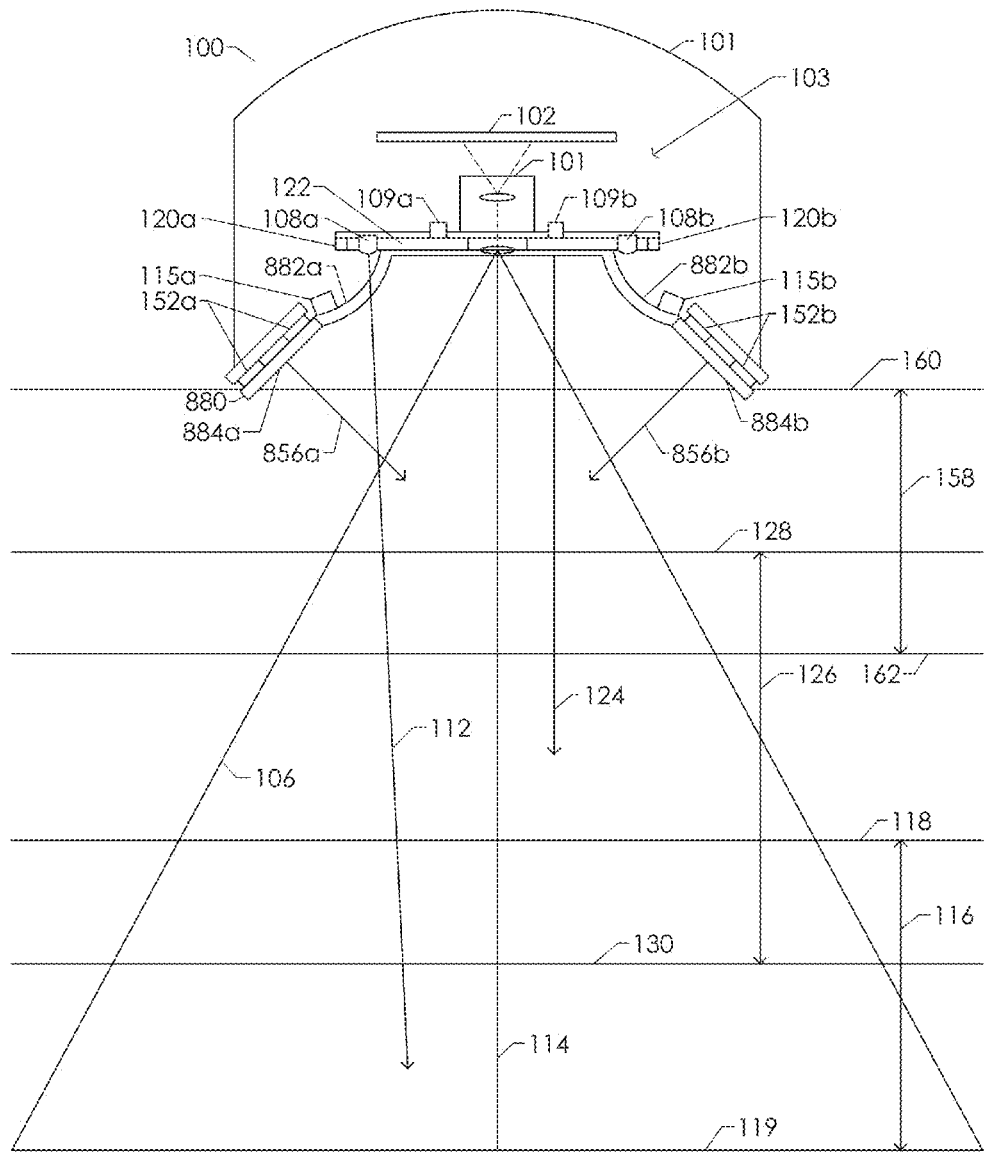
FIG. 6 is a top-down view of another embodiment of a barcode reader in accordance with the present disclosure.

Turning to FIG. 6, another embodiment of the barcode reader 100 is shown. In this embodiment, the optical substrate 880 forms a protective window over optical substrate 122 and replaces the optics 110a-b, and 154a-b of FIG. 1. In this example, the at least one tertiary light source 152 comprise LEDs 152a-b positioned behind diffusion regions 884a-b of the optical substrate 880. The diffusion regions 884a-b direct dark field illumination 856a-b from the LEDs 152a-b into the field of view 806. The curved regions 882a-b provide structural support for the diffusion regions 884a-b as well as focusing the illumination projected from secondary illumination sources 108a, 108b—or secondary illumination sources 115a, 115b.

Figure 7:
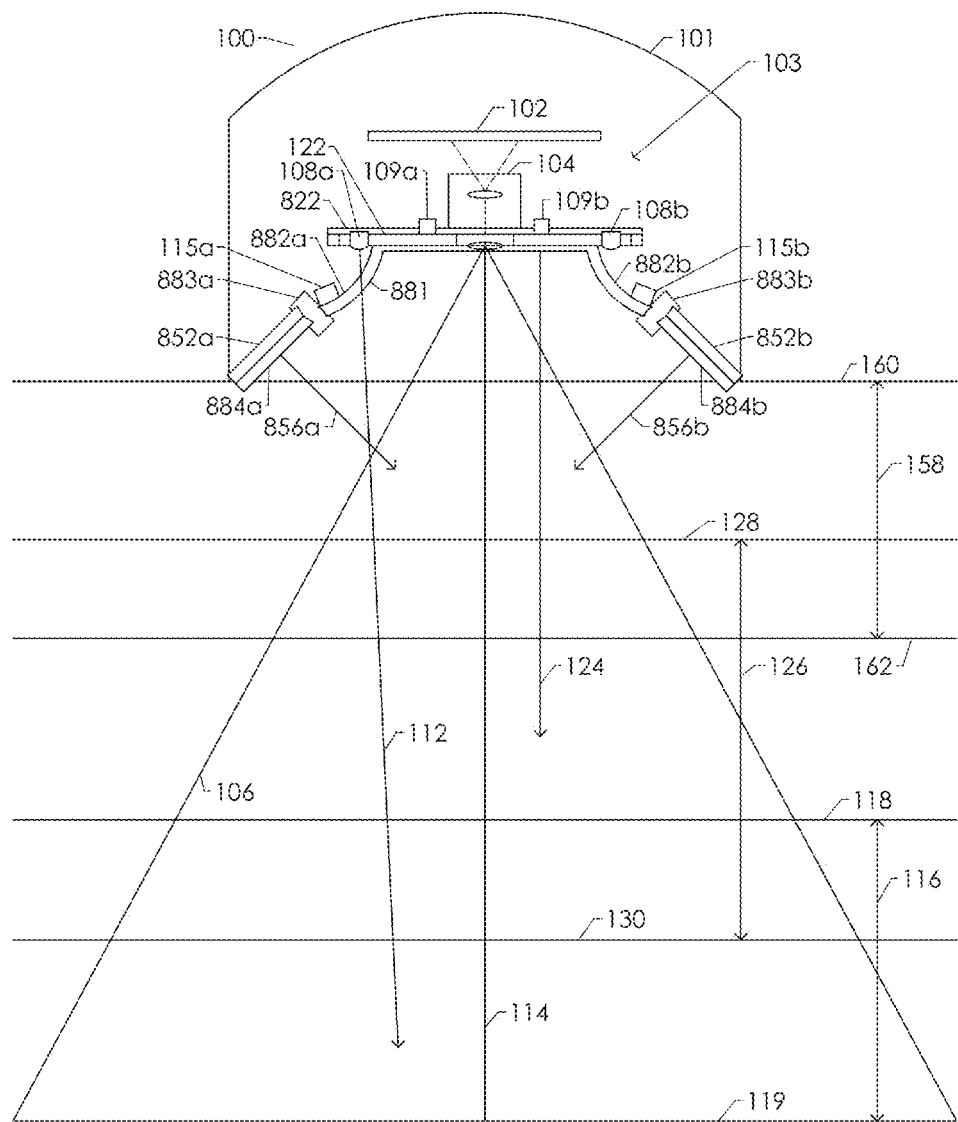
FIG. 7 is a top-down view of an additional embodiment of a barcode reader in accordance with the present disclosure.

Turning to FIG. 7, another embodiment of the barcode reader 100 is shown. In this embodiment, the optical substrate 881 forms a protective window over optical substrate 122 and replaces the optics 110a-b of FIG. 1.

Figure 8A:
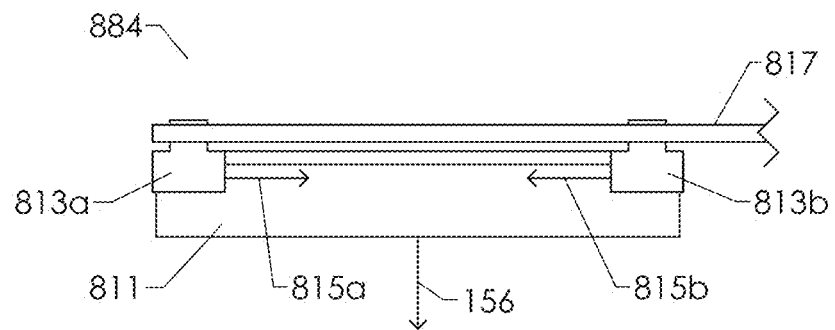
FIGS. 8A-8B are cross-sectional views of tertiary light sources illuminating the optical substrate in two embodiments of the barcode reader.

As shown in FIG. 8A, the illuminators 884 may include an optical substrate into which illumination 815a-b is projected by two side fire illuminators 813a-b. The illumination 815a-b is internally reflected within the substrate 811 and extracted as diffuse illumination 156 from the optical substrate 811. The optical substrate 811 may have any of the characteristics, and extraction features, as the optical substrate 122 as described with respect to FIGS. 1, 2A-D, 3A-F, and 4A-C, as well as reflective coatings such that illumination propagates between a front major surface and aback major surface of optic 811 and it extracted through the front major surface as illumination 156.

Figure 8B:
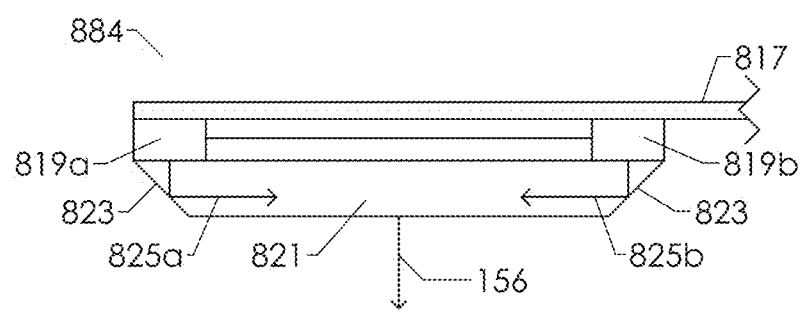

As shown in FIG. 8B, the illuminators 884 may include an optical substrate 821 into which illumination 825a-b is projected through the back major surface by two illuminators 819a-b. The illumination 825a-b is reflected from chamfered surfaces such that it propagates between the front major surface and the back major surface and is extracted as diffuse illumination 156 from the optical substrate 821. As with optical substrate 811, the optical substrate 821 may have any of the characteristics, and extraction features, as the optical substrate 122 as described with respect to FIGS. 1, 2A-D, 3A-F, and 4A-C, as well as reflective coatings such that illumination propagates between a front major surface and aback major surface of optic 811 and it extracted through the front major surface as illumination 156.

The diffusion regions 884a-b direct dark field illumination 856a-b from the LEDs into the field of view 806. The curved regions 882a-b provide structural support for and focusing the illumination projected from secondary illumination sources 108a, 108b—or secondary illumination sources 115a, 115b. Posts 883a and 883b provide structural support for the dark field illumination systems 884a-b and prevent illumination from entering into the curved regions 882a-b.

The previous discussion has been directed to a barcode reader that includes three different light sources: at least one secondary light source (a bright field illumination system—positioned at any of: i) closer to the field of view (i.e. in front of) than the tertiary light sources, ii) behind the tertiary light sources but in front of the diffuse bright field illumination sources; or iii) behind the diffuse bright field illumination sources and optical substrate 122), at least one light source (a diffuse bright field illumination system), and at least one tertiary light source (a dark field illumination system).

It should also be appreciated that each of these illumination sources may generate illumination with different characteristics. For example, the diffuse bright field illumination may be white LEDs (illumination with intensity across a wide spectrum of wave lengths) while the tertiary light source and the secondary light source may be red LEDs (i.e. intensity at 660 nm).

Another embodiment of the barcode readers discussed previously will now be described in relation to FIGS. 9-11. In this embodiment the camera assembly 103 (FIGS. 1 and 5, 6 and 7) includes a first lens assembly 1904a and a second lens assembly 1904b in place of the single lens 104 in the camera assembly 103.

In the following discussion, unless otherwise indicated, the term "field of view" may refer to the field of view of the first lens assembly 1904a, the second lens assembly 1904b, the image sensor 1902, and/or the barcode reader 1900.

Figure 9:
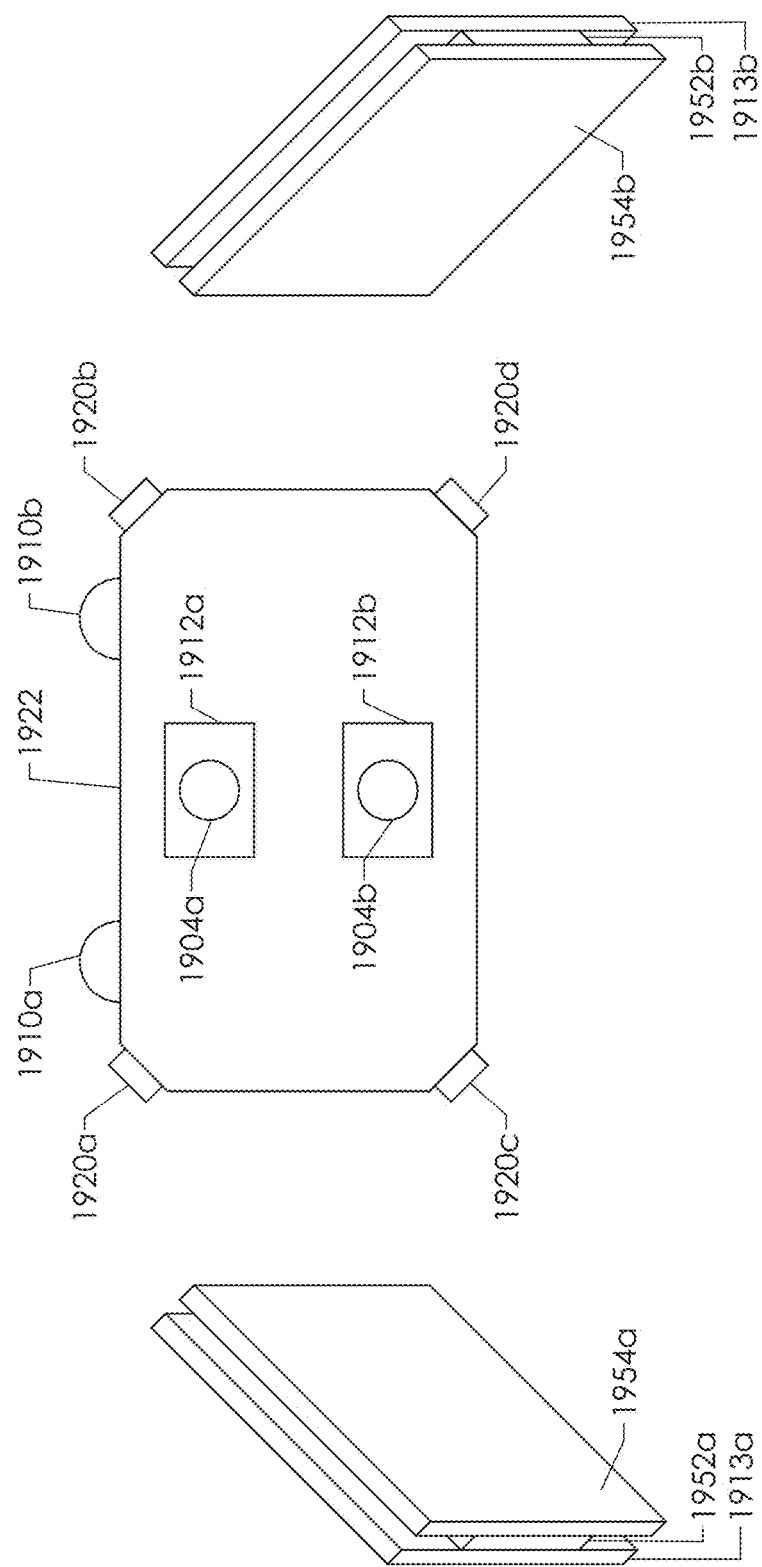
FIG. 9 illustrates a front view of a barcode reader in accordance with the present disclosure.

Reference is initially made to FIG. 9, which illustrates a front view of the barcode reader with this alternative embodiment camera assembly (referred to as barcode reader 1900). The barcode reader 1900 includes a dark field illumination system, a diffuse bright field illumination system and a bright field illumination system. (The bright field illumination system may alternatively be referred to as a direct bright field illumination system.) Each of these illumination systems directs illumination into the field of view. The illumination emitted by the dark field illumination system may be referred to herein as dark field illumination, and it may be similar to the dark field illumination systems described above in connection with FIGS. 1, 5, 6, 7, 8A, and 8B. The illumination emitted by the diffuse bright field illumination system may be referred to herein as diffuse bright field illumination, and it may be similar to the diffuse bright field illumination described above in connection with FIGS. 1, 2A, 2B, 2C, 2D, 2E, 3A, 3B, 3C, 3D, 3E, 3F, 4A, 4B, 4C, 5, 6, and 7. The illumination emitted by the bright field illumination system may be referred to herein as bright field illumination (and/or direct bright field illumination), and it may be similar to the bright field illumination 112 described above in connection with FIGS. 1, 5, 6 and 7.

The dark field illumination system includes a first set of illumination sources 1952a positioned behind optics 1954a, and a second set of illumination sources 1952b positioned behind optics 1954b as described in FIG. 1, adjacent to the optics as described in FIG. 8A and/or behind the optics as described in FIG. 8B. The diffuse bright field illumination system includes an optical substrate 1922 and illumination sources 1920a-d in the manner described with respect to FIGS. 1 and 2A. Alternatively the diffuse bright field illumination system may be any of the embodiments described in FIGS. 1, 2A, 2B, 2C, 2D, 2E, 3A, 3B, 3C, 3D, 3E, 3F, 4A, 4B, 4C, 5, 6, and 7. The bright field illumination system includes illumination sources (not shown) positioned behind refracting diffusors 1910a-b in the manner described with respect to FIG. 1. Alternatively the bright field illumination system may be any of the embodiments described in FIGS. 1, 5, 6, and 7.

The optics 1954a-b may utilize refraction, diffusion, prismatic effect, and/or total internal reflection to direct the dark field illumination 156 into the field of view. If the optics 1954a-b utilize diffusion, and if the optics 1954a-b are positioned in front of the illumination sources 1952a-b (as shown in FIG. 9), then the optics 1954a-b may be referred to as back lit diffusors or back lit illumination diffusors. If the optics 1954a-b utilize both refraction and diffusion, then the optics 1954a-b may be referred to as refracting diffusors.

The dark field illumination 156 and the bright field illumination 112 may have a first illumination spectrum, and the diffuse bright field illumination 124 may have a second illumination spectrum that is different than the first illumination spectrum. More specifically, the illumination sources 1952a-b of the dark field illumination system and the illumination sources of the bright field illumination system may emit electromagnetic radiation within a first range of wavelengths, and the illumination sources 1920a-d of the diffuse bright field illumination system may emit electromagnetic radiation within a second range of wavelengths. Thus, the dark field illumination system and the bright field illumination system may each illuminate at least part of the field of view with a first illumination spectrum, and the diffuse bright field illumination system may illuminate at least part of the field of view with a second illumination spectrum. The second illumination spectrum may be broader than the first illumination spectrum. For example, the first illumination spectrum may include electromagnetic radiation primarily from 650 nm to 700 nm, and the second illumination spectrum may include electromagnetic radiation primarily from 400 nm to 700 nm.

In one embodiment, an illumination spectrum includes electromagnetic radiation primarily within a specified range if at least 90% of the electromagnetic radiation within the illumination spectrum is within the specified range. In another embodiment, an illumination spectrum includes electromagnetic radiation primarily within a specified range if at least 75% of the electromagnetic radiation within the illumination spectrum is within the specified range. In another embodiment, an illumination spectrum includes electromagnetic radiation primarily within a specified range if a majority (i.e., more than 50%) of the electromagnetic radiation within the illumination spectrum is within the specified range.

Figure 10:
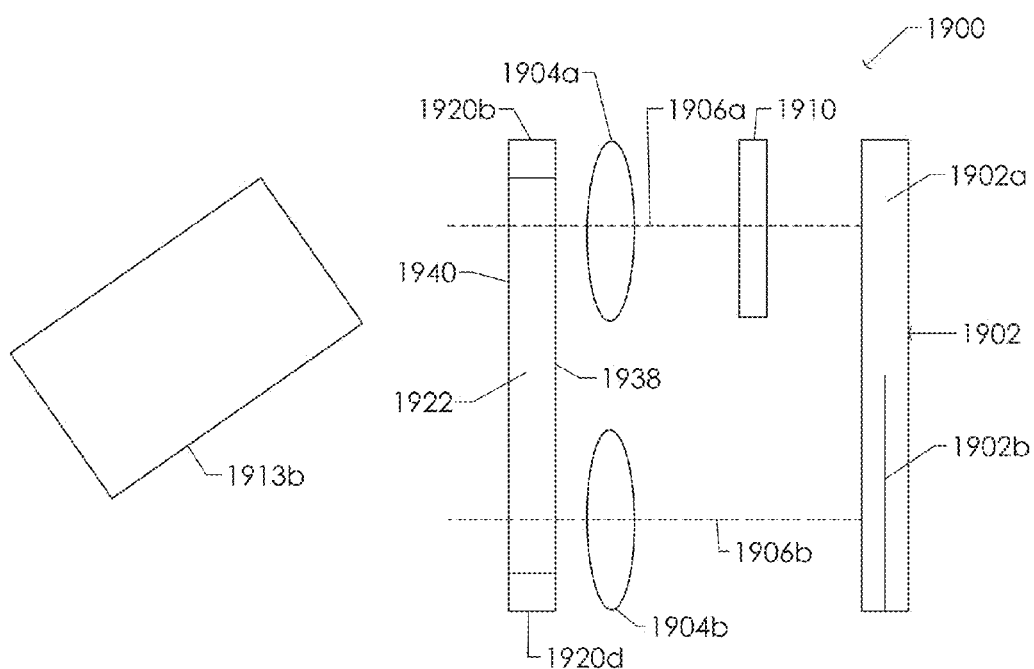
FIG. 10 illustrates a side view of the barcode reader shown in FIG. 9.

Reference is now made to FIG. 10, which illustrates a side view of the barcode reader 1900. As mentioned previously, the barcode reader 1900 includes a first lens assembly 1904a and a second lens assembly 1904b in place of the single lens 104 in the camera assembly 103. The lens assemblies 1904a-b may be focused to the same focal length.

In the depicted embodiment, the first and second lens assemblies 1904a-b each include a single optical lens. However, as used herein, the term "lens assembly" refers to a set of one or more optical lenses. Thus, in an alternative embodiment, the first lens assembly 1904a and/or the second lens assembly 1904b could include multiple optical lenses.

The barcode reader 1900 includes an image sensor 1902, which is configured to capture an image of an object (e.g., a barcode) that is positioned within the field of view. The lens assemblies 1904a-b each provide a corresponding image of the object (e.g., the barcode) on the image sensor 1902. There is a first optical path 1906a from the field of view through the first lens assembly 1904a to a first section (or portion) 1902a of the image sensor 1902. There is a second optical path 1906b (which is different from the first optical path 1906a) from the field of view through the second lens assembly 1904b to a second section (or portion) 1902b of the image sensor 1902. The first and second optical paths 1906a-b are substantially parallel to one another. The first lens assembly 1904a provides a first image of the object on the first section/portion 1902a of the image sensor 1902, and the second lens assembly 1904b provides a second image of the object on the second section/portion 1902b of the image sensor 1902.

Stated another way, the first lens assembly 1904a has a first field of view and a first optical path 1906a for illumination from the first field of view to project to a first section/portion 1902a of the image sensor 1902. The second lens assembly 1904b has a second field of view and a second optical path 190b for illumination from the second field of view to project to a second section/portion 1902b of the image sensor 1902.

Figure 11:
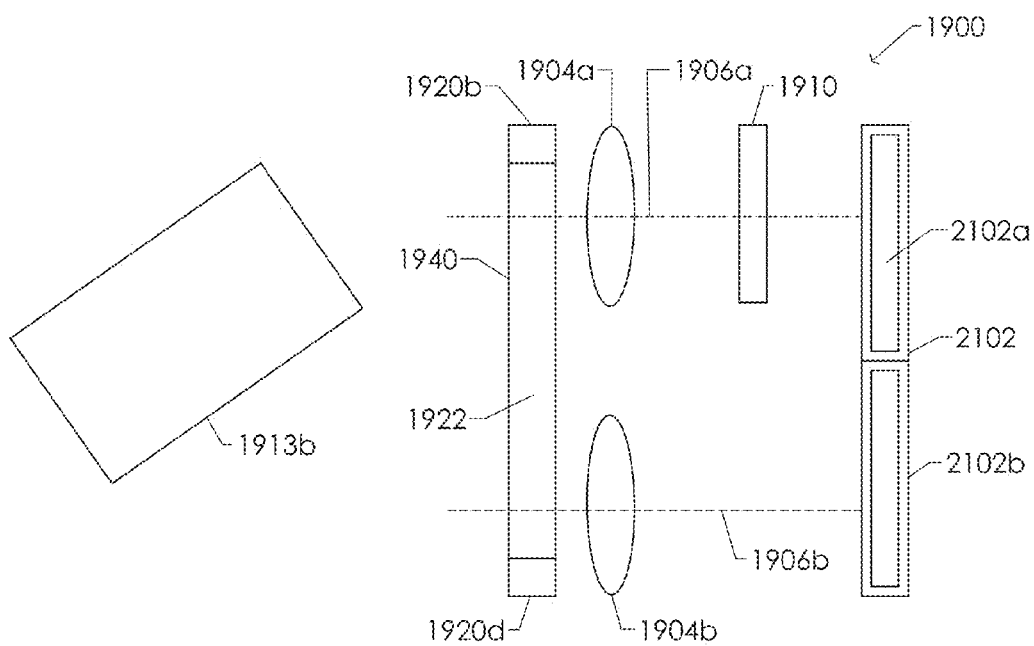
FIG. 11 illustrates a side view of an alternative embodiment of the barcode reader shown in FIG. 9.

Alternatively, as shown in FIG. 11, the barcode reader 1900 may include a first image sensor 2102a and a second image sensor 2102b, which may collectively be referred to as an image sensor 2102. The first image sensor 2102a may be considered to be a first section (or portion) of the image sensor 2102, and the second image sensor 2102b may be considered to be a second section (or portion) of the image sensor 2102. The first optical path 1906a may extend from the field of view through the first lens assembly 1904a to the first image sensor 2102a. The second optical path 1906b may extend from the field of view through the second lens assembly 1904b to the second image sensor 2102b.

Referring again to FIG. 9, the center of the optical substrate 1922 includes two openings 1912a-b through which an object (e.g., a barcode) within the field of view may be visible to the lens assemblies 1904a-b and the image sensor 1902. As shown in FIG. 9, the illumination sources 1952b are positioned to the right side (when facing the barcode reader 1900) of the lens assemblies 1906a-b. The illumination sources 1952a are positioned to the left side of the lens assemblies 1904a-b.

The barcode reader 1900 includes control circuitry that may independently control the intensity of the illumination sources 1952a-b. More specifically, the control circuitry may be able to adjust the intensity of the illumination sources 1952a without affecting the intensity of the illumination sources 1952b, and vice versa.

Referring again to FIG. 10, the first optical path 1906a includes a filter 1910. The filter 1910 is configured to pass a spectrum of electromagnetic radiation that may be referred to herein as an acceptance spectrum of electromagnetic radiation. In addition, the filter 1910 is configured to attenuate a spectrum of electromagnetic radiation that may be referred to herein as an attenuated spectrum of electromagnetic radiation.

As indicated above, the dark field illumination 156 may have a first illumination spectrum. The first illumination spectrum may include the acceptance spectrum. In some embodiments, the first illumination spectrum may primarily be composed of the acceptance spectrum. In one embodiment, the first illumination spectrum may be identical or substantially identical (e.g., at least 90% identical) to the acceptance spectrum. In another embodiment, there may be at least an 80% overlap between the first illumination spectrum and the acceptance spectrum. In another embodiment, there may be at least a 60% overlap between the first illumination spectrum and the acceptance spectrum. The attenuated spectrum may include frequencies of visible light that are not included in the first illumination spectrum.

The first lens assembly 1904*a* and the filter 1910 may collectively be referred to as a first set of imaging optics. The second lens assembly 1904*b* may be referred to as a second set of imaging optics. The first set of imaging optics may provide a first image of an object (e.g., a barcode) on the image sensor 1902. The second set of imaging optics may provide a second image of the object on the image sensor 1902. Because the first set of imaging optics includes a filter 1910 and the second set of imaging optics does not, the first set of imaging optics and the second set of imaging optics respond differently to the different illumination spectrums of the dark field illumination system, the diffuse bright field illumination system and the bright field illumination system.

More specifically, the first set of imaging optics (including the first lens assembly 1904*a* and the filter 1910) may be configured so that it focuses an image of an object (e.g., a barcode) within the field of view with a superior contrast profile when the object is illuminated by the dark field illumination system and/or the bright field illumination system as compared to when the object is illuminated by the diffuse bright field illumination system.

Conversely, the second set of imaging optics (including the second lens assembly 1904*b*) may be configured so that it focuses an image of an object (e.g., a barcode) within the field of view with a superior contrast profile when the object is illuminated by the diffuse bright field illumination system as compared to when the object is illuminated by the dark field illumination system and/or the bright field illumination system.

As used herein, the phrase "superior contrast profile" means at least one of: (i) greater maximum amplitude between the portions of the image that are dark marks of the barcode and the portions of the image that are light marks of the barcode; and (ii) more distinct transitions between portions of the image that are dark marks of the barcode and the portions of the image that are light marks of the barcode.

Having different sets of imaging optics that respond differently to the different illumination spectrums of the dark field illumination system, the diffuse bright field illumination system and the bright field illumination system may enable the barcode reader 1900 to be used for reading barcodes that are printed (or otherwise created) using diverse technologies, including direct part marking.

The combination of the dark field illumination 156 and/or the bright field illumination 112 and the first set of imaging optics may be optimal (compared to other possible combinations of illumination and optics) for reading certain types of barcodes. For example, if the spectrum of the dark field illumination 156 and/or the bright field illumination 112 is substantially from 650-700 nm, and the acceptance spectrum of the filter 910 is primarily from 650-700 nm, the combination of the dark field illumination 156 and/or the bright field illumination 112 and the first set of imaging optics may be optimal for reading barcodes formed via copper marking on a red or green background. More specifically, in a captured image of a barcode formed via copper marking on a red background, this combination may cause the background to appear white and the barcode to appear dark. In a captured image of a barcode formed via copper marking on a green background, this combination may cause the background to appear dark and the barcode to appear white.

Conversely, the combination of the diffuse bright field illumination 124 and the second set of imaging optics may be optimal (compared to other possible combinations of illumination and optics) for reading other types of barcodes. For example, because the second set of imaging optics does not include a filter 1910, the second set of imaging optics may be preferable for reading barcodes of a certain color (e.g., red). As another example, the combination of the diffuse bright field illumination 124 and the second set of imaging optics may be optimal for reading barcodes that include dark ink on a green printed circuit board. In a captured image of such a barcode, this combination may cause the barcode to appear dark against a light background.

The filter 1910 in the first set of imaging optics may increase contrast between the portions of the image that are dark marks of the barcode and the portions of the image that are light marks of the barcode. The filter 1910 may also eliminate ambient noise. Therefore, the image that the first set of imaging optics projects onto the first section/portion 1902*a* of the image sensor 1902 may not have distortions caused by ambient illumination. Conversely, the image that the second set of imaging optics projects onto the second section/portion 1902*b* of the image sensor 1902 may include distortions caused by ambient illumination.

The barcode reader 1900 may include a housing that is similar to the housing 101 of the barcode reader 100 shown in FIG. 1. The first set of imaging optics and the second set of imaging optics may be positioned within the housing 101 such that the first optical path 1906*a* passes through the first set of imaging optics (including the first lens assembly 1904*a* and the filter 1910) to the first section (or portion) 1902*a* of the image sensor 1902, and the second optical path 1906*b* passes through the second set of imaging optics (including the second lens assembly 1904*b*) to the second section (or portion) 1902*b* of the image sensor 1902. The illumination sources 1952*b* of the dark field illumination system are positioned to the right side of the first and second sets of imaging optics, and the illumination sources 1952*a* of the dark field illumination system are positioned to the left side of the first and second sets of imaging optics.

The first section/portion 1902*a* of the image sensor 1902 may correspond to approximately a first half of the image sensor 1902, and the second section/portion 1902*b* of the image sensor 1902 may correspond to approximately a second half of the image sensor 1902. In one embodiment, the phrase "approximately . . . half of the image sensor 1902" refers to 45-55% of the image sensor 1902. In another embodiment, the phrase "approximately . . . half of the image sensor 1902" refers to 40-60% of the image sensor 1902.

The illumination sources 1952*a-b* and optics 1954*a-b* may be positioned similarly to the illumination sources 152*a-b* and optics 154*a-b* in the barcode reader 100 shown in FIG. 1. Thus, the angle and direction at which the dark field illumination system of the barcode reader 1900 emits the dark field illumination 156 may be similar to the angle and direction at which the dark field illumination system of the barcode reader 100 emits the dark field illumination 156. Accordingly, the dark field illumination system of the barcode reader 1900 may emit dark field illumination 156 towards the first optical path 1906*a* at an angle (which may be referred to herein as an emission angle) that is less than 45 degrees from a plane that is perpendicular to the first optical path 1906*a*.

Stated another way, the dark field illumination system of the barcode reader 1900 may emit dark field illumination 156 into the field of view at an angle that is less than 45 degrees from a plane that is perpendicular to an optical path 1906*a*, where the optical path 1906*a* extends from the image sensor 1902 through the first set of imaging optics (including the first lens assembly 1904*a* and the filter 1910) into the center of the field of view of the first set of imaging optics.

In some embodiments, the optics 1954*a-b* may comprise back lit illumination diffusors that project dark field illumination 156 into the field of view at an angle that is less than 45 degrees from a plane that is perpendicular to the first optical path 1906*a*.

The illumination sources 1920*a-d* and the optical substrate 1922 may be positioned similarly to the illumination sources 120*a-d* and the optical substrate 122 in the barcode reader 100 shown in FIG. 1. Thus, the angle and direction at which the diffuse bright field illumination system of the barcode reader 1900 emits the diffuse bright field illumination 124 may be similar to the angle and direction at which the diffuse bright field illumination system of the barcode reader 100 emits the diffuse bright field illumination 124. Accordingly, the diffuse bright field illumination system of the barcode reader 1900 may emit diffuse bright field illumination 124 substantially parallel to the optical paths 1906*a-b*.

The illumination sources and diffusors 1910*a-b* of the bright field illumination system may be positioned similarly to the illumination sources 108*a-b* and diffusors 110*a-b* in the barcode reader 100 shown in FIG. 1. Thus, the angle and direction at which the bright field illumination system of the barcode reader 1900 emits the bright field illumination 112 may be similar to the angle and direction at which the bright field illumination system of the barcode reader 100 emits the bright field illumination 112. In one embodiment, the bright field illumination system of the barcode reader 1900 may emit bright field illumination 112 substantially parallel to the optical paths 1906*a-b*. In another embodiment, illumination from the illumination sources may enter the refracting diffusors 1910*a-b* at an entry angle that is substantially parallel to the second optical path 1906*b*. The bright field illumination 112 may exit the refracting diffusors 1910*a-b* toward the field of view at a converging angle (e.g., 30 degrees or less).

As shown in FIG. 10, the dark field illumination system of the barcode reader 1900 is positioned outside of the field of view. More specifically, FIG. 10 shows component 1913*b*, which is positioned behind illumination sources 1952*b* (as shown in FIG. 9). The diffuse bright field illumination system and the bright field illumination system are positioned between the lens assemblies 1904*a-b* and a point from which the dark field illumination system projects the dark field illumination 156 into the field of view. The diffuse bright field illumination system and the bright field illumination system are outside of the field of view.

The dark field illumination system projects the dark field illumination 156 into the field of view at a first angle from the first optical path 1906*a*. This first angle may be less than 45 degrees from a plane that is perpendicular to the first optical path 1906*a*. The diffuse bright field illumination system projects diffuse bright field illumination 124 and the bright field illumination system projects bright field illumination 112 into the field of view at a second angle from the second optical path 1906*b*. The second angle may be different than the first angle. For example, the second angle may be substantially parallel to the second optical path 1906*b*.

In an alternative embodiment, the dark field illumination system of the barcode reader 1900 may be configured similarly to any of the other dark field illumination systems described previously. For example, in place of the optics 1954*a-b*, the dark field illumination system of the barcode reader 1900 may include refracting diffusors that take the form of light pipes 788*a-b* having chamfered ends 778*a-b* (as shown in FIG. 5). Illumination sources 1952*a-b* may project illumination 776*a-b* into the light pipes 788*a-b* at an angle (which may be referred to herein as an entry angle) that is substantially parallel to the first optical path 1906*a*. The chamfered ends 778*a-b* may re-direct the illumination 776*a-b* so that the dark field illumination 156 exits the light pipes 788*a-b* and is emitted toward the first optical path 1906*a* at an emission angle that is different than the entry angle. The emission angle may be less than 45 degrees from a plane that is perpendicular to the first optical path 1906*a*.

In another embodiment, the dark field illumination system of the barcode reader 1900 may include an optical substrate 811 (as shown in FIG. 8A). Illumination sources 813*a-b* may project illumination 815*a-b* into the optical substrate 811 from the side, and this illumination 815*a-b* may be internally reflected within the substrate 811 and emitted as the dark field illumination 156. In this embodiment, the entry angle (i.e., the angle at which the illumination sources 813*a-b* project illumination 815*a-b* into the optical substrate 811) is substantially perpendicular to the emission angle (i.e., the angle at which the dark field illumination 156 is emitted toward the first optical path 1906*a*).

The optical substrate 1922 includes a front major surface 1940 and a back major surface 1938, which may be similar to the front major surface 140 and the back major surface 138 of the optical substrate 122. The front major surface 1940 and the back major surface 1938 are both substantially perpendicular to the optical paths 1906*a*, 1906*b*. The front major surface 1940 faces the field of view. The illumination sources 1920*a-d* propagate illumination between the front major surface 140 and the back major surface 138.

The optical substrate 1922 may include extraction features that are similar to any of the extraction features 142 described above in connection with the optical substrate 122. These extraction features 142 cause the diffuse bright field illumination 156 to exit the front major surface 1940 into the field of view.

As discussed above, the barcode reader 100 (shown in FIG. 1) may include a plurality of illumination systems. More specifically, the reader 100 may include a dark field illumination system that directs dark field illumination 156*a-b* into the field of view 106 of the reader 100, a diffuse bright field illumination system that directs diffuse bright field illumination 124 into the field of view 106, and a bright field illumination system that directs bright field illumination 112 into the field of view 106.

Each illumination system may be optimal for illuminating barcodes within a certain range of the field of view 106. For example, dark field illumination 156*a-b* may be optimal for illuminating barcodes located in a range that is close to the reader 100. The bright field illumination 112 may be optimal for illuminating barcodes located in a range that is far from the reader 100. The diffuse bright field illumination 124 may be optimal for illuminating barcodes located in an intermediate range that is between the close range of the dark field illumination system and the far range of the bright field illumination system.

Stated another way, different ones of the plurality of illumination systems may be optimal for barcode reading within different zones of the field of view 106. For example, the dark field illumination 156a-b of the dark field illumination system may be optimal for barcode reading within a near zone 158 of the field of view 106. The diffuse bright field illumination 124 of the diffuse bright field illumination system may be optimal for barcode reading within a center zone 126 of the field of view 106. The bright field illumination 112 of the bright field illumination system may be optimal for barcode reading within a far zone 116 of the field of view 106.

In this context, saying that the illumination provided by a particular illumination system is "optimal" within a certain zone means that the illumination is more favorable or desirable within that zone relative to illumination provided by other illumination systems within the reader 1900, which may include any of: i) the illumination having an even distribution of illumination intensity across the field(s) of view; ii) the illumination being directed to the field(s) of view at an angle which provides an even distribution of reflected illumination from an object within the field(s) of view; and iii) the illumination being at an optical wavelength or wavelength distribution.

For example, saying that the dark field illumination 156a-b of the dark field illumination system may be optimal for barcode reading within a near zone 158 of the field of view 106 means that the dark field illumination 156a-b may be more favorable or desirable within the near zone 158 relative to the bright field illumination 112 and/or the diffuse bright field illumination 124.

As also discussed above, the barcode reader 1900 (shown in FIGS. 9-11) may also include a plurality of illumination systems, like the reader 100 shown in FIG. 1. In addition, the reader 1900 may include a plurality of lens assemblies 1904 and optical paths 1906. More specifically, the reader 1900 may include a first lens assembly 1904a positioned within a first optical path 1906a from the field of view 106 to a first image sensor section 1902a, and a second lens assembly 1904b positioned within a second optical path 1906b from the field of view 106 to a second image sensor section 1902b.

In the present disclosure, a reference to different image sensor sections (e.g., a first image sensor section and a second image sensor section) may be referring to (i) two different sections of the same image sensor (e.g., a first section 1902a and a second section 1902b of an image sensor 1902, as shown in FIG. 10 and described in connection therewith), or (ii) two different image sensors (e.g., a first image sensor 2102a and a second image sensor 2102b, as shown in FIG. 11 and described in connection therewith).

The first lens assembly 1904a may project an image of one or more objects (e.g., a barcode) within its field of view onto the first image sensor section 1902a. Similarly, the second lens assembly 1904b may project an image of one or more objects within its field of view onto the second image sensor section 1902b. The lens assemblies 1904a-b may be focused to the same focal length.

As used herein, the term "image frame" refers to a plurality of images that are captured by a barcode reader at substantially the same time via different lens assemblies and optical paths. For example, because the reader 1900 includes two lens assemblies 1904a-b and two optical paths 1906a-b, an image frame captured by the reader 1900 may include two images: (i) an image of the field of view of the first lens assembly 1904a, captured via the first lens assembly 1904a, the first optical path 1906a, and the first image sensor section 1902a, and (ii) an image of the field of view of the second lens assembly 1904b, captured via the second lens assembly 1904b, the second optical path 1906b, and the second image sensor section 1902b.

The number of lens assemblies 1904a-b and optical paths 1906a-b within the reader 1900 should not be interpreted as limiting the scope of the present disclosure. A reader in accordance with the present disclosure may include more than two lens assemblies and optical paths. Generally speaking, if a barcode reader includes N lens assemblies and optical paths, then an image frame captured by the reader may include N images.

In accordance with the present disclosure, a reader 1900 that includes a plurality of lens assemblies 1904a-b that are positioned in different optical paths 1906a-b to different image sensor sections 1902a-b may utilize offsets between locations of features in different images within the same image frame to estimate the distance between the reader 1900 and a target object (e.g., a barcode). This estimated distance may then be used to adjust reader settings to optimize image capture at the estimated barcode distance. This process may be referred to herein as multi-lens ranging.

Figure 18A:
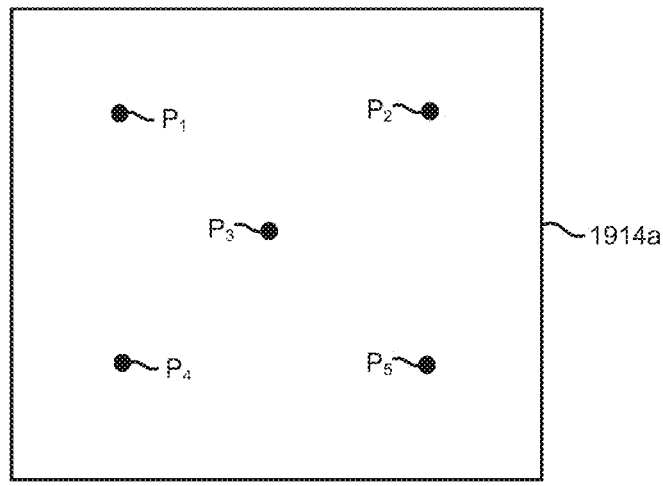
FIGS. 18A-B illustrate examples of calibration targets.
Figure 18B:
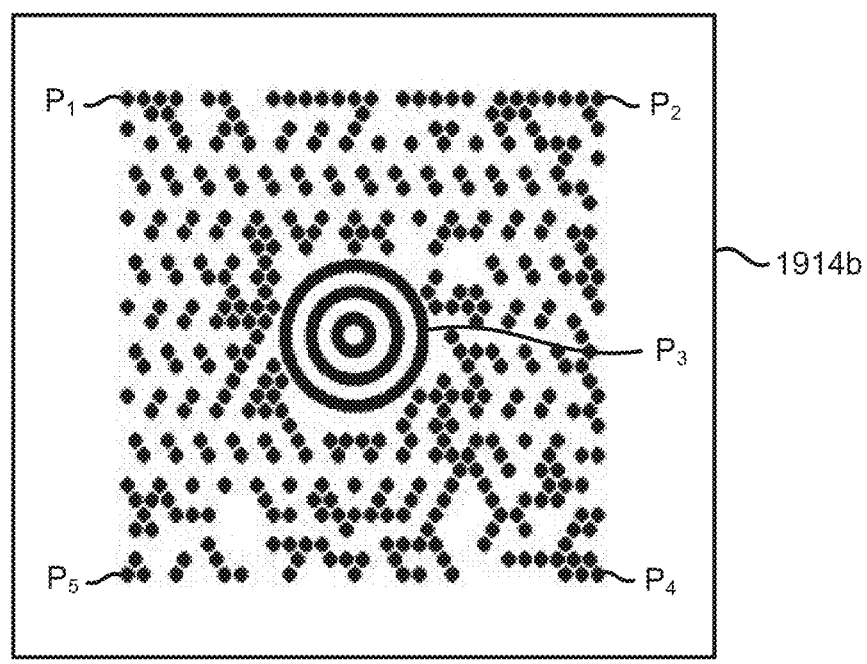

Reference is initially made to: i) the flow chart of FIG. 12, which illustrates a method 1200 that may be performed by the reader 1900 in order to implement multi-lens ranging; and ii) the calibration targets 1914a and 1914b of FIGS. 18A and 18B respectively.

The exemplary calibration target 1914a may include a plurality of fiducial features. In the depicted target 1914a, the fiducial features are fiducial points. There are five fiducial points in the calibration target 1914a shown in FIG. 18a, labeled $P_1$, $P_2$, $P_3$, $P_4$ and $P_5$, each spaced apart from the other fiducial points.

The exemplary calibration target 1914b may include a two-dimensional barcode, such as a MaxiCode®, such that distinct features of the barcode (e.g., the four corners and the center) form five fiducial points, which are shown in FIG. 18b labeled $P_1$, $P_2$, $P_3$, $P_4$ and $P_5$.

The calibration targets 1914a and 1914b are exemplary only and the quantity of fiducial points in each calibration target is exemplary only. Those skilled in the art will recognize that other graphic patterns with other quantities of fiducial points or other types of fiducial features are suitable. Preferably the fiducial points of the calibration target are spaced such that the area bounded by the fiducial points occupies most of the field of view when at the closest calibration distance.

Figure 20A:
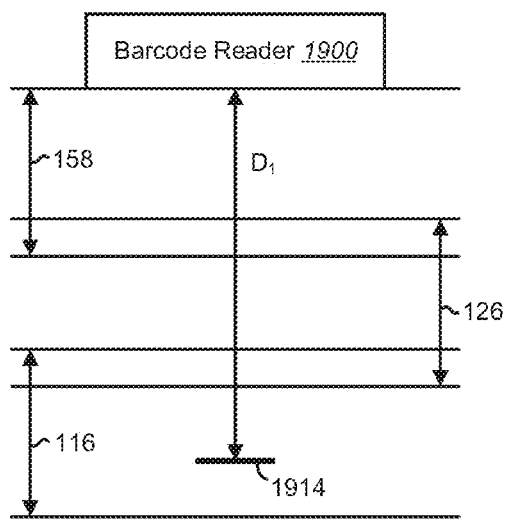
FIGS. 20A-C are top-down views illustrating examples of different calibration distances.
Figure 20B:
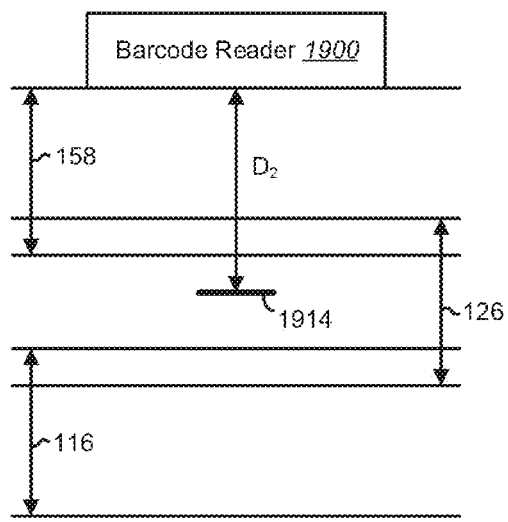
Figure 20C:
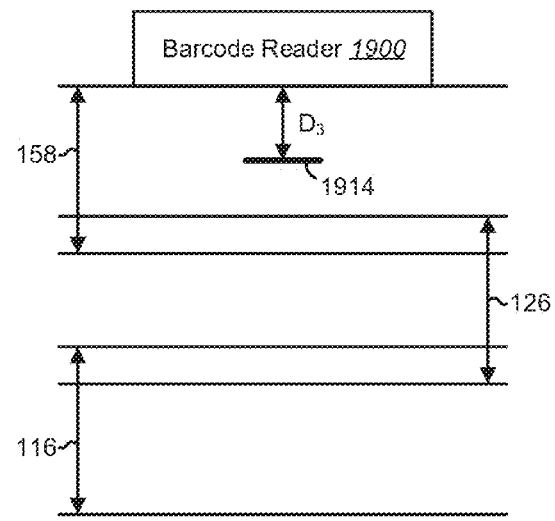

In step 1202 of the flow chart of FIG. 12, the reader 1900 may capture a plurality of image frames while a calibration target 1914a or 1914b is within the field of view 106 of the reader 1900. The image frames 2002a-2002c of FIGS. 19A-C depict use of calibration target 1914a as an example. These image frames 2002a-c may be referred to herein as calibration image frames 2002a-c. Different calibration image frames 2002a-c may be captured at different distances $D_1$, $D_2$, $D_3$ (FIGS. 20A-C) from the calibration target 1914. For example, a first calibration image frame 2002a (FIG. 19A) may be captured at a distance $D_1$ (FIG. 20A) from the calibration target 1914, a second calibration image frame 2002b (FIG. 19B) may be captured at a distance $D_2$ (FIG. 20B) from the calibration target 1914, and a third calibration image frame 2002c (FIG. 19C) may be captured at a distance $D_3$ (FIG. 20C) from the calibration target 1914. The distances $D_1$, $D_2$, $D_3$ may be referred to herein as calibration distances.

The number of calibration distances used should be at least three calibration distances and preferably would be a greater number of calibration distances. Three calibration distances are depicted in the Figures.

The different calibration distances $D_1$, $D_2$, $D_3$ (FIGS. 20A-C) preferably include a far distance $D_1$ which extends into a far zone 116 of the field of view 106 and a close distance $D_3$ which is within the near zone 158 of the field of view 106. Preferably there would be multiple calibration distances between $D_1$ and $D_3$ with at least one calibration distance $D_2$ being within the center zone 126 of the field of view 106. These zones may correspond to zones 158, 126, and 116 discussed with respect to FIG. 1.

Because the reader 1900 includes two different lens assemblies 1904a-b and optical paths 1906a-b, each calibration image frame 2002 captured by the reader 1900 may include two different images: (i) a first image 2004 of the calibration target 1914a captured via the first lens assembly 1904a, the first optical path 1906a, and the first image sensor section 1902a, and (ii) a second image 2006 of the calibration target 1914a captured via the second lens assembly 1904b, the second optical path 1906b, and the second image sensor section 1902b. These images 2004, 2006 may be referred to herein as calibration images 2004, 2006.

Because the lens assemblies 1904a-b, and their two parallel optical paths 1906a and 1906b, are offset and have different fields of view, each image of the calibration target 1914a captured within the same image frame will have at least a portion of the fiducial points in different locations within the image. More specifically, each fiducial point $P_i$ may be in different locations in the calibration images 2004, 2006 contained within a calibration image frame 2002. As used herein, the term "fiducial offsets" may refer generally to offsets between locations of each of a plurality of fiducial points $P_i$ within the calibration images 2004, 2006 of a plurality of calibration image frames 2002. More specifically, a single "fiducial offset" may be the difference between the locations of a particular fiducial point $P_i$ within the calibration images 2004, 2006 of a particular calibration image frame 2002.

In FIGS. 19A-D, for the sake of clarity, the locations of the fiducial points $P_i$ are indicated with different markings in different calibration image frames 2002. More specifically, the locations of the fiducial points $P_i$ are indicated with "o" in the calibration image frame 2002a shown in FIG. 19A (taken at calibration distance $D_1$), with "x" in the calibration image frame 2002b shown in FIG. 19B (taken at calibration distance $D_2$), and with a solid circle in the calibration image frame 2002c shown in FIG. 19C (taken at calibration distance $D_3$). These different markings are being used in order to more clearly illustrate how the fiducial points $P_i$ are in different locations in the different calibration images 2004, 2006. The different locations are most clearly visible in the image frame 2002d shown in FIG. 19D, which is a composite of the image frames 2002a-c shown in FIGS. 19A-C. Of course, one skilled in the art would understand that in actual practice, fiducial points would not be indicated with different markings in different calibration image frames of the same calibration target.

Referring to FIGS. 19A-D generally, it can be seen that the distance between the fiducial points $P_i$ becomes greater as the distance between the reader 1900 and the calibration target 1914 is decreased and the calibration target 1914 occupies more of the field of view. For example, the fiducial points $P_i$ in the calibration image 2004a taken at calibration distance $D_1$ are closer together than the fiducial points $P_i$ in the calibration image 2004c taken at calibration distance $D_3$. This is most clearly visible in the composite image frame 2002d shown in FIG. 19D.

Further, the offset between the locations of a particular fiducial point $P_i$ within the calibration images 2004, 2006 of a particular calibration image frame 2002 also increases as the distance between the reader 1900 and the calibration target 1914 is decreased. Stated differently, the offset of each fiducial point $P_i$ within the calibration images 2004, 2006 of a particular calibration image frame 2002 is a function of the distance between the first optical path 1906a of the first lens assembly 1904a and the second optical path 1906b of the second lens assembly 1904b (the optical path offset) divided by the distance between the reader 1900 and the calibration target 1914. As such, the distance between the reader 1900 and the calibration target 1914 is a function of the optical path offset divided by the offset of each fiducial point $P_i$ within the calibration images 2004, 2006.

Reference is once again made to FIG. 12. In step 1204, the reader 1900 may determine fiducial offset data 2208, which may be representative of fiducial offsets within a plurality of calibration images 2004, 2006 of a plurality of calibration image frames 2002a-c. The fiducial offset data 2208 may be determined via analysis of the calibration image frames 2002a-c and/or the composite calibration image frame 2002d.

Figure 21A:
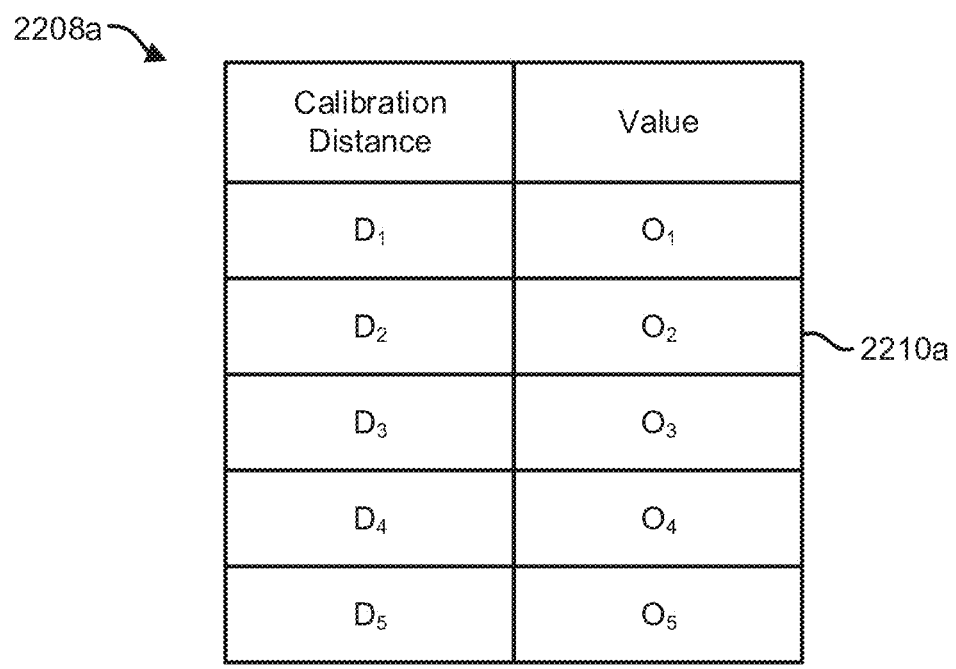

FIG. 21A illustrates a first example of fiducial offset data 2208a. In this example, the fiducial offset data 2208a includes a look-up table 2210a that includes, for each calibration distance $D_i$, either or both of: i) a numerical value derived from the optical path offset which, when divided by the feature offset (which is defined below), yields the estimated distance; and ii) data representing the average offset of all fiducial points $P_{1-5}$ at each calibration distance $D_i$.

More specifically fiducial offset data 2208a may be, for each calibration distance $D_i$ of the plurality of calibration distances $D_{1-3}$: the average of multiple numerical values, each being the numerical value derived from the optical path offset (which when divided by the feature offset yields the estimated distance), each calculated based on measured fiducial offset for one of the multiple fiducial points $P_i$ within the calibration images 2004, 2006 at the calibration distance $D_i$.

Alternatively, fiducial offset data 2208a may be, for each calibration distance $D_i$ of the plurality of calibration distances $D_{1-3}$: (i) a first location $(x_1, y_1)$ of each fiducial point $P_i$ within a first calibration image 2004 captured at a calibration distance $D_i$, and (ii) a second location $(x_2, y_2)$ of each of the same fiducial points $P_i$ within a second calibration image 2006 captured at the calibration distance $D_i$. These values may be used to calculate the average of the offset of the fiducial points $P_{1-5}$ between the first calibration image 2004 and the second calibration image 2006. The offset of fiducial point $P_i$ (i.e., $\Delta P_i$) at calibration distance $D_i$ equals the square root of $\Delta x^2$ plus $\Delta y^2$. Therefore the average offset at calibration distance $D_i$ equals the average of $\Delta P_{1-5}$. Further, those skilled in the art will recognize that for computational simplicity, the square root calculation can be omitted such that the average of $\Delta x^2$ plus $\Delta y^2$ for $P_{1-5}$ is also representative of average offset and may be stored as the average offset value $O_i$ in look up table 2210a.

FIG. 21B illustrates an alternative example of fiducial offset data 2208b which, instead of storing numerical values or offset values $O_i$ for each calibration distance $D_i$ stores data 2208b sufficient for calculating fiducial offsets. In this example, the fiducial offset data 2208b includes a look-up table 2210b that includes the following for each fiducial point $P_i$ of the plurality of fiducial points $P_{1-5}$ and for each calibration distance $D_i$ of the plurality of calibration distances $D_{1-3}$: (i) a first location $(x_1, y_1)$ of a fiducial point $P_i$ within a first calibration image 2004 captured at a calibration distance $D_1$, and (ii) a second location $(x_2, y_2)$ of the fiducial point $P_i$ within a second calibration image 2006 captured at the calibration distance $D_i$.

In FIG. 21B (and FIG. 21D as well), the location data (x, y) for different fiducial points $P_i$ and for different calibration distances $D_i$ are distinguished using the subscripts ij, where i denotes the fiducial point and j denotes the calibration distance. For example, $(x_1, y_1)_{23}$ denotes the location of fiducial point $P_2$ in the first calibration image 2004 at calibration distance $D_3$, whereas $(x_2, y_2)_{41}$ denotes the location of fiducial point $P_4$ in the second calibration image 2006 at calibration distance $D_1$.

FIG. 21C illustrates another example of fiducial offset data 2208c. In this example, the fiducial offset data 2208c includes a look-up table 2210c that includes the following for each fiducial point $P_i$ of the plurality of fiducial points $P_{1-5}$ and for each calibration distance $D_i$ of the plurality of calibration distances $D_{1-3}$: an offset $(\Delta x, \Delta y)$ between (i) a first location $(x_1, y_1)$ of a fiducial point $P_i$ within a first calibration image 2004 captured at a calibration distance $D_i$ and (ii) a second location $(x_2, y_2)$ of the fiducial point $P_i$ within a second calibration image 2006 captured at the calibration distance $D_i$.

In FIG. 21C (and FIG. 21D as well), the offsets $(\Delta x, \Delta y)$ for different fiducial points $P_i$ and for different calibration distances $D_i$ are distinguished using the subscripts ij, which were discussed above.

FIG. 21D illustrates another example of fiducial offset data 2208d. In this example, the fiducial offset data 2208d includes a look-up table 2210d that includes the following for each fiducial point $P_i$ of the plurality of fiducial points $P_{1-5}$ and for each calibration distance $D_i$ of the plurality of calibration distance $D_{1-3}$: (i) a first location $(x_1, y_1)$ of a fiducial point $P_i$ within a first calibration image 2004 captured at the calibration distance $D_i$, (ii) a second location $(x_2, y_2)$ of the fiducial point $P_i$ within a second calibration image 2006 captured at the calibration distance $D_i$ and (iii) an offset $(\Delta x, \Delta y)$ between the first location $(x_1, y_1)$ and the second location $(x_2, y_2)$. The look-up table 2210d effectively is a combination of the look-up tables 2210b and 2210c of FIGS. 21B and 21C.

FIG. 13 illustrates another method 1300 that may be performed by the reader 1900 in order to implement multi-lens ranging. This method 1300 is a more detailed representation of the method 1200 shown in FIG. 12.

In step 1302, the reader 1900 may capture a calibration image frame 2002 at a calibration distance $D_i$. The calibration image frame 2002 may include: (i) a first calibration image 2004 captured via the first lens assembly 1904a, the first optical path 1906a, and the first image sensor section 1902a, and (ii) a second calibration image 2006 captured via the second lens assembly 1904b, the second optical path 1906b, and the second image sensor section 1902b.

In step 1304, the reader 1900 may determine the location of each fiducial point $P_i$ within each of the calibration images 2004, 2006. In step 1306, the reader 1900 may calculate, for each fiducial point $P_i$ the offset between the location of the fiducial point $P_i$ in the first calibration image 2004 and the location of the fiducial point $P_i$ in the second calibration image 2006 which, as discussed may include calculating, for the fiducial point $P_i$, $\Delta x$ and $\Delta y$, and the sum of $\Delta x^2$ plus $\Delta y^2$. Step 1306 is optional. If the fiducial offset data 2208b is as shown in FIG. 21B, then step 1306 is not necessary.

In step 1308, the reader 1900 may record, in association with the calibration distance $D_i$ between the reader 1900 and the calibration target 1914 at which the calibration image frame 2002 was captured, data representative of the fiducial offsets (i.e., fiducial offset data 2208).

As discussed with respect to FIG. 21A, step 1308 may include either or both of: i) calculating and recording each average numerical value in look up table 2210a; or ii) calculating and recording average offset data in look-up table 2210a.

As discussed with respect to FIGS. 21B to 21D, step 1308 may include: i) recording location data in a look-up table 2210b as shown in FIG. 21B, ii) recording offset data in a look-up table 2210c as shown in FIG. 21C, and/or iii) recording both location data and offset data in a look-up table 2210d as shown in FIG. 21D.

In step 1310, a determination may be made about whether calibration image frames 2002 have been captured for all of the calibration distances. If not, then in step 1312 another calibration distance $D_i$ may be selected, and steps 1302 through 1310 may be repeated. In other words, steps 1302 through 1310 may be performed for each calibration distance $D_i$ in order to fully populate the look-up table 2210.

The methods 1200, 1300 shown in FIGS. 12 and 13 may be performed when the reader 1900 is being manufactured, as part of a calibration process. The fiducial offset data 2208 may be stored in the reader 1900 in nonvolatile memory. The fiducial offset data 2208 may be stored in the reader 1900 at least until the reader 1900 is recalibrated. There may not be a need to recalibrate the reader 1900 after it is manufactured.

Figure 14:
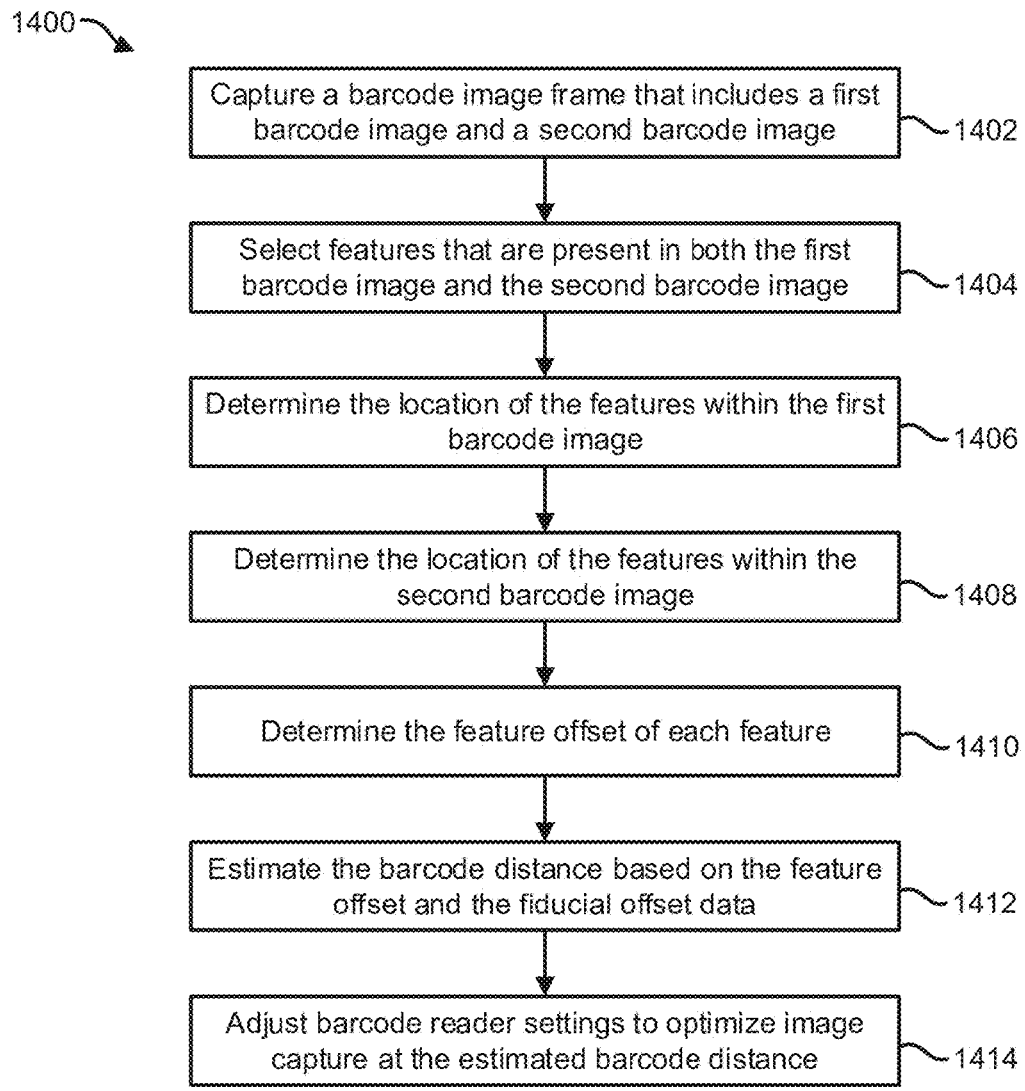
FIG. 14 illustrates another method that may be performed by a barcode reader in order to implement multi-lens ranging.

FIG. 14 illustrates another method 1400 that may be performed by the reader 1900 in order to implement multi-lens ranging. Whereas the methods 1200, 1300 shown in FIGS. 12 and 13 may be performed when the reader 1900 is being manufactured, the method 1400 shown in FIG. 14 may be performed during typical operation of the reader 1900.

Figure 22:
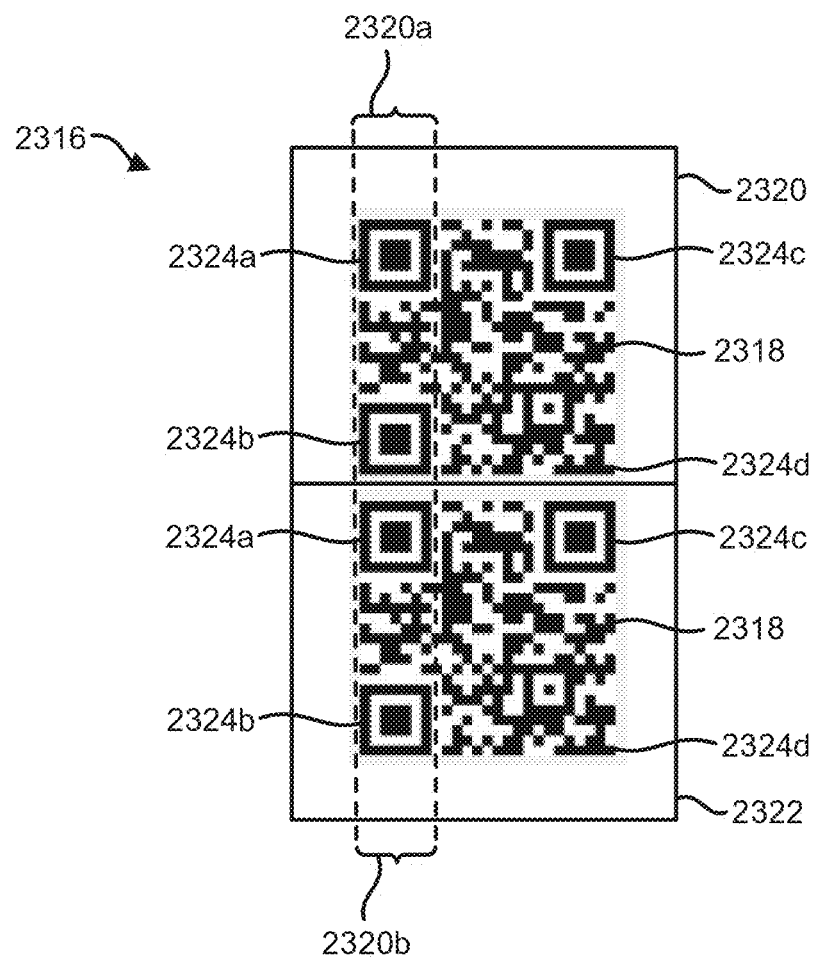
FIG. 22 illustrates an example of a barcode image frame.

In step 1402, the reader 1900 may capture an image frame 2316 of a barcode 2318 (FIG. 22). The image frame 2316 may include: (i) a first image 2320 of the barcode 2318 captured via the first lens assembly 1904a, the first optical path 1906a, and the first image sensor section 1902a, and (ii) a second image 2322 of the barcode 2318 captured via the second lens assembly 1904b, the second optical path 1906b, and the second image sensor section 1902b.

Alternatively, at step 1402 the reader 1900 may capture each of a first window section 2320a within the first image sensor section 1902a and a second window section 2320b within the second image sensor section 1902b, with each of the first window section 2320a and the second window section 2320b including the same portion of the barcode 2318. In an embodiment wherein the image sensor 1902 is rotated perpendicular to the optical path offset (i.e. image sensor columns in FIG. 22 are horizontal while image sensor rows are vertical) the two window sections 2320a and 2320b may be a single image sensor window section encompassing a group of rows within the sensor 1902.

Capturing one or more window sections of an image sensor is described in more detail in U.S. patent application Ser. No. 13/946,862 filed on Jul. 19, 2013, the entire contents of which are hereby incorporated by reference.

The image frame 2316 may be referred to herein as a barcode image frame 2316, and the images 2320, 2322 (or the first window section 2320a of image 2320 and the second window section 2320b of image 2322, each depicting the same portion of the barcode 2318) may be referred to herein as barcode images 2320, 2322.

In step 1404, the reader 1900 may select one or more features, such as features 2324a-c, that is/are present in both the first barcode image 2320 and the second barcode image 2322. The features 2324a-c may be distinct patterns, so that the location of the features 2324a-c can be accurately identified in both the first barcode image 2320 and the second barcode image 2322. Note, if windowing is used only features 2324a-b can be identified within the windows 2320a and 2320b.

Exemplary features include distinct corner points, lines, and other patterns (for example barcode symbology identifying patterns present in both the first and second barcode images 2320, 2322). Various image processing algorithms, such as the Hough transform, may be used to extract robust distinct features present in both the first and second barcode images 2320, 2322.

In addition, the locations of the features 2324a-c may be close to the locations of one or more of the fiducial points $P_i$ in the calibration images 2004, 2006 that were used to calibrate the reader 1900. Although not necessary, this can improve the accuracy of the barcode distance (i.e., the distance between the reader 1900 and the barcode 2318) that is estimated by the reader 1900 in step 1412 (discussed below).

In step 1406, the reader 1900 may determine the location of each feature 2324a-c within the first barcode image 2320. In step 1408, the reader 1900 may determine the location of each feature 2324a-c within the second barcode image 2322. In step 1410, the reader 1900 may, for each feature 2324a-c, determine an offset between the location of the feature 2324 within the first barcode image 2320 and the location of the feature 2324 within the second barcode image 2322. This offset may be an offset only in the same direction as the optical path offset (e.g., a vertical offset when the two lens assemblies are arranged vertically). Alternatively, as discussed, this offset may the sum of $\Delta x^2$ plus $\Delta y^2$. This offset may be referred to herein as a "feature offset."

In step 1412, the reader 1900 may estimate the barcode distance based on the feature offset of at least one feature 2324a-c and the fiducial offset data 2208. Exemplary methods for performing this estimate are discussed with respect to FIGS. 15, 16, and 17.

In step 1414, the reader 1900 may use the estimated barcode distance (determined in step 1412) to select at least one operating parameter of the reader 1900. For example, the reader 1900 may adjust its settings to optimize image capture at the estimated barcode distance. Step 1414 may include selecting, based on the estimated barcode distance, the best illumination system (i.e., the illumination system that best illuminates a barcode 2318 at the estimated barcode distance) for capturing a subsequent image frame. Alternatively or additionally, step 1414 may include setting gain and/or exposure time for best capturing a subsequent image frame of a barcode 2318 at the estimated barcode distance when the barcode 2318 is illuminated by the selected illumination system.

The barcode image frame 2316, or windows 2320a, 2320b within the image frame 2316 captured in step 1402 may be a test frame that is captured specifically for the purpose of estimating the barcode distance. In other words, the reader 1900 may perform the method 1400 shown in FIG. 14 in order to estimate the barcode distance, without attempting to decode the barcode 2318 within the barcode images 2320, 2322. Alternatively, the reader 1900 may attempt to decode at least one of the barcode images 2320, 2322 in the barcode image frame 2316 captured in step 1402, and then perform steps 1404 through 1414 only if neither barcode image 2320, 2322 is successfully decoded.

Figure 15:
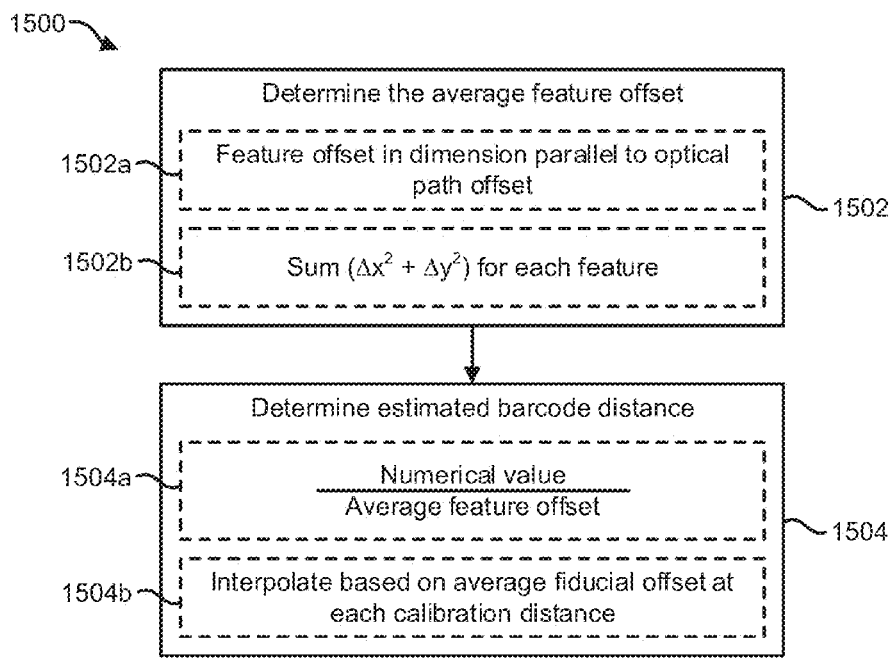
FIG. 15 illustrates an example of a method that may be performed by a barcode reader in order to estimate the barcode distance based on the feature offset and the fiducial offset data.

FIG. 15 illustrates an example of a method 1500 that may be performed by the reader 1900 in order to estimate the barcode distance based on the feature offset and the fiducial offset data 2208. In other words, the method 1500 shown in FIG. 15 represents one possible implementation of step 1412 in the method 1400 shown in FIG. 14.

In step 1502, the reader 1900 may determine the average offset of a plurality of the features 2324a-c present within both the first and second barcode images 2320, 2322. The plurality of features 2324a-c may be all features identified at step 1404 (FIG. 14), the features 2324a-b within the windows 2320a-b, or only a portion of the features 2324a-c identified which the reader 1900 determines to be the most robust—meaning the location(s) of the feature(s) 2324 within each of the first and second barcode images 2320, 2322 may be accurately identified and precisely located with minimal uncertainty as to the location(s). As discussed, in one embodiment the average offset may be the average offset in the dimension parallel to the optical path offset for the plurality of features 2324a-c as depicted by step 1502a. In another embodiment the average feature offset may be the average of $\Delta x^2$ plus $\Delta y^2$ for each of the plurality of features 2324a-c as depicted in step 1502b.

In step 1504, the reader 1900 may determine the estimated barcode distance.

In one embodiment determining the estimated barcode distance may include, for each numerical value of the offset data 2208a, dividing the numerical value by the feature offset to yield a distance estimation as depicted in step 1504a. The estimated distance is a function of the distance estimations which may be: i) the average of the distance estimations or ii) the distance estimation based on the numerical value that was associated with (was determined based on) a calibration distance that is closest to the distance estimation.

In another embodiment the estimated barcode distance may be determined via interpolating between the average offset $O_{1-5}$ (FIG. 21A) at each calibration distance $D_{1-5}$ as depicted in step 1504b. For example, if the magnitude of the average feature offset determined at step 1502 is halfway between $O_2$ and $O_3$, then the estimated barcode distance may be determined to be halfway between the calibration distance $D_2$ and the calibration distance $D_3$.

Figure 16:
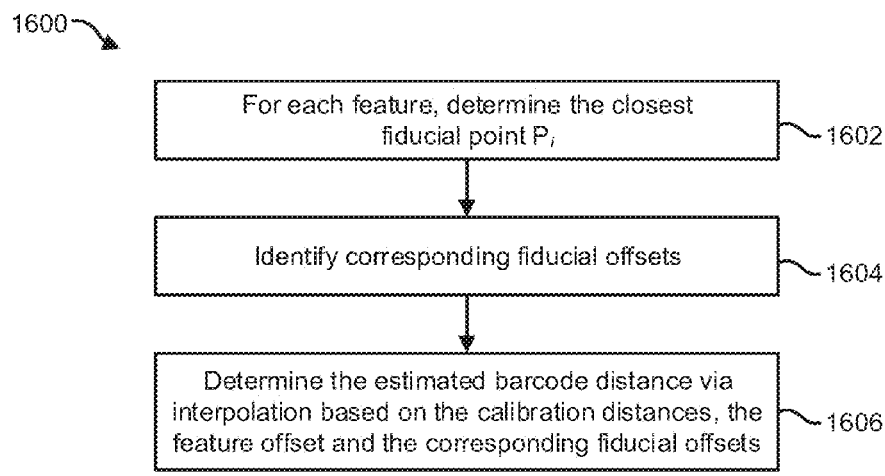
FIG. 16 illustrates another example of a method that may be performed by a barcode reader in order to estimate the barcode distance based on the feature offset and the fiducial offset data.

FIG. 16 illustrates another example of a method 1600 that may be performed by the reader 1900 in order to estimate the barcode distance based on the feature offset and the fiducial offset data 2208. In other words, the method 1600 shown in FIG. 16 represents another possible implementation of step 1412 in the method 1400 shown in FIG. 14.

In step 1602, the reader 1900 may determine the closest fiducial point $P_i$ to one or more selected features 2324a-c. In step 1604, the reader 1900 may identify corresponding fiducial offsets.

More specifically, for each feature 2324a-c, the closest fiducial point may be the fiducial point $P_i$ (from among the plurality of fiducial points $P_{1-5}$) that is located closest to the feature 2324. The reader 1900 may compare the location of the feature 2324 within the barcode images 2320, 2322 with the locations of the plurality of fiducial points $P_{1-5}$ in the corresponding calibration images 2004, 2006. For example, the location of the feature 2324a within the barcode image 2320 captured via the first lens assembly 1904a and first optical path 1906a may be compared with the locations of the fiducial points $P_{1-5}$ in the calibration images 2004 captured via the first lens assembly 1904a and first optical path 1906a. Similarly, the location of the feature 2324a within the barcode image 2322 captured via the second lens assembly 1904b and second optical path 1906b may be compared with the locations of the fiducial points $P_{1-5}$ in the calibration images 2006 captured via the second lens assembly 1904b and second optical path 1906b. In the barcode images 2320, 2322 shown in FIG. 22 and the calibration images 2004, 2006 shown in FIGS. 19A-D, it appears that fiducial point $P_1$ is the closest fiducial point to feature 2324a.

In step 1604, the reader 1900 may, for each feature 2324a-c, identify corresponding fiducial offsets, i.e., the fiducial offsets that correspond to the closest fiducial point $P_i$ to the feature 2324 identified in step 1502. In this context, the phrase "corresponding fiducial offsets" refers to the fiducial offsets that are associated with the closest fiducial point $P_i$. In other words, the corresponding fiducial offsets are the fiducial offsets to which the feature offset is to be compared for estimating the distance of the barcode 2318 from the reader 1900.

If the fiducial offset data 2208b is as shown in FIG. 21B, then identifying the corresponding fiducial offsets may involve calculating the corresponding fiducial offsets based on the fiducial offset data 2208b. For example, if $P_1$ is the closest fiducial point (closest meaning the average offset between the feature and the fiducial point in both images), then the reader 1900 may perform the following calculations: Offset at $D_1 = (x_2-x_1)_{11}^2 + (y_2-y_1)_{11}^2$; Offset at $D_2 = (x_2-x_1)_{12}^2 + (y_2-y_1)_{12}^2$; and Offset at $D_3 = (x_2-x_1)_{13}^2 + (y_2-y_1)_{13}^2$.

If the fiducial offset data 2208c is as shown in FIG. 21C or 2208d as shown in FIG. 21D, then identifying the corresponding fiducial offsets may involve looking up the corresponding fiducial offsets in a look-up table 2210c, 2210d within the fiducial offset data 2208c, 2208d. For example, if $P_1$ is the closest fiducial point, then $\Delta x^2 + \Delta y^2$ may be calculated for each of $(\Delta x, \Delta y)_{11}$, $(\Delta x, \Delta y)_{12}$, and $(\Delta x, \Delta y)_{13}$.

In step 1606, the reader 1900 may determine the estimated barcode distance via: (i) for each feature, interpolating between the calibration distances $D_{1-3}$, using the feature offset and the corresponding fiducial offsets at the calibration distances, and then (ii) averaging such estimated barcode distances.

Figure 17:
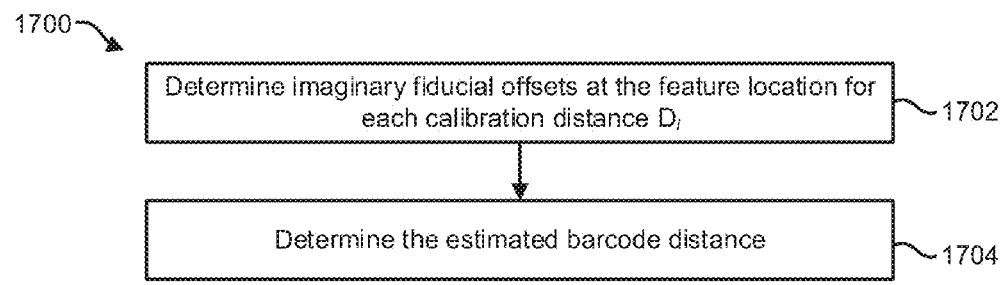
FIG. 17 illustrates another example of a method that may be performed by a barcode reader in order to estimate the barcode distance based on the feature offset and the fiducial offset data.

FIG. 17 illustrates another example of a method 1700 that may be performed by the reader 1900 in order to estimate the barcode distance based on the feature offset and the fiducial offset data 2208. In other words, the method 1700 shown in FIG. 17 represents another possible implementation of step 1412 in the method 1400 shown in FIG. 14.

In step 1702, the reader 1900 may calculate interpolated fiducial offsets $\Delta x^2 + \Delta y^2$ for each calibration distance $D_i$ at an imaginary fiducial location that corresponds to the feature location. More specifically, the imaginary fiducial location is used to interpolate each of $\Delta x$ and $\Delta y$ of at least two fiducial points to determine an imaginary $\Delta x$ and an imaginary $\Delta y$ of the imaginary fiducial point at the feature location.

In step 1704, the reader 1900 may determine the estimated barcode distance using the methods discussed with respect to step 1604 and step 1606 of FIG. 16.

Figure 23:
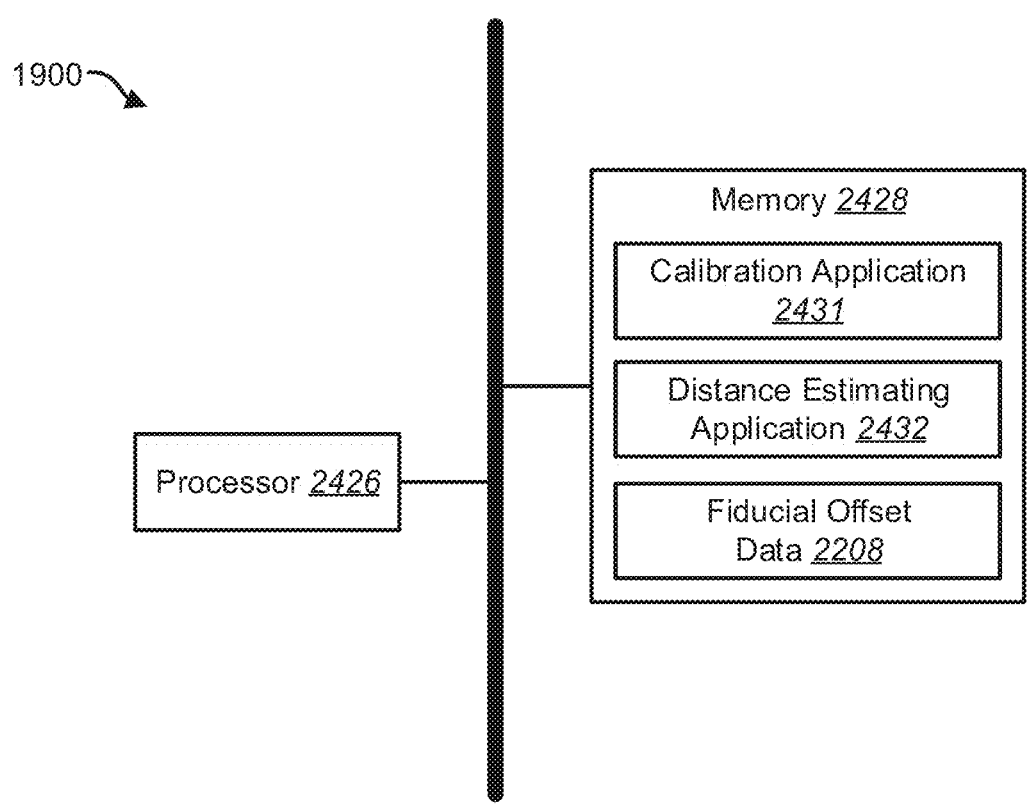
FIG. 23 illustrates some of the components within a barcode reader that may be used to implement multi-lens ranging.

FIG. 23 illustrates some additional components within the reader 1900 that may be used to implement multi-lens ranging. The reader 1900 may include a processor 2426. The processor 2426 may be a general purpose single- or multi-chip microprocessor (e.g., an ARM), a special purpose microprocessor (e.g., a digital signal processor (DSP)), a microcontroller, a programmable gate array, etc. The processor 2426 may be referred to as a central processing unit (CPU). Although just a single processor 2426 is shown, in an alternative configuration, a combination of processors (e.g., an ARM and DSP) could be used.

The reader 1900 may also include memory 2428 in electronic communication with the processor 2426. That is, the processor 2426 may be able to read information from and/or write information to the memory 2428. The memory 2428 may be any electronic component capable of storing electronic information. The memory 2428 may be random access memory (RAM), read-only memory (ROM), magnetic disk storage media, optical storage media, flash memory devices in RAM, on-board memory included with the processor 2426, programmable read-only memory (PROM), erasable programmable read-only memory (EPROM), electrically erasable PROM (EEPROM), registers, and so forth, including combinations thereof.

Data and instructions may be stored in the memory 2428. The instructions may include one or more programs, routines, sub-routines, functions, procedures, etc. The instructions may include a single computer-readable statement or many computer-readable statements. The instructions may be executable by the processor 2426 to implement one or more of the methods 1200, 1300, 1400, 1500, 1600, 1700, 1800, operations, functions and/or procedures described herein. Executing the instructions may involve the use of the data that is stored in the memory 2428. The data may include fiducial offset data 2208 and other types of data described herein.

The methods 1200, 1300, 1400, 1500, 1600, 1700, 1800 and other functionality described herein may be distributed across multiple applications, programs, routines, sub-routines, functions, procedures, etc. For example, a calibration application 2431 may be configured to perform the methods 1200, 1300 that were described above in connection with FIGS. 12 and 13. A distance estimating application 2432 may be configured to perform the methods 1400, 1500, 1600, 1700, 1800 that were described above in connection with FIGS. 14-18.

FIGS. 19-21 show the first optical path 1906a of the reader 1900 with a filter 1910. A reader that is configured for multi-lens ranging as described herein may (i) include a filter in just one of the optical paths 1906a-b, as shown in FIGS. 19-21, (ii) include a filter in both optical paths 1906a-b, or (iii) be configured without a filter in either of the optical paths 1906a-b.

The use of the fiducial points, as set forth in the description above, represents only one ranging method for a barcode reader according to the present disclosure. In alternative embodiments, it may be desirable to conduct ranging that does not depend on the presence of multiple lens assemblies. Additionally or alternatively, it may be desirable to conduct ranging that does not depend on the presence of recognizable markings on the article to be scanned for calibration and/or barcode reading.

In one alternative embodiment, a targeting illumination system, independent of the illumination sources used to illuminate the article for barcode reading, may be used to project targeting illumination into the field of view of a lens assembly. The targeting illumination may include multiple features that vary, in offset from each other, with distance from the barcode reader.

The offset between the features may be compared with calibration data to determine the range, or in the case of a barcode to be read, the estimated barcode distance. One or more operating parameters of the barcode reader, such as the best illumination subsystem(s) to use to illuminate a barcode to be scanned at the estimated barcode distance, may then be selected based on the estimated barcode distance. Systems and methods for accomplishing ranging in this manner will be shown and described in connection with FIGS. 24-30, as follows.

Figure 24:
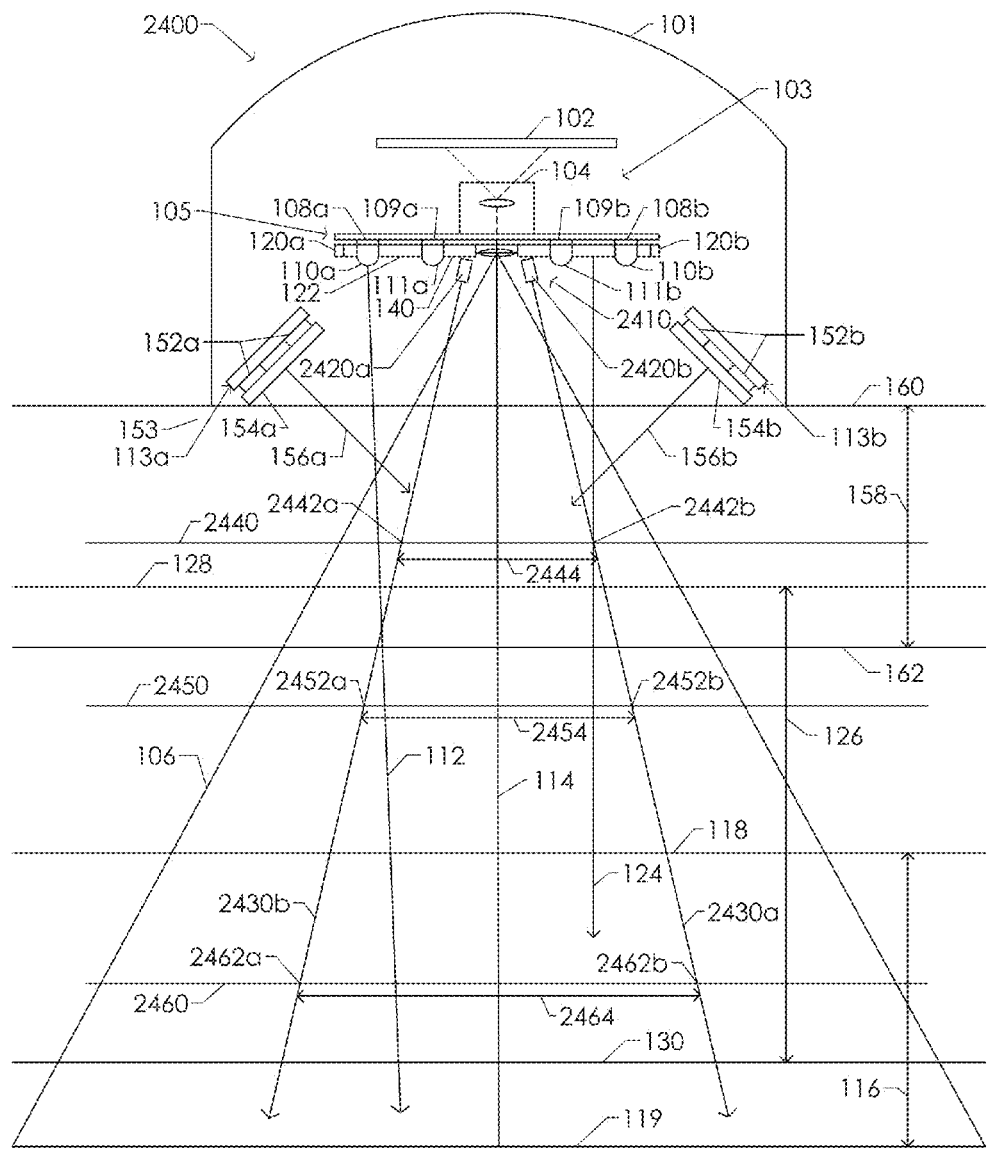
FIG. 24 illustrates a barcode reader that includes a targeting illumination system according to one embodiment.

FIG. 24 illustrates a barcode reader 2400 according to an embodiment of the invention. The barcode reader 2400 may be similar to the barcode reader 100 of FIG. 1. Accordingly, the barcode reader 2400 may include the components shown and described in connection with FIG. 1, which are numbered as in FIG. 1. In addition, the barcode reader 2400 may have a targeting illumination system 2410, which may include one or more illuminators that provide illumination within the field of view 106 of the camera 103.

As shown in FIG. 24, the targeting illumination system 2410 may have a first illuminator 2420a and a second illuminator 2420b. The illuminators 2420 may project targeting illumination 2430 into the field of view 106. Specifically, the first illuminator 2420a may project first targeting illumination 2430a (e.g., a first targeting illumination beam) into the field of view 106, and the second illuminator 2420b may project second targeting illumination 2430b (e.g., a second targeting illumination beam) into the field of view 106.

The illuminators 2420 may include any of a wide variety of light sources, including but not limited to light emitting diodes (LEDs), incandescent lights, fluorescent lights, lasers, and the like. The illuminators 2420 may advantageously be designed to provide focused, rather than diffuse, illumination so that the illuminators 2420 provide distinct, easily-recognizable illumination features on (i.e. reflect from) the object being viewed.

The illuminators 2420 may produce coherent or incoherent light, and may produce broad spectrum or focused spectrum light, as desired. If the lens includes a filter, the targeting illumination 2430 may provide features readable by a filtered lens assembly, such as the first section/portion 1902a of the image sensor 1902 shown in FIG. 10. For example, if the filter 1910 of the first section/portion 1902a of the image sensor 1902 is designed to pass an acceptance spectrum consisting of red light, the illuminators 2420 may be designed to produce red light that falls within the acceptance spectrum.

The illuminators 2420 may be positioned at a location within the housing 101 at which they will not interfere with other components. If desired, the illuminators 2420 may be positioned behind such other components, such as the secondary light source 108 and/or the tertiary light sources 152. In such a case, an aperture, notch, or other opening may be provided to permit the targeting illumination 2430 to pass through such components.

The illuminators 2420 may project the targeting illumination 2430 along vectors as shown by the arrows labeled 2430a and 2430b in FIG. 24. These vectors may advantageously remain within the field of view 106 so that they can project easily recognizable illumination features on surfaces at substantially any range relative to the barcode reader 2400.

Further, the first targeting illumination 2430a and the second targeting illumination 2430b may advantageously be oriented along pathways that diverge outside the housing 101. In the exemplary embodiment of FIG. 24, the first targeting illumination 2430a and the second targeting illumination 2430b may diverge from their points of origin within the housing 101 and continue to diverge upon exiting the housing 101. Although not shown, it is also envisioned that the first targeting illumination 2430a and the second targeting illumination 2430b may cross, meaning they initially converge within the housing 101, and then begin to diverge (after they cross) prior to exiting the housing 101.

In each case the offset between the features projected by the first targeting illumination 2430a and the second targeting illumination 2430b on a surface may then vary linearly with the distance of the surface from the barcode reader 2400.

Figure 25A:
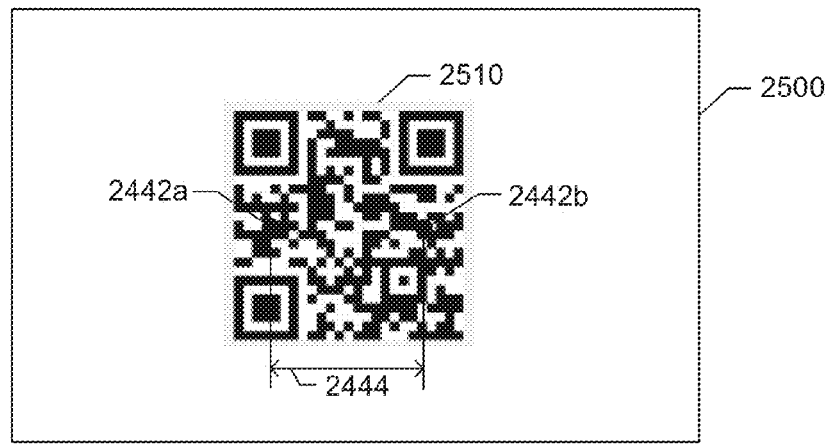
FIGS. 25A-C illustrate examples of features projected by the targeting illumination system of FIG. 24, at different barcode distances.
Figure 25B:
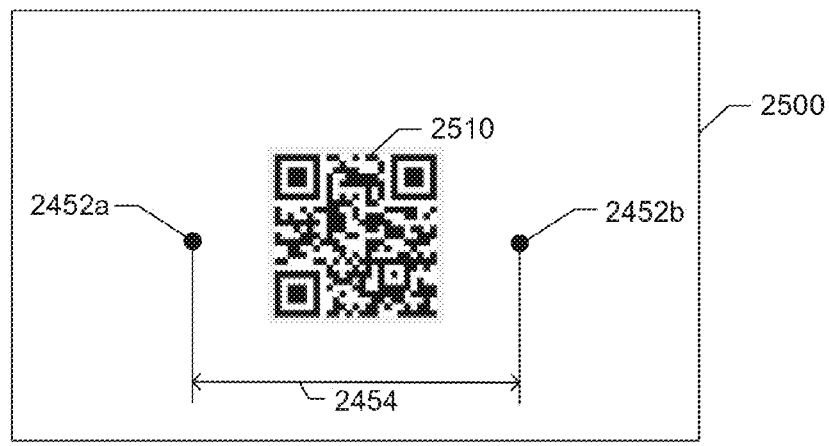
Figure 25C:
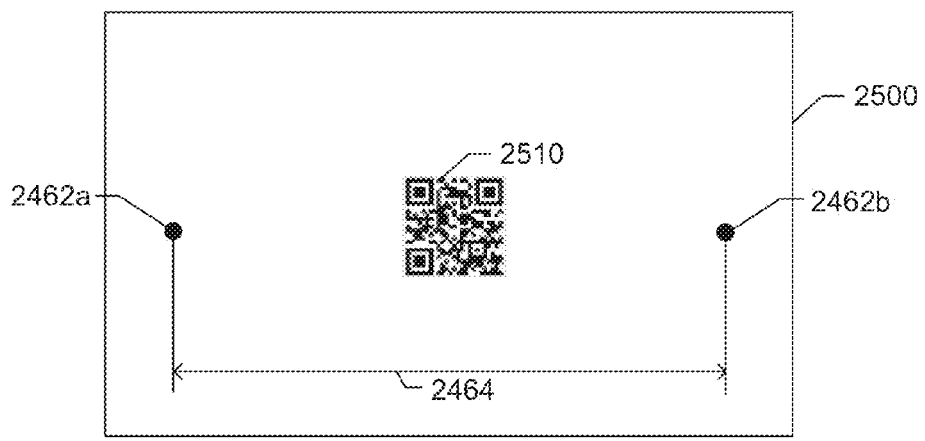

FIGS. 25A, 25B, and 25C illustrate exemplary features that may be projected by the targeting illumination 2430 on a surface 2500 with a barcode 2510. One manner in which the targeting illumination 2430 may be used to provide ranging will be shown and described in connection with FIGS. 25A, 25B, and 25C, with continued reference to FIG. 24.

FIG. 25A illustrates one example in which the surface 2500 is positioned at a first location 2440 (shown in FIG. 24) within the near zone 158. The first targeting illumination 2430a may project a first feature 2442a on the surface 2500. The second targeting illumination 2430b may project a second feature 2442b on the surface 2500. The second feature 2442b may be offset from the first feature 2442a by an offset 2444. The offset 2444 may be relatively small because the surface 2500 is positioned relatively close to the barcode reader 2400; hence, only limited divergence between the first targeting illumination 2430a and the second targeting illumination 2430b may occur between the surface 2500 and the barcode reader 2400.

As shown in FIG. 25A, the first feature 2442a and/or the second feature 2442b may be projected on the barcode 2510. The illuminators 2420 may be designed to project light of a different color and/or intensity from the illumination subsystem(s) used to evenly illuminate the barcode 2510 for image capture. The camera assembly 103 may be able to distinguish the first feature 2442a and the second feature 2442b within reflective portions of the surrounding barcode 2510. Additionally or alternatively, the illuminators 2420 may be positioned such that the first feature 2442a and the second feature 2442b are projected at a location displaced from the barcode 2510, such as above, below, above and below, to the left of, to the right of, or to the left and right of the barcode 2510, with reference to the view of FIG. 25A.

FIG. 25B shows a second example in which the surface 2500 is positioned at a second location 2450 (shown in FIG. 24) within the center zone 126. The first targeting illumination 2430a may project a first feature 2452a on the surface 2500. The second targeting illumination 2430b may project a second feature 2452b on the surface 2500. The second feature 2452b may be offset from the first feature 2452a by an offset 2454. The offset 2454 may be mid-sized because the surface 2500 is positioned at medium range from the barcode reader 2400; thus, more divergence between the first targeting illumination 2430a and the second targeting illumination 2430b may occur between the surface 2500 and the barcode reader 2400 than in FIG. 25A. The barcode 2510 may appear smaller than in FIG. 25A because it is further from the barcode reader 2400 than in FIG. 25A.

FIG. 25C shows a third example in which the surface 2500 is positioned at a third location 2460 (shown in FIG. 24) within the far zone 116. The first targeting illumination 2430a may project a first feature 2462a on the surface 2500. The second targeting illumination 2430b may project a second feature 2462b on the surface 2500. The second feature 2462b may be offset from the first feature 2462a by an offset 2464. The offset 2464 may be relatively large because the surface 2500 is positioned at a relatively large distance from the barcode reader 2400; thus, more divergence between the first targeting illumination 2430a and the second targeting illumination 2430b may occur between the surface 2500 and the barcode reader 2400 than in FIGS. 25A and 25B. The barcode 2510 may appear smaller than in FIGS. 25A and 25B because it is further from the barcode reader 2400 than in FIGS. 25A and 25B.

In FIGS. 25B and 25C, the first features 2452*a* and 2462*a* and the second features 2452*b* and 2462*b* are positioned off of the barcode 2510. However, depending on the size of the barcode 2510 to be read, features may be projected on the barcode 2510 in all ranges of interest, in some of the ranges of interest, or in none of the ranges of interest.

In the examples of FIGS. 25A, 25B, and 25C, the features projected by the illuminators 2420 are offset from each other along only the horizontal direction. This may be the case if the first targeting illumination 2430*a* and the second targeting illumination 2430*b* are substantially coplanar, i.e., residing in the same plane, and the plane in which they reside extends substantially parallel to the X-axis of the corresponding image sensor (such as the image sensor 1902 of FIG. 10). This may provide a linear (or substantially linear) relationship between the offset between the features (for example, the offset 2444 of FIG. 25A, the offset 2454 of FIG. 25B, or the offset 2464 of FIG. 25C) and the distance between the surface 2500 and the barcode reader 2400. Such a linear relationship may enable the barcode reader 2400 to conduct ranging without the aid of a lookup table, for example, by applying a mathematical formula. Additionally or alternatively, such a linear relationship may provide greater accuracy in the event that linear interpolation between the values of a lookup table is applied.

However, a linear relationship between offset and range need not exist. Thus, in some embodiments, the first targeting illumination 2430*a* and the second targeting illumination 2430*b* may not be coplanar. Thus, for example, the second illuminator 2420*b* of FIG. 24 may be offset in a direction perpendicular to the page of FIG. 24 from the first illuminator 2420. Such an offset may add a vertical component (i.e., a y component) to the offset 2444 of FIG. 25A, the offset 2454 of FIG. 25B, and the offset 2464 of FIG. 25C. Offset computations such as those described previously, for determining the total offset given x and y offsets, may then be applied.

In alternative embodiments, the placement of the illuminators 2420 may vary in other ways. For example, in FIG. 24, the second illuminator 2420*b* projects the second targeting illumination 2430*b* such that the second targeting illumination 2430*b* is a substantial mirror image of the first targeting illumination 2430*a*, across the optical axis 114. However, such symmetry between the illuminators 2420 need not be provided. The second illuminator 2420*b* may be angled asymmetrically from the first illuminator 2420*a*, and may thus project the second targeting illumination 2430*b* at an angle, relative to the optical axis 114, that is different from the angle of the first targeting illumination 2430*a* relative to the optical axis 114.

In other alternative embodiments, the illuminators may be positioned to emit targeting illumination that converges, rather than diverging. In such an event, the first and second targeting illumination may advantageously converge at a range greater than the largest range at which the barcode reader is likely to be used to read barcodes. With such a configuration, the offset between features projected by the first and second targeting illumination may be inversely proportional to the distance between the barcode reader and the surface on which the features are projected. Thus, the features may grow closer together with increased range, not further apart as in the example of FIGS. 25A, 25B, and 25C.

Furthermore, the various features (the features 2442 of FIG. 25A, the features 2452 of FIG. 25B, and the features 2462 of FIG. 25C) are shown with circular shapes. However, the circular shape is not required; rather, any shape that can be readable by a computer to extract position information (and thence offset information) may be used.

Figure 26A:
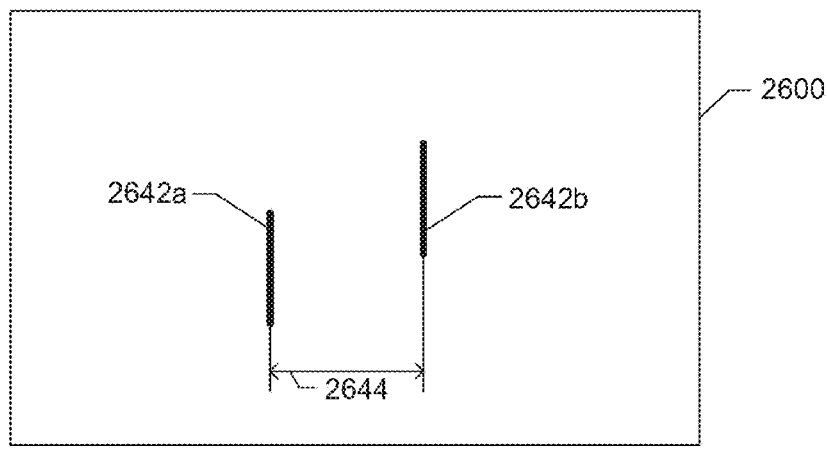
FIGS. 26A-C illustrate examples of features projected by a targeting illumination system according to another alternative embodiment.
Figure 26B:
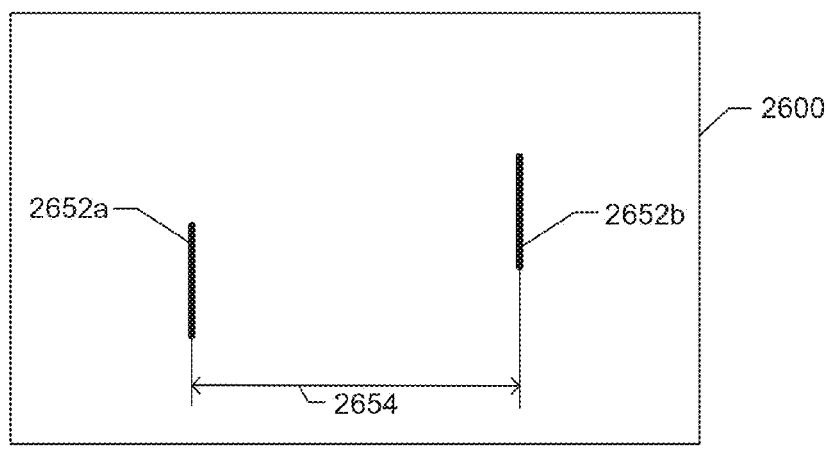
Figure 26C:
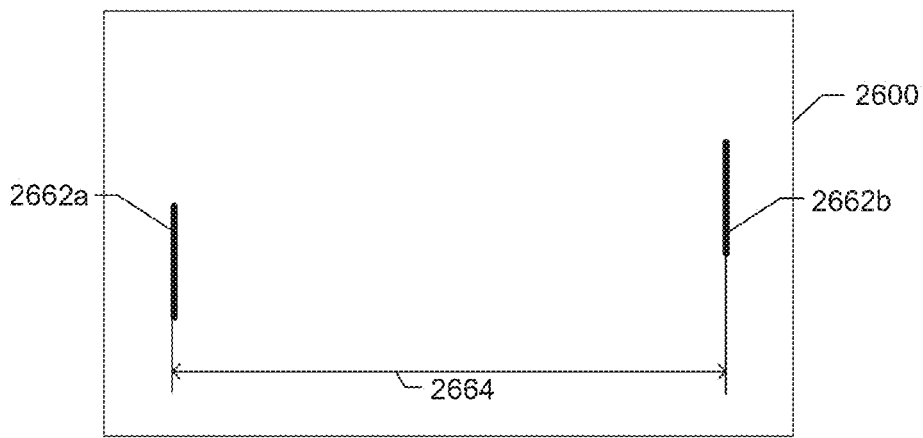

FIGS. 26A, 26B, and 26C illustrate alternative examples in which the features projected on a surface 2600 are linear rather than circular, and are offset in two orthogonal dimensions from each other. The features of FIGS. 26A, 26B, and 26C may be projected by the illuminators 2420 of FIG. 24 in the alternative to the circular features 2442 of FIG. 25A, features 2452 of FIG. 25B, and features 2462 of FIG. 25C. No barcode is present on the surface 2600; the surface 2600 may have a barcode (not shown), or may simply be used for calibration without a barcode.

FIG. 26A illustrates one example in which the surface 2600 is positioned at the first location 2440 (shown in FIG. 24) within the near zone 158. The first targeting illumination 2430*a* may project a first feature 2642*a* on the surface 2600. The second targeting illumination 2430*b* may project a second feature 2642*b* on the surface 2600. The second feature 2642*b* may be offset from the first feature 2642*a* by an offset 2644. The offset 2644 may be relatively small because the surface 2600 is positioned relatively close to the barcode reader 2400; hence, only limited divergence between the first targeting illumination 2430*a* and the second targeting illumination 2430*b* may occur between the surface 2600 and the barcode reader 2400.

As shown, the features 2642 are both lines in FIG. 26A. Additionally, the second feature 2642*b* is vertically as well as horizontally offset from the first feature 2642*a*. This vertical offset may be parallel to the features 2642. Thus, the barcode reader 2400 may, if desired, measure only the horizontal component of the offset between the first feature 2642*a* and the second feature 2642*b* by calculating only the component of the offset that is perpendicular to the features 2642. Alternatively, the barcode reader 2400 may be calibrated to use the full offset, including both x and y components, between the features 2642. Thus, features projected by a targeting illumination system may be usable to carry out ranging based on offsets from each other in the x direction, in the y direction, or in the x and y directions.

FIG. 26B shows a second example in which the surface 2600 is positioned at the second location 2450 (shown in FIG. 24) within the center zone 126. The first targeting illumination 2430*a* may project a first feature 2652*a* on the surface 2600. The second targeting illumination 2430*b* may project a second feature 2652*b* on the surface 2600. The second feature 2652*b* may be offset from the first feature 2652*a* by an offset 2654. The offset 2654 may be mid-sized because the surface 2600 is positioned at medium range from the barcode reader 2400; thus, more divergence between the first targeting illumination 2430*a* and the second targeting illumination 2430*b* may occur between the surface 2600 and the barcode reader 2400 than in FIG. 26A. Like the features 2642 of FIG. 26A, the features 2652 are each linear in shape.

FIG. 26C shows a third example in which the surface 2600 is positioned at the third location 2460 (shown in FIG. 24) within the far zone 116. The first targeting illumination 2430*a* may project a first feature 2662*a* on the surface 2600. The second targeting illumination 2430*b* may project a second feature 2662*b* on the surface 2600. The second feature 2662*b* may be offset from the first feature 2662*a* by an offset 2664. The offset 2664 may be relatively large because the surface 2600 is positioned at a large range from the barcode reader 2400; thus, more divergence between the first targeting illumination 2430*a* and the second targeting illumination 2430*b* may occur between the surface 2600 and the barcode reader 2400 than in FIGS. 26A and 26B. Like the features 2642 of FIG. 26A and the features 2652 of FIG. 26B, the features 2662 are each linear in shape.

In other embodiments, features projected by a targeting illumination system may have any of a wide variety of shapes, including solid shapes, hollow shapes, and combinations thereof. Further, such shapes may include curvilinear shapes, rectilinear shapes, and combinations thereof. Some examples are circles, crosses, triangles, rectangles, parallelograms, other polygons, ellipses, annular shapes, and the like.

In other alternative embodiments (not shown), a targeting illumination system may have only a single illuminator that projects a single shape. Such a shape may have multiple features, such as opposite sides of a circle, opposite corners of a square, or the like, that can be identified by a barcode reader. The barcode reader may determine the offset between those features to carry out ranging. Such an embodiment may essentially calculate the distance between the surface and the barcode reader by measuring the size of the shape projected on the surface by the single illuminator.

Targeting illumination systems as described above may be used in conjunction with any of the barcode reader components disclosed or incorporated by reference herein. Thus, such targeting illumination systems may be used in conjunction with primary, secondary, and/or tertiary light sources in the various embodiments described above. Further, such targeting illumination systems may be used in conjunction with a single lens assembly or multiple lens assemblies, as also described above. If used with multiple lens assemblies, calibration and/or ranging may optionally be carried out with only a single lens assembly. Advantageously, multiple lens assemblies are not required. If a filtered lens assembly is used for ranging, the targeting illumination system may advantageously emit light within the acceptance spectrum of the filter.

Many different methods may be used to calibrate a barcode reader to enable ranging with a targeting illumination system. A generalized method will be shown and described in connection with FIG. 27 and a more specific method will be shown and described in connection with FIG. 28.

FIG. 27 illustrates a method 2700 of calibrating a barcode reader. The method 2700 may be used in conjunction with a barcode reader with a targeting illumination system designed to facilitate ranging, including but not limited to the barcode reader 2400 of FIG. 24.

The method 2700 may commence with a step 2702 in which a plurality of calibration image frames are captured. This may be done, for example, with the camera 103 of the barcode reader 2400. The calibration image frames may be captured by positioning a surface at each of a plurality of distances from the barcode reader 2400, and then capturing the image prior to moving the surface to the next distance.

Then, in a step 2704, feature offset data may be determined based on the calibration image frames. The feature offset data may take the form of a mathematical formula, lookup table, or other tool that can be used to determine the distance of a surface from the barcode reader 2400 based on the offset of features projected by a targeting illumination system.

FIG. 28 illustrates a method 2800 of calibrating a barcode reader in more detail. The method 2800 may be used in conjunction with a barcode reader with a targeting illumination system designed to facilitate ranging, including but not limited to the barcode reader 2400 of FIG. 24.

As shown, the method 2800 may start with a step 2801 that includes activation of the targeting illumination system to project targeting illumination onto the surface. This may include projecting first and second features $F_{i,1}$ and $F_{i,2}$ onto a surface positioned at a calibration distance $D_i$. As mentioned previously, the first and second features $F_{i,1}$ and $F_{i,2}$ may be separate shapes, or may be parts of a single shape.

Then, in a step 2802, a calibration image frame may be captured at the calibration distance $D_i$. Since ranging may be carried out with only a single lens assembly, the calibration image frame need only have a first calibration image. One or more additional calibration images may optionally be included in the calibration image frame.

In a step 2804, the barcode reader (for example, the barcode reader 2400) may determine the location of each of the first and second features $F_{i,1}$ and $F_{i,2}$ in the first calibration image. This may be done through the use of any of a wide variety of image recognition algorithms known in the art. As mentioned before, this location data may include only an x coordinate, only a y coordinate, or both x and y coordinates. The location data may be associated with the depth $D_i$ at which the calibration image frame was captured in the step 2802.

In a step 2806, the barcode reader, for example, the barcode reader 2400, may calculate the offset $FO_i$ between the location of the first feature $F_{i,1}$, and the location of the second feature $F_{i,2}$ at the calibration distance $D_i$. Like the location data obtained in the step 2804, the offset $FO_i$, may include only an x coordinate, only a y coordinate, or both x and y coordinates. Additionally or alternatively, the offset $FO_i$, may simply be the magnitude of the offset between the location of the first feature $F_{i,1}$, and the location of the second feature $F_{i,2}$, without regard to the direction along which the offset occurs.

Then, in a step 2808, the barcode reader, for example, the barcode reader 2400, may record the feature offset $FO_i$ in association with the calibration distance $D_i$. This record may be added to a lookup table in which each of a plurality of distances from the barcode reader 2400 is associated with an offset between features of the targeting illumination projected by the targeting illumination system.

Recordation of the data may be carried out as described in connection with previous embodiments. A data storage schema analogous to any of the lookup tables of FIGS. 21A through 21D may be used to store feature offsets from targeting illumination according to the present embodiment. For example, the calibration data may include the following for each calibration distance $D_i$ of a plurality of calibration distances: (i) a first location corresponding to a first feature of the targeting illumination in a calibration image (e.g., the location of the first feature 2442a in FIG. 25A), (ii) a second location corresponding to a second feature of the targeting illumination in the calibration image (e.g., the location of the second feature 2442b in FIG. 25A), and (iii) a feature offset indicating an offset between the first location and the second location (e.g., the offset 2444 between the first feature 2442a and the second feature 2442b). Alternatively, the calibration data may include only (i) and (ii), and (iii) may be calculated when needed. Alternatively, the calibration data may include only (iii).

In a query 2810, the barcode reader, for example, the barcode reader 2400, may determine whether calibration frames have been captured for all calibration distances. If so, the method 2800 may end. If not, the method 2800 may proceed to a step 2812 in which another calibration distance $D_i$ is selected. The method 2800 may then reinitiate at the new calibration distance $D_i$. Thus, the method 2800 may iterate until calibration data has been obtained for each distance $D_i$ of interest.

Alternatively or additionally, the barcode reader may calculate a plurality of feature offsets based on known divergence of the targeting illumination. For example, the divergence angle of the targeting illumination may be known, and the barcode reader may calculate a plurality of feature offsets based on the divergence angle. These feature offsets may be stored as calibration data (e.g., in a lookup table) instead of or in addition to the feature offsets calculated in the method 2800 of FIG. 28.

Alternatively or additionally, the calibration process may provide calibration data in the form of a mathematical formula or the like. Such a formula may receive, as an input, an offset between features in targeting illumination, and may provide, as output, an estimated barcode distance that is an estimate of the distance between the surface on which the targeting illumination is projected, and the barcode reader. Such a formula may advantageously enable calculation of an estimated barcode distance with any feature offset. However, such a formula may require a predictable relationship between the feature offset and the barcode distance, such as a linear relationship.

Figure 29:
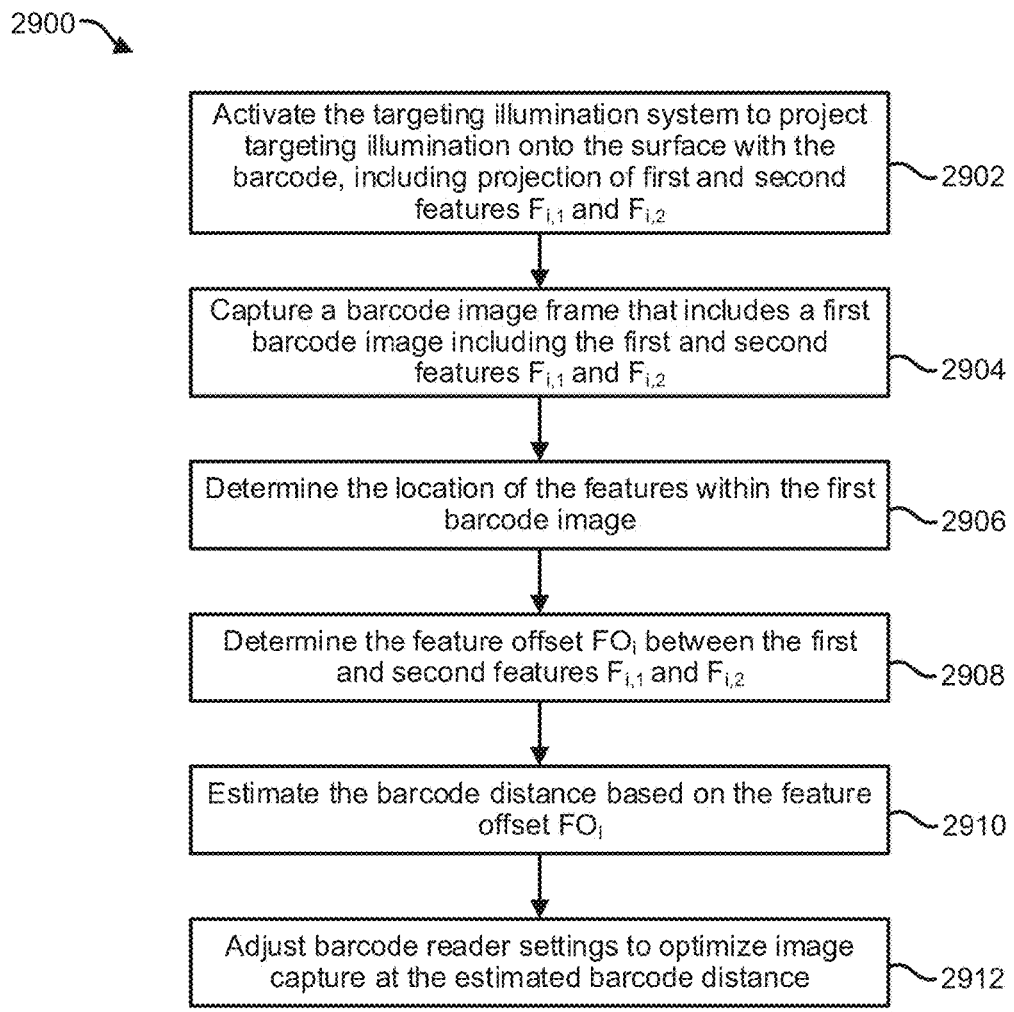
FIG. 29 illustrates another method that may be performed by a barcode reader in order to implement ranging with a targeting illumination system.

FIG. 29 illustrates a method 2900 of adjusting barcode reader settings based on range, for example adjusting settings related to selection of an illumination subsystem for illuminating a barcode. The method 2900 may be used in conjunction with a barcode reader with a targeting illumination system designed to facilitate ranging, including but not limited to the barcode reader 2400 of FIG. 24.

The method 2900 may start with a step 2902 in which the targeting illumination system is activated to project targeting illumination within the field of view of the camera of the barcode reader, onto a surface with the barcode. This projection may include projecting first and second features $F_{i,1}$ and $F_{i,2}$ onto the surface.

Then, in a step 2904, a barcode image frame may be captured. Since only one lens assembly may be required for ranging when ranging is accomplished through the use of a targeting illumination system, the barcode image frame may include only a first barcode image. Optionally, the barcode image frame may include one or more additional barcode images. The first barcode image may include the first and second features $F_{i,1}$ and $F_{i,2}$.

In a step 2906, the location of the first and second features $F_{i,1}$ and $F_{i,2}$ within the first barcode image may be determined. This may be done through the use of any of a wide variety of image recognition algorithms known in the art. As in the method 2800 of FIG. 28, this location data may include only an x coordinate, only a y coordinate, or both x and y coordinates.

Then, in a step 2908, the feature offset $FO_i$ between the locations of the first and second features $F_{i,1}$ and $F_{i,2}$ may be determined. Like the location data obtained in the step 2906, the offset $FO_i$ may include only an x coordinate, only a y coordinate, or both x and y coordinates. Additionally or alternatively, the offset $FO_i$ may simply be the magnitude of the offset between the location of the first feature $F_{i,1}$, and the location of the second feature $F_{i,2}$, without regard to the direction along which the offset occurs.

Then, in a step 2910, an estimated barcode distance, i.e., a distance between the surface with the barcode and the barcode reader, may be determined. This may be done by referencing calibration data captured previously in a calibration method such as the method 2700 of FIG. 27 or the method 2800 of FIG. 28. For example, if a lookup table is used, the barcode reader may look up the feature offset $FO_i$ determined in the step 2908 (or the closest recorded feature offset to it) and return the corresponding calibration distance $D_i$ as the estimated barcode distance. Additionally or alternatively, if the feature offset $FO_i$ determined in the step 2908 is not present in the lookup table, interpolation between the feature offsets $FO_i$ in the lookup table that are immediately above and below the measured feature offset $FO_i$ may be used to provide an estimated barcode distance that is between the corresponding distances $D_i$ for the feature offsets $FO_i$ immediately above and below the measured feature offset $FO_i$.

Alternatively, a lookup table need not be used. For example, if the calibration process provided a formula for obtaining a barcode distance $D_i$ from a feature offset $FO_i$ such a formula may then be used to obtain the estimated barcode distance from the measured feature offset $FO_i$.

The method 2900 may then proceed to a step 2912 in which the estimated barcode distance is used to adjust the barcode reader settings. This adjustment may optimize image capture at the estimated barcode distance. In some embodiments, this may entail selecting an illumination sub-system such as the light source 120, the secondary light source(s) 108, and/or the tertiary light source(s) 152. The illumination sub-system selected may be that which is optimal for the depth at which the surface is positioned. This decision may be made as described above in connection with step 1414 of the method 1400 shown in FIG. 14.

Figure 30:
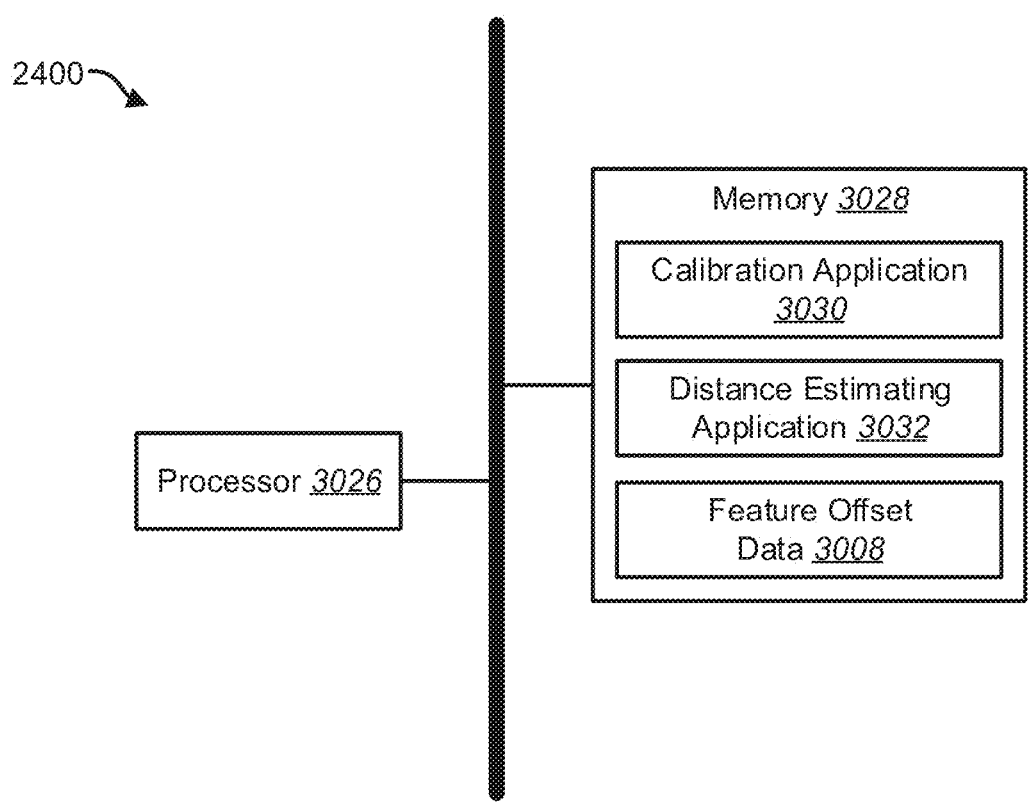
FIG. 30 illustrates some of the components within a barcode reader that may be used to implement ranging with a targeting illumination system.

FIG. 30 illustrates some additional components within the barcode reader 2400 that may be used to implement ranging with a targeting illumination system. The reader 2400 may include a processor 3026. The processor 3026 may be of any of the types set forth in the description of the processor 2426 of FIG. 23.

The reader 2400 may also include memory 3028 in electronic communication with the processor 3026. That is, the processor 3026 may be able to read information from and/or write information to the memory 3028. The memory 3028 may be any electronic component capable of storing electronic information, and may be of any of the types set forth in the description of the memory 2428 of FIG. 23.

Data and instructions may be stored in the memory 3028. The instructions may include one or more programs, routines, sub-routines, functions, procedures, etc. The instructions may include a single computer-readable statement or many computer-readable statements. The instructions may be executable by the processor 3026 to implement one or more of the methods 2700, 2800, 2900, operations, functions and/or procedures described herein. Executing the instructions may involve the use of the data that is stored in the memory 3028. The data may include feature offset data 3008 and other types of data described herein. The calibration data, including the feature offset data 3008, may be stored in non-volatile memory of the barcode reader 2400.

The methods 2700, 2800, 2900 and other functionality described herein may be distributed across multiple applications, programs, routines, sub-routines, functions, procedures, etc. For example, a calibration application 3030 may be configured to perform the methods 2700, 2800 that were described above in connection with FIGS. 27 and 28. A distance estimating application 3032 may be configured to perform the method 2900 described above in connection with FIG. 29.

As used herein, the phrase "substantially parallel" means within five degrees of parallel. In another embodiment, substantially parallel means within 15 degrees of parallel. In another embodiment, substantially parallel means within 20 degrees of parallel.

As used herein, the phrase "substantially perpendicular" means within five degrees of perpendicular. In another embodiment, substantially perpendicular means within 15 degrees of perpendicular. In another embodiment, substantially perpendicular means within 20 degrees of perpendicular.

As used herein, the term "determining" (and grammatical variants thereof) encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

As used herein, the phrase "based on" does not mean "based only on," unless expressly specified otherwise. In other words, the phrase "based on" describes both "based only on" and "based at least on."

One or more of the features, functions, procedures, operations, components, elements, structures, etc., described in connection with any one of the configurations described herein may be combined with one or more of the functions, procedures, operations, components, elements, structures, etc., described in connection with any of the other configurations described herein, where compatible.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The claims are not limited to the specific implementations described above. Various modifications, changes and variations may be made in the arrangement, operation and details of the implementations described herein without departing from the scope of the claims.

What is claimed is:

1. A barcode reader, comprising:
a first lens assembly having a first field of view;
a targeting illumination system that projects targeting illumination into the first field of view;
an illumination system, wherein the illumination system comprises a plurality of illumination sub-systems, each illumination sub-system being optimal for barcode reading within a different zone of the first field of view, and wherein the plurality of illumination sub-systems comprise:
a first illumination system that directs first illumination into the first field of view, the first illumination being optimal for barcode reading within a first zone of the first field of view; and
a second illumination system that directs second illumination into the first field of view, the second illumination being optimal for barcode reading within a second zone of the first field of view;
calibration data indicating a plurality of feature offsets of the targeting illumination, the feature offsets corresponding to a plurality of calibration distances; and
instructions executable by a processor to:
cause an image of a barcode to be captured while the targeting illumination system is activated;
determine an offset between distinct features of the targeting illumination in the image;
determine an estimated barcode distance based on the offset between the distinct features of the targeting illumination in the image and the calibration data; and
use the estimated barcode distance to select at least one operating parameter of the barcode reader, wherein using the estimated barcode distance to select the at least one operating parameter of the barcode reader comprises selecting:
the first illumination system if the estimated barcode distance is within the first zone of the first field of view; and
the second illumination system if the estimated barcode distance is within the second zone of the first field of view.

2. The barcode reader of claim 1, wherein determining the estimated barcode distance comprises:
identifying a closest feature offset among the plurality of feature offsets; and
identifying a calibration distance that corresponds to the closest feature offset.

3. The barcode reader of claim 1, wherein determining the estimated barcode distance comprises interpolating the estimated barcode distance using the offset between the distinct features of the targeting illumination in the image and the calibration data.

4. The barcode reader of claim 1, wherein:
the barcode reader further comprises instructions executable by the processor to cause a plurality of calibration images to be captured; and
each feature offset of the plurality of feature offsets indicates an offset between the distinct features of the targeting illumination in a particular calibration image.

5. The barcode reader of claim 1, wherein each feature offset of the plurality of feature offsets indicates an offset between distinct features of the targeting illumination at a particular calibration distance of the plurality of calibration distances.

6. The barcode reader of claim 1, wherein the calibration data comprises, for each of the plurality of calibration distances:
a first location corresponding to a first feature of the targeting illumination in a calibration image;
a second location corresponding to a second feature of the targeting illumination in the calibration image; and
a feature offset indicating an offset between the first location and the second location.

7. The barcode reader of claim 1, further comprising instructions executable by the processor to calculate the plurality of feature offsets based on known divergence of the targeting illumination.

8. The barcode reader of claim 1, further comprising a second lens assembly having a second field of view, wherein the offset between the distinct features of the targeting illumination is only determined with respect to the first field of view.

9. A barcode reader, comprising:
a camera, the camera comprising a first lens assembly positioned to image a first field of view onto a first image sensor section;
an illumination system that illuminates the first field of view, the illumination system comprising a plurality of illumination sub-systems, wherein each illumination sub-system of the plurality of illumination sub-systems is optimal for barcode reading within a different zone of the first field of view, and wherein the plurality of illumination sub-systems comprise:
  a dark field illumination system that directs dark field illumination into the first field of view, the dark field illumination being optimal for barcode reading within a near zone of the first field of view;
  a diffuse bright field illumination system that directs diffuse bright field illumination into the first field of view, the diffuse bright field illumination being optimal for barcode reading within a center zone of the first field of view; and
  a bright field illumination system that directs bright field illumination into the first field of view, the bright field illumination being optimal for barcode reading within a far zone of the first field of view; and
a targeting illumination system that projects targeting illumination into the first field of view, the targeting illumination comprising a plurality of distinct illumination beams being projected so as to diverge from one another, the plurality of distinct illumination beams forming a plurality of distinct features on a target medium;
calibration data stored in non-volatile memory of the barcode reader, the calibration data indicating a plurality of feature offsets of the targeting illumination, the plurality of feature offsets corresponding to a plurality of different calibration distances, each feature offset indicating an offset between distinct features of the targeting illumination at a particular calibration distance; and
instructions executable by a processor to:
  activate the targeting illumination;
  cause an image of a barcode to be captured by the camera while the targeting illumination system is activated;
  determine an offset between the distinct features of the targeting illumination in the image;
  determine an estimated barcode distance based on the offset between the distinct features of the targeting illumination in the image and the calibration data; and
  use the estimated barcode distance to select an illumination sub-system for barcode reading, wherein using the estimated barcode distance to select the illumination sub-system comprises selecting:
    the dark field illumination system if the estimated barcode distance is within the near zone of the first field of view;
    the diffuse bright field illumination system if the estimated barcode distance is within the center zone of the first field of view; and
    the bright field illumination system if the estimated barcode distance is within the far zone of the first field of view.

10. The barcode reader of claim 9, wherein determining the estimated barcode distance comprises:
  identifying a closest feature offset, the closest feature offset being a feature offset of the plurality of feature offsets that is closest to the offset between the distinct features of the targeting illumination in the image;
  identifying a calibration distance that corresponds to the closest feature offset; and
  setting the estimated barcode distance equal to the identified calibration distance.

11. The barcode reader of claim 9, wherein determining the estimated barcode distance comprises:
  identifying a pair of feature offsets such that the offset between the distinct features of the targeting illumination in the image and the calibration data is intermediate the pair of feature offsets;
  identifying a pair of calibration distances corresponding to the pair of feature offsets; and
  interpolating between the pair of calibration distances.

12. The barcode reader of claim 9, wherein:
  the barcode reader further comprises instructions executable by the processor to cause a plurality of calibration images to be captured by the camera, each calibration image being captured at a different calibration distance; and
  each feature offset of the plurality of feature offsets indicates the offset between the distinct features of the targeting illumination in a distinct calibration image of the plurality of calibration images.

13. The barcode reader of claim 9, further comprising a look-up table storing the calibration data, the look-up table comprising, for each of the plurality of different calibration distances, a feature offset indicating an offset between the distinct features of the targeting illumination.

14. The barcode reader of claim 9, further comprising a look-up table storing the calibration data, the look-up table comprising, for each of the plurality of different calibration distances:
  a first location corresponding to a first feature of the targeting illumination in a calibration image;
  a second location corresponding to a second feature of the targeting illumination in the calibration image; and
  a feature offset indicating the offset between the first location and the second location.

15. The barcode reader of claim 9, further comprising instructions executable by the processor to:
  determine a divergence angle of the targeting illumination; and
  calculate the plurality of feature offsets based on the divergence angle.

16. The barcode reader of claim 9, wherein:
  the camera further comprises a second lens assembly positioned to image a second field of view onto a second image sensor section; and
  the distance between the distinct features of the targeting illumination is only determined with respect to the first field of view in the image.

* * * * *